United States Patent [19]

Tsukamoto et al.

[11] Patent Number: 5,771,478
[45] Date of Patent: Jun. 23, 1998

[54] VEHICLE DRIVE SYSTEM WITH ELECTRICAL POWER REGENERATION

[75] Inventors: Kazumasa Tsukamoto, Toyota; Takeshi Inuzuka; Masashi Hattori, both of Anjo; Takuji Taniguchi, Okazaki; Haruki Takemoto, Chiryu; Kozo Yamaguchi, Anjo, all of Japan

[73] Assignees: Aisin AW Co., Ltd.; Kabushikikaisha Equos Research, both of Japan

[21] Appl. No.: 544,430

[22] Filed: Nov. 6, 1995

[30] Foreign Application Priority Data

Nov. 4, 1994 [JP] Japan ..................................... 6-271586

[51] Int. Cl.[6] .......................................................... G06G 7/70
[52] U.S. Cl. .............................. 701/68; 701/69; 701/53; 477/3; 477/8; 180/65.6; 180/65.2; 415/149; 20/4 C; 20/45
[58] Field of Search ..................... 364/424.096, 424.097, 364/424.081; 477/118, 119, 3, 8, 143, 158, 130, 129; 475/149, 122, 249, 5, 276, 269, 280; 180/65.2, 65.6; 290/4 C, 8, 45, 20, 29, 46

[56] References Cited

U.S. PATENT DOCUMENTS

| | | | |
|---|---|---|---|
| 2,666,492 | 1/1954 | Nims et al. ................................ | 180/65 |
| 4,574,661 | 3/1986 | Opperud et al. ......................... | 477/126 |
| 4,723,624 | 2/1988 | Kawasaki et al. ....................... | 477/36 |
| 5,049,116 | 9/1991 | Asada ....................................... | 475/269 |
| 5,117,931 | 6/1992 | Nishida ..................................... | 180/652 |
| 5,258,651 | 11/1993 | Sherman .................................. | 290/23 |
| 5,267,492 | 12/1993 | Furukawa et al. ...................... | 477/129 |
| 5,285,111 | 2/1994 | Sherman .................................. | 290/4 C |
| 5,433,282 | 7/1995 | Moroto et al. .......................... | 180/65.2 |
| 5,492,508 | 2/1996 | Tsukamoto et al. ..................... | 475/125 |
| 5,505,673 | 4/1996 | Tsukamoto et al. ..................... | 477/130 |
| 5,542,887 | 8/1996 | Tsukamoto et al. ..................... | 475/63 |
| 5,562,565 | 10/1996 | Moroto et al. ............................. | 477/3 |

FOREIGN PATENT DOCUMENTS

| | | |
|---|---|---|
| 2200800 | 4/1974 | France . |
| 4124479 | 1/1993 | Germany . |

*Primary Examiner*—Jacques H. Louis-Jacques
*Attorney, Agent, or Firm*—Lorusso & Loud

[57] ABSTRACT

A drive system provides a smooth start for a vehicle and converts excess kinetic energy accompanying the difference in speed between the engine and the drive wheels occurring during starting into electrical energy for storage in a battery. The drive system includes a gearbox having at least a first gear element connected to an output shaft of an engine, a second gear element connected to a drive wheel of a vehicle and a third gear element for, by applying a braking torque to the third gear element, reducing the speed of rotation input from the first gear element and outputting it to the second gear element. An engaging element provides selective connection to any of the gear elements for mechanically connecting the output shaft of the engine to the drive wheel. The drive system further includes an electric rotary device connected to the third gear element, an accumulator, engine load detector for detecting engine load, speed detector for detecting the speed of at least one of the gear elements of the gearbox and for outputting a speed signal and a control unit.

21 Claims, 36 Drawing Sheets

VEHICLE DRIVE SYSTEM WITH ELECTRICAL POWER REGENERATION

BACKGROUND OF THE INVENTION

This invention relates to vehicle hybrid drive systems and to a vehicle drive system with electrical power regeneration.

Conventionally, because a vehicle engine operating below a certain speed cannot produce any torque, to start the vehicle moving forward torque is transmitted to the drive wheels with the engine being run at a predetermined speed. However, when the vehicle is stationary, the speed of the drive wheels is 0 and, accordingly, there is a difference in speed between the engine and the drive wheels. For this reason, a drive engaging unit such as a frictional clutch or a fluid clutch is interposed between the engine and the drive wheels to allow for this speed difference.

Taking as an example the use of a torque convertor as a fluid clutch, even when a neutral range has been selected by a driver, the engine has been disconnected from the drive wheels and the vehicle is stopped, the engine is running at an idling speed. Consequently, to start the vehicle moving forward, as in D range, a clutch is engaged and the engine and the drive wheels are connected by the torque convertor. While the input side of the torque convertor is rotated at the idling speed the output side of the torque convertor is kept substantially stationary by the inertia of the vehicle. When the driver then depresses an accelerator pedal the engine speed gradually increases and the torque convertor transmits torque to the drive wheels and starts the vehicle moving with slip, corresponding to the input-output speed difference, which occurs through the medium of the hydraulic fluid contained within the torque convertor.

When, after the vehicle has started moving, the vehicle speed (the speed of the drive wheels) reaches a predetermined speed at which such slipping is not required, the input and output sides of the torque convertor are directly coupled by a lock-up clutch or the like and the speed difference is eliminated.

However, in the conventional system described above, while the vehicle is starting to move, because torque is transmitted with an input-output speed difference due to slipping through the hydraulic fluid in the case of a torque convertor or slipping of friction surfaces in the case of a frictional clutch, excess kinetic energy generated by the input-output speed difference is converted into heat and dissipated. As a result, the kinetic energy produced by the engine is not used efficiently.

OBJECT AND SUMMARY OF THE INVENTION

An object of this invention is to solve the above-mentioned problem associated with conventional drive engagement systems and to provide a system which effects smooth starting by transmitting torque produced by an engine to drive wheels while allowing an input-output speed difference and which, when the vehicle has started moving, can transmit torque produced by the engine to the drive wheels without an input-output speed difference and, furthermore, can convert into electrical energy and store excess kinetic energy generated by the input-output speed difference.

To achieve the above and other objects, the drive system of the invention includes: a gearbox, having at least a first gear element connected to an output shaft of an engine, a second gear element connected to a drive wheel of the vehicle and a third gear element for, by applying a braking torque to the third gear element, reducing the speed of rotation input from the first gear element and outputting the rotation at the reduced speed to the second gear element; an engaging element connected to any of the gear elements for being selectively engaged and, when engaged, mechanically connecting the output shaft of the engine to the drive wheel; an electric rotary device connected to the third gear element; an accumulator; engine load detecting means for detecting engine load; speed detecting means for detecting the speed of at least one of the gear elements of the gearbox and outputting a speed signal; and a control unit.

The control unit includes: electric rotary device controlling means for setting a target speed for the first gear element based on the engine load and bringing the speed of the first gear element, as determined from the speed signal, to the target speed by driving the electric rotary device and causing the electric rotary device to generate a braking torque; and engaging element engaging and disengaging means for comparing the speed of a gear element other than the first gear element (hereinafter "other gear element"), as determined from the speed signal, with set values for engaging and disengaging and for engaging and disengaging the engaging element based on the comparison. As a result, because the control unit need only put the engaging element into a semi-engaged state and perform feedback control of the engine speed, the control unit can be simplified.

In another embodiment of the invention, the values set for engaging and disengaging are set in correspondence with the engine load and become higher as the engine load increases.

The drive system of the invention includes operating means which allows the driver to select between a driving state and a non-driving state of the vehicle and vehicle speed detecting means for detecting the speed of the vehicle.

The electric rotary device controlling means is provided with braking torque setting means for driving the electric rotary device and setting up a braking torque when a driving state for the vehicle is selected by operation of the operating means, the engine load detected by the engine load detecting means is substantially zero and the vehicle speed detected by the vehicle speed detecting means is below a set value.

In another embodiment of the invention a brake sensor is provided for detecting depression of a brake pedal and a vehicle speed sensor is provided for detecting the speed of the vehicle.

The electric rotary device controlling means sets the braking torque of the electric rotary device at zero when depression of the brake pedal is detected by the brake sensor, the engine load detected by the engine load detecting means is substantially zero and the vehicle speed detected by the vehicle speed sensor is below a set value. As a result, when the driver has depressed the brake pedal, a neutral state can be created. In this case, because the braking torque produced by the electric rotary device is increased, the torque output to the drive wheels can be swept up to create a creep torque.

In yet another embodiment of the invention, when the engine load detected by the engine load detecting means is substantially zero and the speed of the other gear element obtained from the speed signal is below a value set for release, the engaging and disengaging means releases the engaging element and the electric rotary device controlling means maintains the speed of the other gear element at a level within a region of high electricity generation efficiency. As a result, during coasting, by releasing the engaging element and driving the electric rotary device in a high electricity generation efficiency region, a large amount of electrical energy is regenerated by the electric rotary device.

In another embodiment of the invention, when the engine load detected by the engine load detecting means is substantially zero and the speed of the other gear element is below the value set for release, the engaging and disengaging means releases the engaging element and the electric rotary device controlling means maintains the speed of the first gear element obtained from the speed signal above a set value. As a result, during coasting, by releasing the engaging element and increasing the engine speed and continuing with fuel cutoff, fuel consumption can be improved.

Further, during coasting, when the charge state of the accumulator is good, by releasing the engaging element, increasing the engine speed and continuing with the fuel cutoff, fuel consumption can be improved. On the other hand, when the state of charge of the accumulator is low, by releasing the engaging element and driving the electric rotary device in a high electricity generation efficiency region, a large amount of electrical energy is regenerated by the electric rotary device.

In still another embodiment of the invention there is provided a residual charge detecting device for monitoring the state of charge of the accumulator. In this latter embodiment when the engine load detected by the engine load detecting means is substantially zero, the speed of the other gear element is below a first value set for release and the residual charge of the accumulator is low, the engaging and disengaging means releases the engaging element and the electric rotary device controlling means maintains the speed of the other gear element at a level of high electricity generation efficiency.

On the other hand, when the engine load detected by the engine load detecting means is substantially zero, the speed of the other gear element is below a second set value for release and the state of charge of the accumulator is good, the engaging and disengaging means releases the engaging element and the electric rotary device controlling means maintains the speed of the first gear element above a set value.

In yet another embodiment of the invention calculating means is provided for calculating a speed difference or a speed ratio for speeds of two gear elements detected by the speed detecting means.

Also, when the speed of the other gear element is above a value set for engaging and the speed difference or speed ratio calculated by the calculating means is smaller than a preset deviation constant, the engaging and disengaging means engages the engaging element. The deviation constant is preferably set in correspondence with the engine load and becomes larger as the engine load increases. Because it is possible to engage the engaging element when the speeds of the first, second and other gear elements are the same, engaging shock can be reduced. As a result, when the engine load is large, engine stalling will not occur even when the engaging element is engaged. Accordingly the direct coupling clutch is engaged quickly and released slowly.

The electric rotary device is preferably a generator/motor and the preset deviation constant is set to a small value when the state of charge is good and to a large value when the charge state is low. As a result, because when the state of charge of the accumulator is good and when the speed difference or speed ratio has become small, the engaging element is released, engaging shock can be suppressed. When the state of charge of the accumulator is low, the amount of electrical energy consumed by the electric rotary device can be reduced.

Preferably, when the speed of the other gear element is above a set value for engaging and the absolute value of the speed of the other gear element is substantially zero, the engaging element engaging and disengaging means engages the engaging element. On the other hand, when the speed of the other gear element is above a set value for engaging and the absolute value of the speed of the other gear element is smaller than a set value set in correspondence with the engine load, the engaging and disengaging means engages the engaging element. It follows that when the speed signal is above a set value for engaging and the absolute value of the speed of a gear element other than the first gear element obtained from the speed signal is substantially zero, the engaging and disengaging means engages the engaging element.

As a result, a generator can optionally be used as the electric rotary device. In this case, because only a regenerating mode is provided, i.e. no motor drive mode is provided, the output control unit can be simplified.

It is also possible to use a separately excited generator, not having permanent magnets, as the electric rotary device.

In another embodiment of the invention there is provided regenerated power detecting means for detecting power generated by the electric rotary device. When the speed of the other gear element is above a set value for engaging and the regenerated power detected by the regenerated power detecting means is smaller than a set value, the engaging and disengaging means engages the engaging element.

When, as the vehicle speed increases with the target speed maintained unchanged, the speed of the other gear element increases and when the regenerated power becomes substantially zero, the engaging element is engaged.

As noted above, in one preferred embodiment of the invention the electric rotary device is a generator/motor. Such an embodiment has an electric rotary device operable in both a drive mode and a regenerating mode.

In another preferred embodiment of the invention the electric rotary device is a generator. As noted above, such an embodiment provides an electric rotary device with only a regenerating mode but allows simplification of the control unit.

In one embodiment of the invention, when the engagement of the engaging element by the engaging and disengaging means has been completed the electric rotary device controlling means reduces braking torque generated by the generator/motor at a set rate. In another embodiment of the invention, from the start of engaging of the engaging element by the engaging and disengaging means to the completion thereof, the electric rotary device controlling means reduces the braking torque of the generator/motor. This feature provides for a reduction in shock produced by the torque fluctuations.

A one-way clutch, for transmitting a rotation of the generator/motor to the output shaft of the engine, is preferably included.

The engaging element is preferably a clutch of the normally closed type which transmits rotation of the generator/motor to the output shaft of the engine.

When the difference between the power obtained from regeneration by the generator/motor and the power consumed in driving the generator/motor is smaller than a set value and the speed of the other gear element is larger than a set value for disengaging, the engaging element is engaged by the engaging and disengaging means.

In another aspect the invention includes: a gearbox, having at least a first gear element connected to an output shaft of the engine, a second gear element connected to a drive wheel of the vehicle and a third gear element for reducing the speed of rotation input from the first gear element and outputting it to the second gear element by applying a braking torque to the third gear element; an engaging element connected to any of the gear elements for, in turn, being selectively engaged to mechanically connect the output shaft of the engine to the drive wheel(s); an electric rotary device connected to the third gear element; an accumulator; engine load detecting means for detecting engine load; speed detecting means for detecting the speed of at least one of the gear elements of the gearbox and outputting a speed signal; and a control unit. In this case, because only the power obtained by regeneration with the generator/motor is consumed in driving the generator/motor, the capacity of the accumulator can be small.

The control unit includes electric rotary device controlling means for setting a target speed for the first gear element, based on the engine load, and bringing the speed of the first gear element, as indicated by the speed signal, to a target speed by driving the electric rotary device and causing the electric rotary device to generate a braking torque. The control unit further includes engaging element control means ("engaging and disengaging means") for comparing the speed of the first gear element when the engaging element has been engaged with a set value for disengaging and for disengaging the engaging element based on the comparison.

When the vehicle is stationary, normally the neutral range has been selected. In neutral the throttle opening is set to an idling throttle opening and the engine is rotated at an idling speed. At this time, the rotation of the engine is transmitted to the gearbox by the engine output shaft and the first gear element is rotated at the idling speed. When the driver then selects D range and increases the engine load, the electric rotary device controlling means sets a target speed for the first gear element based on the engine load and drives the electric rotary device to generate a torque so that the speed of the first gear element approaches the target speed.

Rotation at the target speed is transmitted to the first gear element but, because the inertia of the vehicle is transmitted to the second gear element and the speed of the second gear element consequently is 0, the electric rotary device is rotated as a load. As a result, the electric rotary device operates as a generator and exerts a braking torque while generating a regeneration current.

Because, along with the production of the braking torque a torque equal to the sum of the engine torque and the braking torque is transmitted to the drive wheels, the vehicle starts to accelerate and the speed of the second gear element also gradually increases. Thereafter, when the speed of the second gear element rises above a set value for engagement, the engaging element is engaged. In this way, when the gearbox becomes mechanically coupled, the rotation of the output shaft of the engine is transmitted to the drive wheels unchanged or converted by a predetermined gear ratio.

Thus, every time the vehicle starts moving, excess kinetic energy produced by the engine is used to rotate the third gear element braked by the braking torque as a load and is converted into electrical energy by the electric rotary device. Current thus produced by the electric rotary device in a regenerating mode can be stored in an accumulator. Electrical energy thus stored can be used to run vehicle electrical equipment or auxiliary equipment of the engine or to drive the electric rotary device. As a result, fuel consumption can be reduced.

When the drive system of the present invention is provided with a transmission between the gearbox and the drive wheels a gear-change shock caused by inertia torque tends to occur upon a gear-shift in the transmission; however, by temporarily putting the system in the regenerating mode during the gear-change transient state, the torque inputted into the gearbox can be reduced and gear-change shock can thereby be prevented.

Because the engaging element is engaged when the speed of the second gear element exceeds a set value for engaging, not only can engine stalling be prevented but also the kinetic energy produced by the engine can be directly transmitted to the drive wheels without any of it being converted into electrical energy and, therefore, fuel economy can be improved.

Also, it is possible to make the gearbox and the engaging element assume the function of an auxiliary transmission. That is, if an open ratio transmission is used as a main transmission and a gearbox with relatively small gear ratios and an engaging element are used as an auxiliary transmission, a cross-ratio multistage automatic transmission is obtained. In this case, the engaging element can be changed over between its engaged state and its released state in each gear stage of the main transmission.

When set values for engaging and disengaging are made to vary with the engine load, to become higher with increasing engine load, and when demand for acceleration is high, the engine load becomes high and the engaging element is engaged slowly and released quickly.

In one preferred embodiment of the invention, beginning with initiation of engagement of the engaging element by the engaging and disengaging means through to the completion of the engagement, the electric rotary device controlling means reduces the braking torque of the generator/motor. This serves to suppress the occurrence of inertia torque accompanying engagement of the engaging element and to thereby reduce engagement shock.

The system of the invention preferably includes a one-way clutch for transmitting rotation of the generator/motor to the output shaft of the engine. With such an arrangement, the generator/motor can also be used as a starter motor, and when the engine is not running it is possible to start the engine by driving the generator/motor.

The engaging element can also be engaged and the generator/motor and the engine connected through the aforementioned normally closed clutch even when the engine is not running and hydraulic pressure is not being produced in the hydraulic circuit. This arrangement also allows the generator/motor to be used as a starter motor, and when the engine is not running it is possible to start the engine by driving the generator/motor.

When the engine is driven, a hydraulic pressure is produced in the hydraulic circuit and a hydraulic pressure is supplied to a hydraulic cylinder to release the engaging element.

DETAILED DESCRIPTION OF THE PREFERRED EMBODIMENTS

Preferred embodiments of the invention will now be described in detail with reference to the accompanying drawings.

Figure 1:
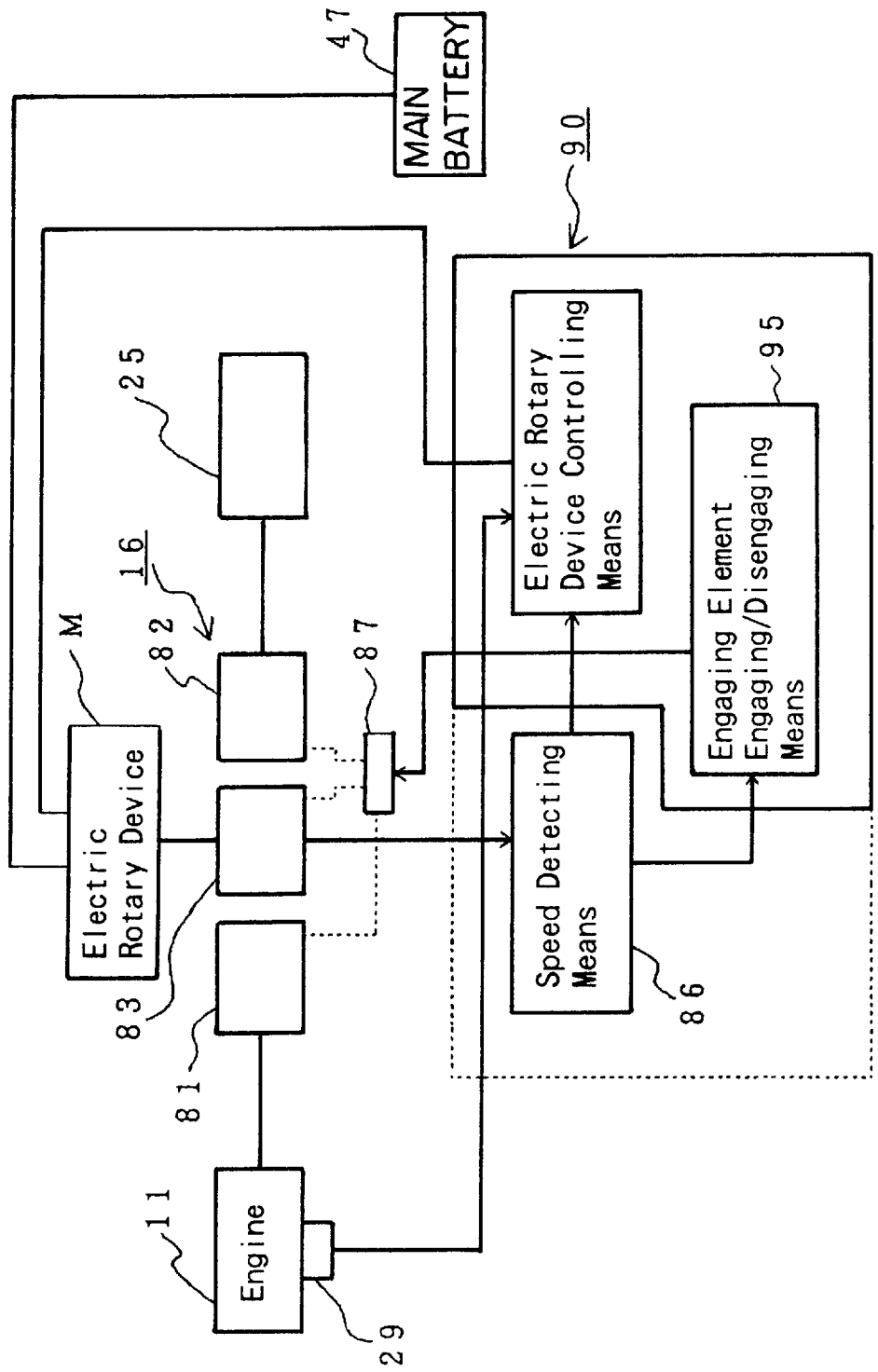
FIG. 1 is a block diagram of a first preferred embodiment of the vehicle drive system of the present invention.

As shown in FIG. 1, a first embodiment of the drive system of the invention includes a gearbox 16 which has at least a first gear element 81 connected to an output shaft of an engine 11, a second gear element 82 connected to vehicle drive wheels 25 and a third gear element 83. By application of a braking torque to the third gear element 83 the speed of rotation input from the first gear element 81 is reduced and output to the second gear element 82. An engaging element 87 is connected to either the first gear element 81, the second gear element 82 and/or the third gear element 83 to selectively engage these gear elements and thereby mechanically connect the output shaft of the engine 11 with the vehicle drive wheels 25. An electric rotary device M is connected to the third gear element 83 for driving same. A main battery 47 serves as an accumulator; a throttle sensor 29 serves as engine load detecting means for detecting the throttle opening of the engine, as an engine load, and speed detecting means 86 detects the speed of at least one of the gear elements of the gearbox 16 and outputs a speed signal. A control unit 90 receives the load signal from the sensor 29 and the speed signal from sensor 86.

In the alternative, the speed detecting means 86 may directly detect the speed of all the gear elements or calculate a speed based on the speeds of two of the gear elements.

The control unit 90 includes electric rotary device controlling means 93 for bringing the speed of the first gear element 81, as obtained from the speed signal, to a target speed by driving the electric rotary device M and generating a braking torque. Control unit 90 further includes engaging and disengaging means 95 for comparing the speeds of the other gear elements obtained from the speed signal to set values for engaging and disengaging and for engaging and disengaging the engaging element 87 based on the comparison.

Figure 2:
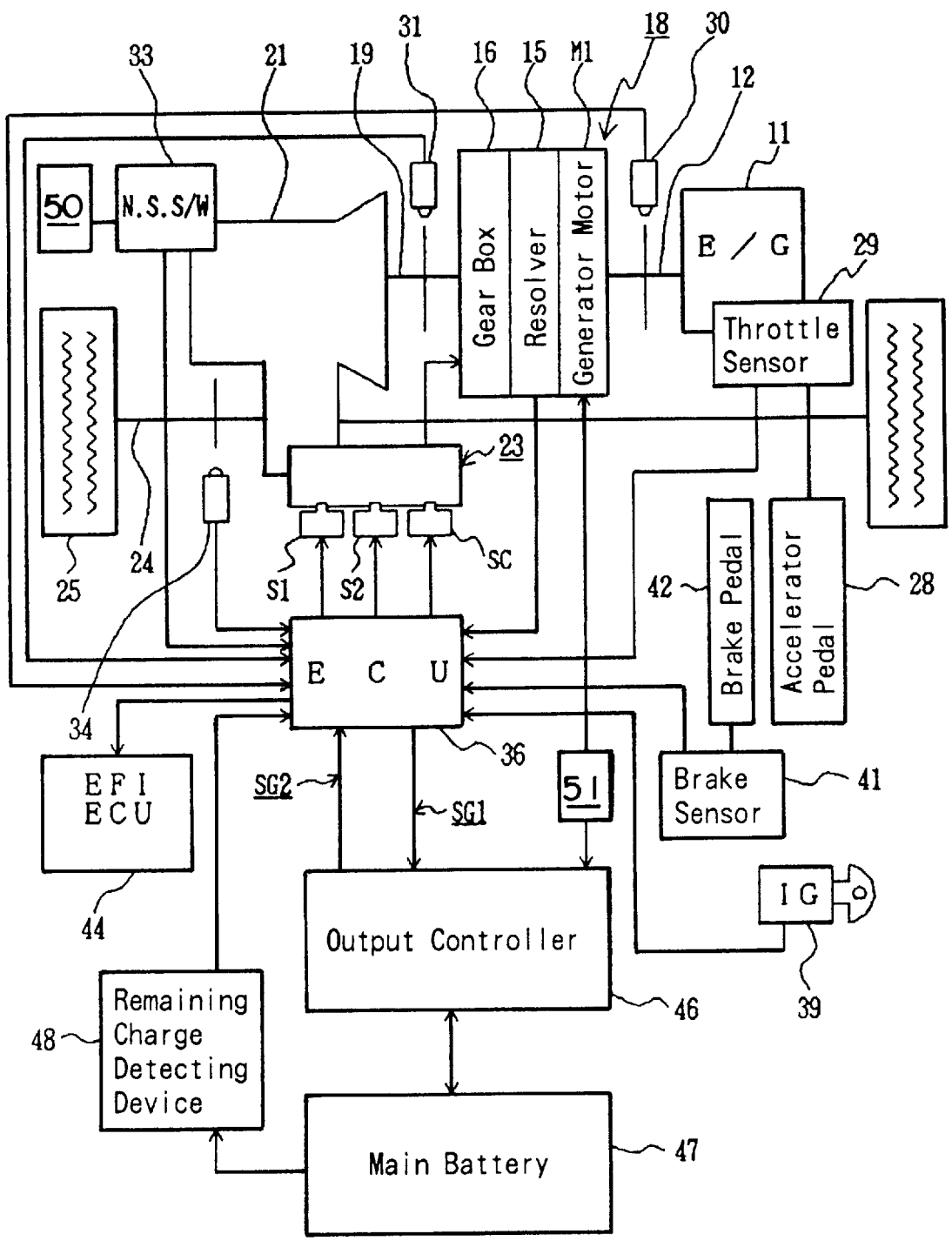
FIG. 2 is a circuit and block diagram of the control system for the first preferred embodiment of FIG. 1.

In FIG. 2, 11 is the engine (E/G), 12 is an engine output shaft which outputs rotation generated by the engine 11 and M1 is a generator/motor serving as an electric rotary device. The generator/motor M1 acts both as a generator and as a motor; when acting as a generator, it generates a regeneration current and applies a braking torque to the engine output shaft 12 as a reaction force, and when acting as a motor it generates a torque and outputs it to an output shaft 19.

A resolver 15 detects magnetic pole positions of the generator/motor M1. The gearbox 16 is connected to the engine output shaft 12. 18 is a drive mechanism made up of the resolver 15, the generator/motor M1 and the gearbox 16. An output shaft 19 transmits rotation generated by the drive mechanism 18 to a transmission 21. In this preferred embodiment the transmission 21 is an automatic transmission (A/T), but it may alternatively be a manual transmission.

The gearbox 16 has a speed-reducing gear mechanism not shown in the drawings, for example a planetary gear unit, and a clutch, also not shown, for selectively engaging and disengaging the elements of the planetary gear unit. This clutch is engaged and disengaged by a hydraulic servo which is controlled by a hydraulic circuit 23. The hydraulic circuit 23 has a solenoid valve SC for selectively supplying oil to the hydraulic servo.

In this preferred embodiment, because the transmission 21 is an automatic transmission, the hydraulic circuit 23 has solenoid valves S1, S2 for selecting a gear stage of the transmission 21. When a gear stage is selected by the hydraulic circuit 23, rotation corresponding to that gear stage is transmitted via a drive shaft 24 to the vehicle drive wheels 25.

By depressing an accelerator pedal 28 it is possible to change the throttle opening, i.e. the engine load. The throttle opening is detected by a throttle sensor 29 serving as engine load detecting means linked to the accelerator pedal 28. An engine speed sensor 30 is disposed facing the engine output shaft 12 and detects the engine speed, an output speed sensor 31 is disposed facing the output shaft 19 and detects the output speed of the drive mechanism 18, a shift position switch (N.S.S/W) 33 is linked to a shift lever (not shown in the drawings) serving as an operating means and detects the range and gear stage selected by the shift lever, and a vehicle speed sensor 34, serving as vehicle speed detecting means, is disposed facing the drive shaft 24 and detects a value corresponding to the vehicle speed (hereinafter referred to as "the vehicle speed correspondent value"). In practice, the speed of the drive shaft 24 is detected by the vehicle speed sensor 34 and converted into the vehicle speed correspondent value by calculation.

In this preferred embodiment, the engine speed sensor 30 is disposed facing the engine output shaft 12 and detects the speed of the engine output shaft 12; however, alternatively, it is possible to use a signal from an ignition system instead of the speed of the engine output shaft 12. Also, although in this preferred embodiment the output speed sensor 31 is disposed facing the output shaft 19 and detects the speed of the output shaft 19, the speed of the input shaft of the transmission 21 can alternatively be detected, instead of the speed of the output shaft 19.

Automatic transmission control unit 36 generates a start-up output and a gear-change output based on the throttle opening detected by the throttle sensor 29, the vehicle speed detected by the vehicle speed sensor 34 and the range and gear stage detected by the shift position switch 33. Unit 36 outputs a clutch signal, corresponding to the start-up output, to the solenoid of the solenoid valve SC and solenoid signals corresponding to the gear-change output are output to the solenoids of the solenoid valves S1, S2.

The hydraulic circuit 23 supplies hydraulic pressure to the above-mentioned hydraulic servo based on the clutch signal and the solenoid signals received by the solenoids, selects gears and directly couples the drive mechanism 18.

An ignition switch 39 produces a start signal when a driver turns the ignition key. A brake sensor 41, serving as brake detecting means, detects a brake stroke or a brake fluid pressure when the driver depresses a brake pedal 42 and thereby detects the braking force called for by the driver. A fuel injection control unit 44 (EFIECU) receives a neutral signal generated by the automatic transmission control unit 36 and reduces the fuel injection quantity to the engine 11.

An output control unit 46 drives the generator/motor M1 and thereby produces the torque required to start the vehicle moving. The main battery 47 serves as an electricity storage device for supplying current for driving the generator/motor M1 and for receiving and storing electrical energy obtained by regeneration. A residual charge detecting device 48 detects charge remaining in the main battery 47 and monitors the state of charge thereof based on voltage and current integrated values or the like. A sensor 51 serves as regenerated power detecting means.

An operation signal SG1 is output from the automatic transmission control unit 36 to the output control unit 46, and this operation signal SG1 is made up of an ON/OFF signal of a switching device for controlling the current supplied to the generator/motor M1 and a chopper duty signal and the like. An operation signal SG2 is output from the output control unit 46 to the automatic transmission control unit 36, and this operation signal SG2 is used as a current monitor signal for conducting feedback control in the automatic transmission control unit 36.

Figure 3:
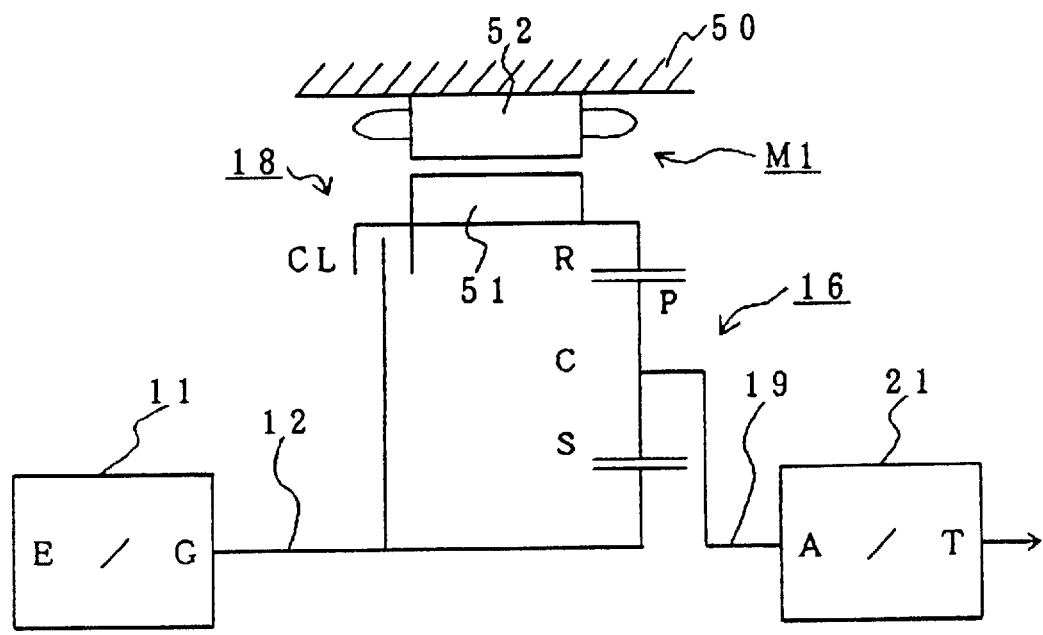
FIG. 3 is a schematic view of the major components of the first preferred embodiment of FIG. 1.

Operation of the drive system described will be now described with reference to FIGS. 3, 4 and 5. In these figures, 11 is the engine, 12 is the engine output shaft, M1 is the generator/motor, 16 is the gearbox, 18 is the drive mechanism, 19 is the output shaft of the drive mechanism 18, 21 is the transmission and 50 is a drive mechanism case.

The gearbox 16 consists of a planetary gear unit, and this planetary gear unit is made up of a sun gear S, a pinion P, a ring gear R and a carrier C rotatably supporting the pinion P. The sun gear S is fixed to the engine output shaft 12 and the carrier C is fixed to the output shaft 19. The generator/motor M1 is made up of a rotor 51 and a stator 52. The rotor 51 is fixed to the ring gear R and the stator 52 is fixed to the drive mechanism case 50. The sun gear S, the carrier C and the ring gear R constitute the gear elements of the planetary gear unit.

A direct coupling clutch CL, serving as an engaging element, is disposed between the ring gear R and the engine output shaft 12 and, by engaging this direct coupling clutch CL, the ring gear R and the sun gear S can be locked together and the gearbox 16 thereby directly coupled. In this preferred embodiment the ring gear R and the sun gear S are locked together, but it is also possible to lock together the ring gear R and the carrier C or the carrier C and the sun gear S.

In the drive system thus constructed, when the vehicle is stationary, normally the neutral range is selected, the throttle opening $\theta$ is set to an idling throttle opening $\theta_{id1}$ and the engine is run at an idling speed $N_{id1}$. At this time, the rotation of the engine 11 is transmitted to the drive mechanism 18 via the engine output shaft 12 and sun gear S is rotated at the idling speed $N_{id1}$.

To start the vehicle moving the shift lever 50 is operated to select a D range 36 and a clutch for forward movement (hereinafter referred to as "the forward clutch") (not shown in the drawings) in the transmission 21 is engaged.

At this time the rotation at the idling speed $N_{id1}$ is transmitted to the sun gear S, but the forward clutch being engaged causes the inertia of the vehicle to be transmitted to the output shaft 19, and the speed of the carrier C and the output shaft 19, that is, the output speed $N_o$, becomes 0. As a result, the speed line of the system becomes the speed line L1 in the speed line diagram of FIG. 4 and the generator/motor M1 is rotated as a load and operates in a regenerating mode while exerting a braking torque $T_{m1}$.

When the driver then depresses the accelerator pedal 28 (FIG. 2) and increases the throttle opening 6 from the idling throttle opening $\theta_{id1}$ to a throttle opening $\theta_m$, a target engine speed $N_e^*$ corresponding to the throttle opening $\theta_m$ is set and in the automatic transmission control unit 36 feedback control is performed so that the braking torque $T_{m1}$ generated by the generator/motor M1 is produced and the target engine speed $N_e^*$ is maintained. At this time, along with the feedback control, because a torque is transmitted to the output shaft 19, the output speed $N_o$ also gradually increases.

When at a time t1 the generator/motor speed $N_{m1}$ becomes 0, the generator/motor M1 shifts from the regenerating mode into the driving mode. At this time, the speed line becomes the line L2.

Thereafter, as acceleration is continued, the generator/motor speed $N_{m1}$ continues to rise while the target engine speed $N_e^*$ is maintained unchanged. When at a time t2 the output speed $N_o$ becomes greater than a set value for engaging $N_{e1}$ the clutch signal output from the automatic transmission control unit 36 to the solenoid of the solenoid valve SC becomes ON and the direct coupling clutch CL is engaged. The output speed $N_o$ in this case can be calculated from the following equation, wherein i is a gear ratio:

$$N_o = (N_e - N_{m1})/i + N_{m1} \ (N_{m1} < 0)$$

The set value for engaging $N_e1$ is set higher by a predetermined value than a minimum speed $N_{emin}$, at which engine stalling does not occur, when, as a result of the direct coupling clutch CL being engaged, the rotation at the target engine speed $N_e^*$ is transmitted to the ring gear R rotating at the generator/motor speed $N_{m1}$.

In this way, when the gearbox 16 becomes directly coupled, the rotation of the engine output shaft 12 is transmitted unchanged to the output shaft 19. As a result, the engine speed $N_e$, the output speed $N_o$ and the generator/motor speed $N_{m1}$ become equal and the speed line becomes the line L3. The generator/motor M1 shifts into a non-driving state. In this case, the braking torque $T_{m1}$ is reduced gradually in order to reduce shock caused by torque fluctuation.

As a result, whenever the vehicle starts to move, excess kinetic energy produced by the engine 11 is used to rotate as a load the generator/motor M1 braked by the braking torque and is converted by the generator/motor M1 into electrical energy. Current generated by the generator/motor M1 in the regenerating mode can be stored in the main battery 47. This stored electrical energy can be used to run electrical accessories of the vehicle or auxiliary equipment of the engine or to drive the generator/motor M1. As a result, it is possible to reduce the fuel consumption of the vehicle.

Because the direct coupling clutch CL is engaged when the output speed $N_o$ becomes greater than the set value for engaging $N_{e1}$, not only can engine stalling be prevented, but it is also possible to directly transmit kinetic energy produced by the engine 11 to the drive wheels 25 without first converting that kinetic energy into electrical energy, and therefore fuel consumption can be reduced in this way also.

During gear-changing of the transmission 21, a gear-change shock tends to occur due to inertia torque; however, by temporarily putting the drive system into the regenerating mode when the transmission 21 is in a gear-changing transient state, the torque input to the transmission 21 can be reduced and the occurrence of gear-change shock can be prevented.

Also, it is possible to make the drive mechanism 18 have the function of an auxiliary transmission. That is, if an open ratio transmission 21 is used as a main transmission and a drive mechanism 18 with relatively small gear ratios is used as an auxiliary transmission, a cross-ratio multistage automatic transmission is obtained.

In this case, the direct coupling clutch CL can be changed over between the engaged state and the disengaged state in each gear stage of the main transmission.

Figure 6:
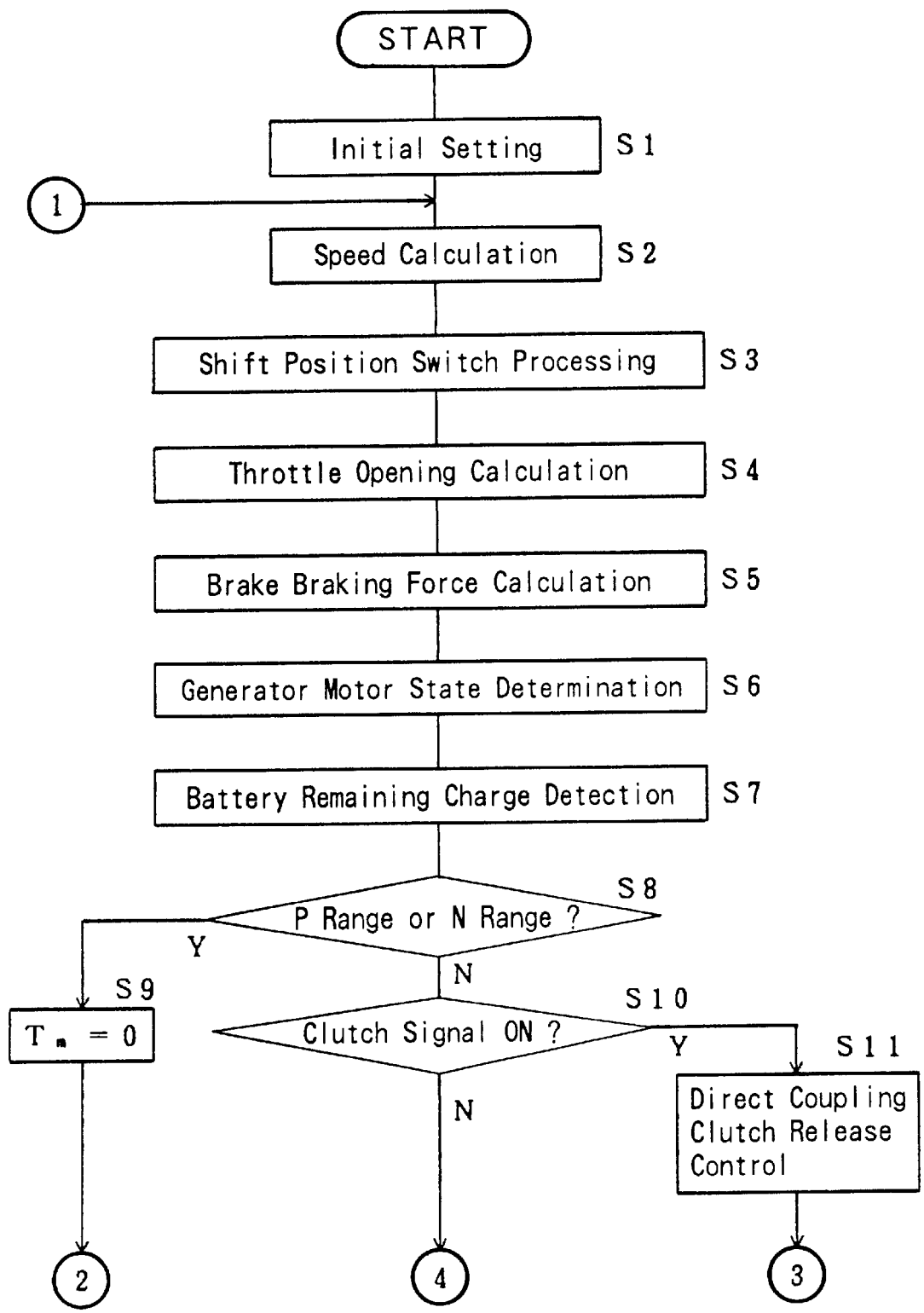
FIG. 6 is a flow chart of the main routine for operation of the first preferred embodiment of FIG. 1.
Figure 7:
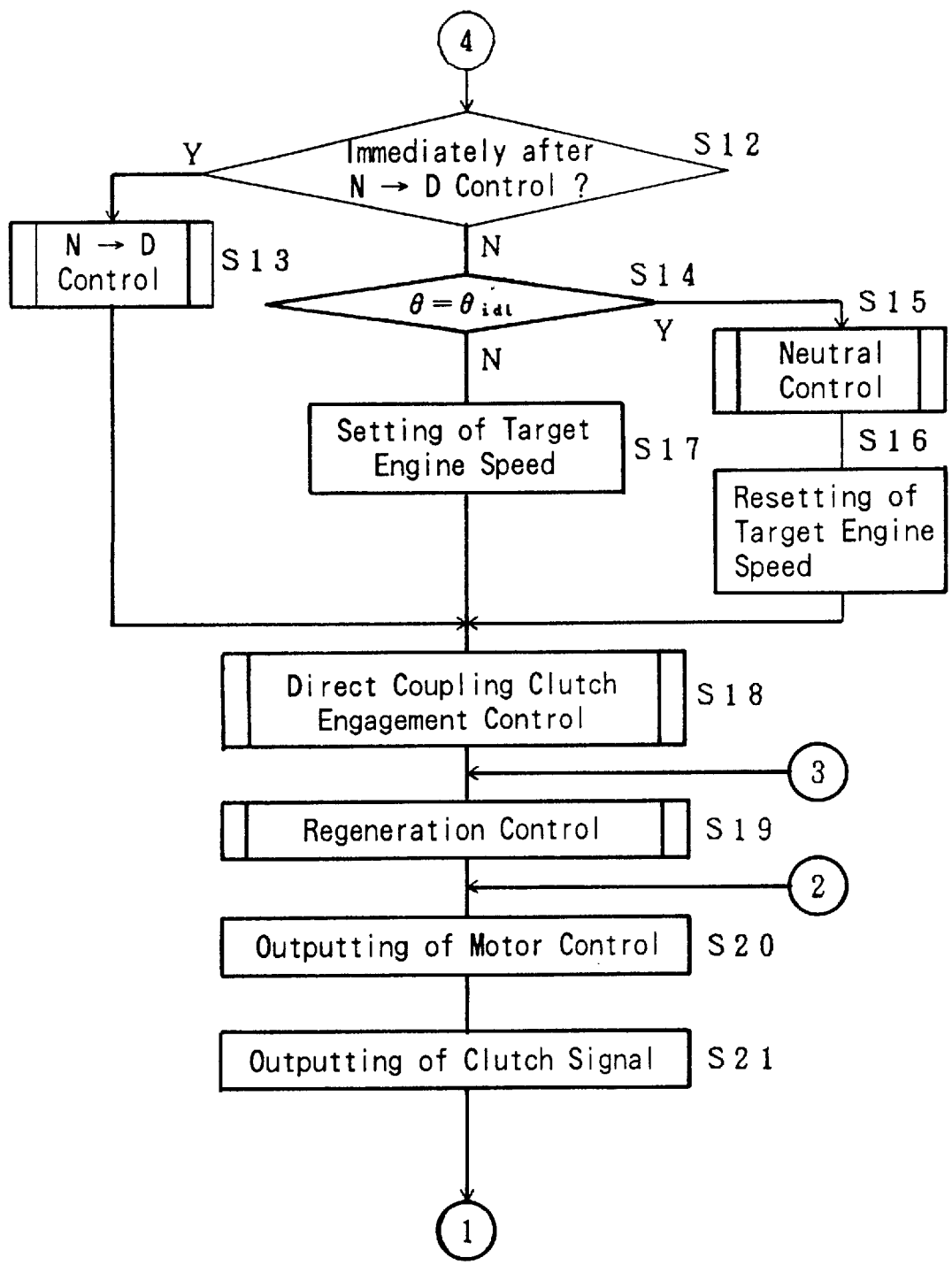
FIG. 7 is a continuation of the flow chart of FIG. 6.

The control routine for operation of drive system of the present invention is illustrated in FIGS. 6 and 7 and include the following control steps:

Step S1: All settings are reset at the start of control.

Step S2: The speed detecting means 86 (FIG. 1) calculates the engine speed $N_e$ (FIG. 5), the output speed $N_o$, the generator/motor speed $N_{m1}$ and the vehicle speed correspondent value V, based on signals sent from sensors such as the engine speed sensor 30 (FIG. 2), the output speed sensor 31 and the vehicle speed sensor 34. In this case, the engine speed $N_e$, the output speed $N_o$ and the generator/motor speed $N_{m1}$ can be obtained not only directly, based on the signals from the respective sensors, but also can be calculated based on two other speeds.

Step S3: Shift position switch processing is carried out. That is, a range and gear are detected by the shift position switch 33 and fault detection for the shift position switch 33 itself is carried out.

Step S4: The throttle opening $\theta$ is calculated based on a signal sent from the throttle sensor 29.

Step S5: Based on a brake signal sent from the brake sensor 41, a brake stroke or a brake fluid pressure is detected and the braking force being called for by the driver is calculated.

Step S6: The present state of the generator/motor M1 is determined from its voltage, speed and direction of rotation.

Step S7: The charge state, i.e. the remaining charge, of the main battery 47 is detected.

Step S8: It is determined whether or not the range detected in Step S3 is the P range or the N range.

Step S9: The direct coupling clutch CL (FIG. 3) is released and the braking torque $T_{m1}$ of the generator/motor M1 is made 0.

Step S10: It is determined whether the clutch signal for engaging and disengaging the direct coupling clutch CL is ON or whether or not a flag LFSC (further discussed later) is A. When the clutch signal is ON or the flag LFSC is A, processing proceeds to Step S1, and when the clutch signal is not ON or the flag LFSC is not A, processing proceeds to Step S12.

Step S11: The engaging and disengaging means 95 executes direct coupling clutch release control processing.

Step S12: It is determined whether or not N→D control processing has just been executed (or is being executed). When it has just been executed (or is being executed) processing proceeds to Step S13, and when not processing proceeds to Step S14.

Figure 8:
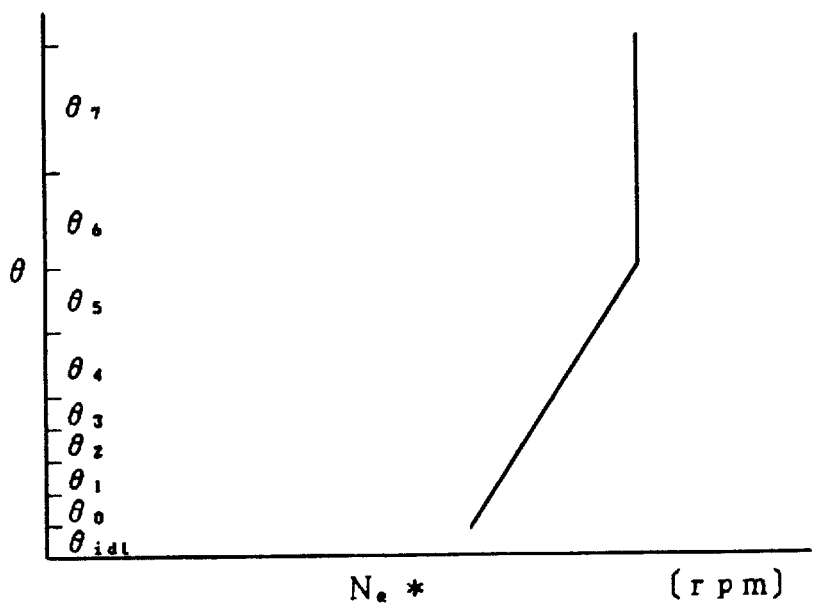
FIG. 8 is a map of target engine speeds in the first preferred embodiment of FIG. 1.

Step S13: N→D control processing is executed.
Step S14: It is determined whether or not the throttle opening θ has been set to the idling throttle opening $θ_{id1}$. When it has been set to the idling throttle opening $θ_{id1}$, processing proceeds to Step S15, and when it has not been set to the idling throttle opening $θ_{id1}$ processing proceeds to Step S17.
Step S15: Neutral control processing is executed.
Step S16: The target engine speed $N_e^*$ is reset and feedback control is discontinued.
Step S17: Because the accelerator pedal 28 (FIG. 2) is being depressed, the target engine speed $N_e^*$ corresponding to the throttle opening θ is read from the target engine speed map of FIG. 8 and is set. The target engine speed $N_e^*$ is increased as the throttle opening θ becomes larger and, when the throttle opening θ becomes greater than a predetermined value, the target engine speed $N_e^*$ is made constant. In this way it is possible to obtain a characteristic approximating the stall speed of a torque convertor.
Step S18: The engaging and disengaging means 95 executes direct coupling clutch engagement control processing.
Step S19: When the throttle opening θ has been set to the idling throttle opening θhd id1, regeneration control processing is executed and the target engine speed $N_e^*$ is reset.
Step S20: Motor control output is carried out. That is, while monitoring the operation signal SG2 the electric rotary device controlling means 93 performs feedback control of the braking torque $T_{m1}$ (or the generator/motor speed $N_{m1}$) and outputs control command values as the operation signal SG1 to an invertor of the output control unit 46 so that the previously set target engine speed $N_e^*$ is maintained.
Step S21: The clutch signal is output to the solenoid of the solenoid valve SC.

Figure 10:
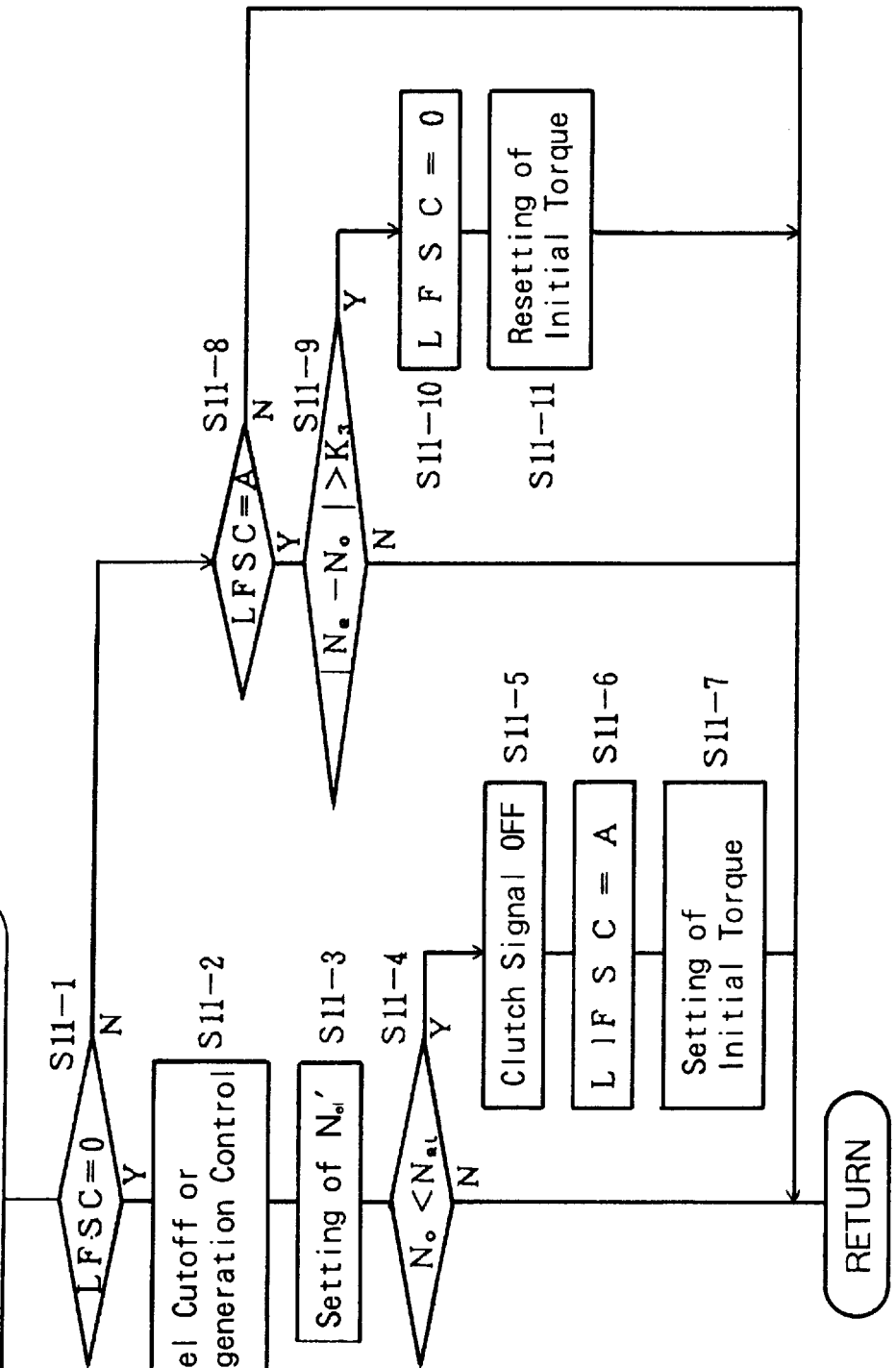
FIG. 10 is a flow chart of the direct coupling clutch release control processing subroutine for step S11 in FIG. 6.
Figure 11:
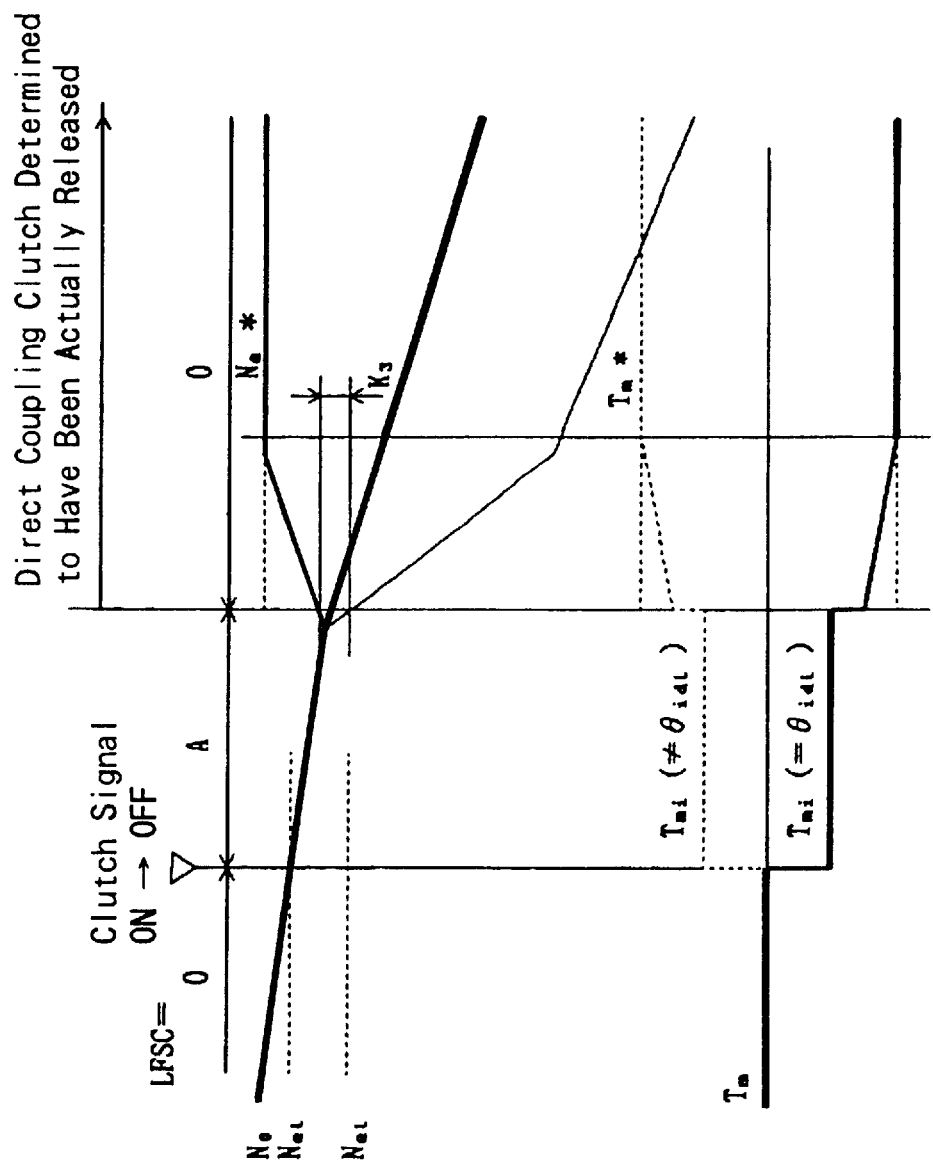
FIG. 11 is a time chart of the direct coupling clutch release control subroutine operations, as shown in FIG. 10.

The direct coupling clutch release control processing subroutine of Step S11 in FIG. 6 will be described. As shown in FIG. 10 this subroutine includes:
Step S11-1: It is determined whether or not a flag LFSC indicating the engaged/disengaged state of the direct coupling clutch CL is 0. When it is 0, processing proceeds to Step S11-2 and when it is not 0, processing proceeds to Step S11-8. When the direct coupling clutch CL is not in an engaging transient state the flag LFSC becomes 0 and when the direct coupling clutch CL is in a releasing transient state the flag LFSC becomes A.
Step S11-2: Based on the battery residual charge determination of Step S7, determination is made to give priority either to fuel cutoff or to regeneration control.
Step S11-3: Based on the result of the priority determination, a set value for release $N_{e1}'$ of the direct coupling clutch CL is read from the direct coupling clutch engagement and disengagement timing map of FIG. 9 and is set. A first set value for release $N_{e1}'$ is used when priority is to be given to regeneration control and a second set value for release $N_{e1}'$ is used when priority is to be given to fuel cutoff, and the first set value for release $N_{e1}'$ is set lower than the second set value for release $N_{e1}$. In FIG. 11, the clutch signal is made ON and OFF based on the second set value for release $N_{e1}'$.

Figure 9:
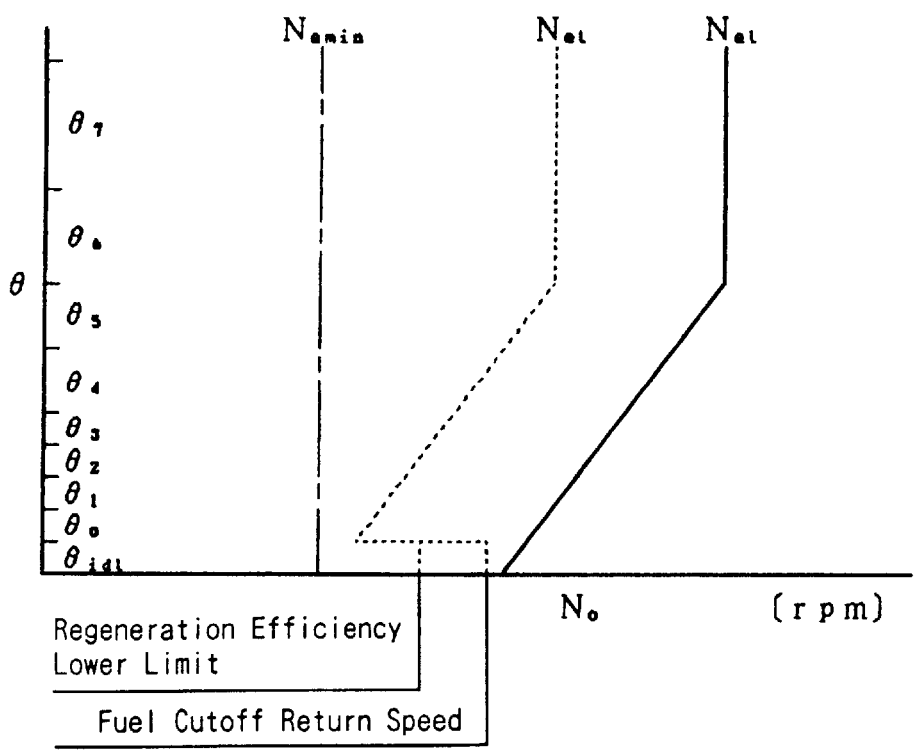
FIG. 9 is a direct coupling clutch engagement and disengagement timing map for the first preferred embodiment of FIG. 1.

As shown in FIG. 9, at times such as when the acceleration demand is high, the throttle opening θ becomes large, and the set values for release $N_{e1}'$ and engaging $N_{e1}$ are made high. As a result, the direct coupling clutch CL can be released quickly and engaged slowly.
Step S11-4: It is determined whether or not the output speed $N_o$ is smaller than the set value for release $N_{e1}'$. When the output speed $N_o$ is smaller than the set value for release $N_{e1}'$ processing proceeds to Step S11-S and when the output speed $N_o$ is greater than the set value for release $N_{e1}'$ processing returns.

Step S11-5: The clutch signal is made OFF.
Step S11-6: Because when the clutch signal is made OFF the direct coupling clutch CL is not immediately released, the flag LFSC is set to A and the releasing transient state is monitored.
Step S11-7: To make the shift from the engine speed $N_e$ to the target engine speed $N_e^*$ smooth, the initial torque $T_{mi}$ of the generator/motor M1 (FIG. 2) is set. The set value for release $N_{e1}'$ when priority is to be given to regeneration control is obtained by setting the throttle opening θ to the idling throttle opening $θ_{id1}$.
Step S11-8: It is determined whether or not the flag LFSC is A. When it is A processing proceeds to Step S11-9 and when it is not A processing returns.
Step S11-9: It is determined whether or not the absolute value of the difference between the engine speed $N_e$ and the output speed $N_o$ is larger than a set value K3. When the absolute value of the difference between the engine speed $N_e$ and the output speed No is larger than the set value $K_3$ processing proceeds to Step S11-10, and when the absolute value of the difference between the engine speed $N_e$ and the output speed $N_o$ is smaller than the set value $K_3$ processing returns.
Step S11-10: It is determined whether or not the direct coupling clutch CL has actually been released, and the flag LFSC is set to 0.
Step S11-11: Because the releasing transient state of the direct coupling clutch CL has ended, the initial torque $T_{mi}$ of the generator/motor M1 is reset. As a result, the braking torque $T_{m1}$ is determined by the feedback control for maintaining the target engine speed $N_e^*$.

Figure 12:
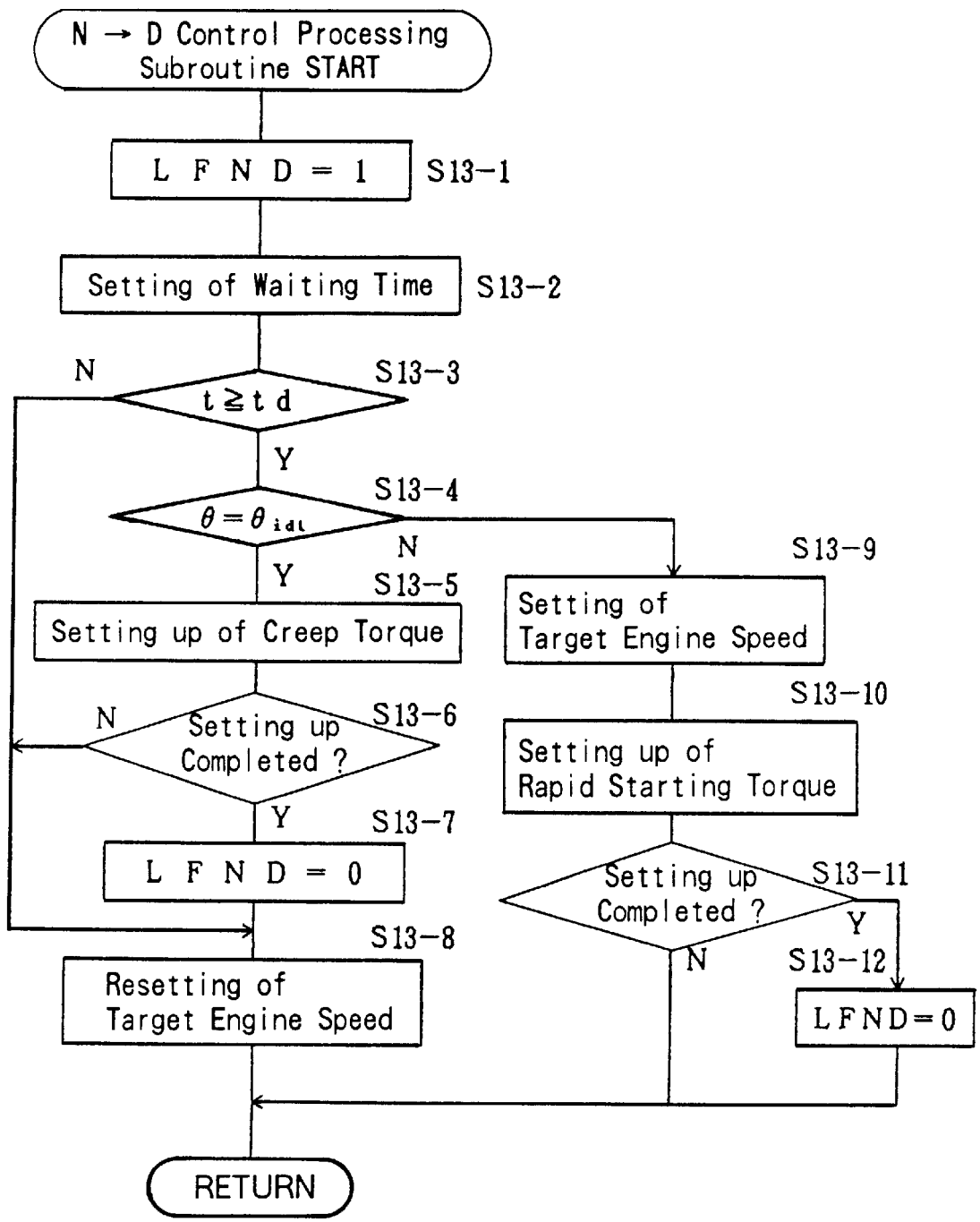
FIG. 12 is a flow chart for the N→D control processing subroutine of step S13 in FIG. 7.
Figure 16:
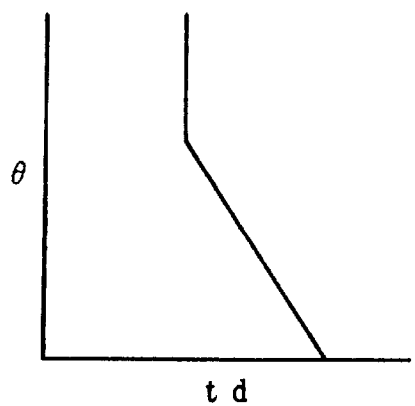
FIG. 16 is a map of waiting time in the first preferred embodiment of FIG. 1.

The N→D control processing subroutine of FIG. 7 will be described as illustrated in FIG. 12, wherein:
Step S13-1: Immediately after N→D control processing is executed, or during N→D control processing execution, a flag LFND is set to 1. When this flag LFND is 1 it indicates that N→D control processing has just been executed or is being executed and otherwise flag LFND is 0.
Step S13-2: When an N→D output is output at a time t3, based on the throttle opening θ a waiting time td for the forward clutch to engage is read from the waiting time map (FIG. 16) and is set. The waiting time td is the time period from when the N→D output is output to when the forward clutch is engaged, and the waiting time td becomes shorter as the throttle opening θ becomes larger.
Step S13-3: It is determined whether or not the time t elapsed from the time t3 is greater than the waiting time td. When the elapsed time t is greater than the waiting time td processing proceeds to Step S13-4 and when the elapsed time t is shorter than the waiting time td processing proceeds to Step S13-8.
Step S13-4: To determine the starting state of the vehicle, it is determined whether or not the throttle opening θ has been set to the idling throttle opening $θ_{id1}$. When it has been set to the idling throttle opening $θ_{id1}$ processing proceeds to Step S13-5, and when it has not been set to the idling throttle opening $θ_{id1}$ processing proceeds to Step S13-9.
Step S13-5: When the throttle opening θ is the idling throttle opening $θ_{id1}$ the system is determined to be in a normal starting state and braking torque setting up means, e.g. electric rotary device controlling means 93, sets up a creep torque $T_c$ during a transition time ts. That is, by gradually increasing the braking torque $T_{m1}$, of the generator/motor M1 (FIG. 2), the torque T output from the starting mechanism 18 is swept up to a creep torque $T_c$. In this way, after an N→D output is output, because current flows through the generator/motor M1, it is possible to prevent an engagement shock accompanying the N→D changeover. Also, because current flows through the generator/motor M1, it is possible to generate a creep force similar to that of a conventional torque convertor.

Step S13-6: It is determined whether or not the setting up of the creep torque $T_c$ has been completed. When the setting up of the creep torque $T_c$ has been completed processing proceeds to Step S13-7, and when it has not been completed processing proceeds to Step S13-8.

Step S13-7:. The flag LFND is set to 0.

Step S13-8: Because the throttle opening θ is the idling throttle opening $θ_{id1}$, the target engine speed $N_e^*$ is reset.

Step S13-9: Because the throttle opening θ is not the idling throttle opening $θ_{id1}$, the target engine speed $N_e^*$ corresponding to the throttle opening θ is set.

Step S13-10: When in the D range the throttle opening θ is suddenly increased, the system is determined to be in a rapid starting state and a rapid starting torque T* is set up. In this case, because the throttle opening θ is large, the waiting time td is made small and the torque T is swept up to a rapid starting torque T*, higher than the creep torque $T_c$, during the transition time ts. The rapid starting torque T* is a potential torque T corresponding to the target engine speed $N_e^*$, and in practice the engine speed $N_e$ is brought to the target engine speed $N_e^*$.

Step S13-11: It is determined whether or not the setting up of the rapid starting torque T* has been completed and the engine speed $N_e$ has become the target engine speed $N_e^*$. When the engine speed $N_e$ has become the target engine speed $N_e^*$ processing proceeds to Step S13-12 and when the engine speed $N_e$ has not reached the target engine speed $N_e^*$ processing returns.

Step S13-12: The flag LFND is set to 0.

Figure 13:
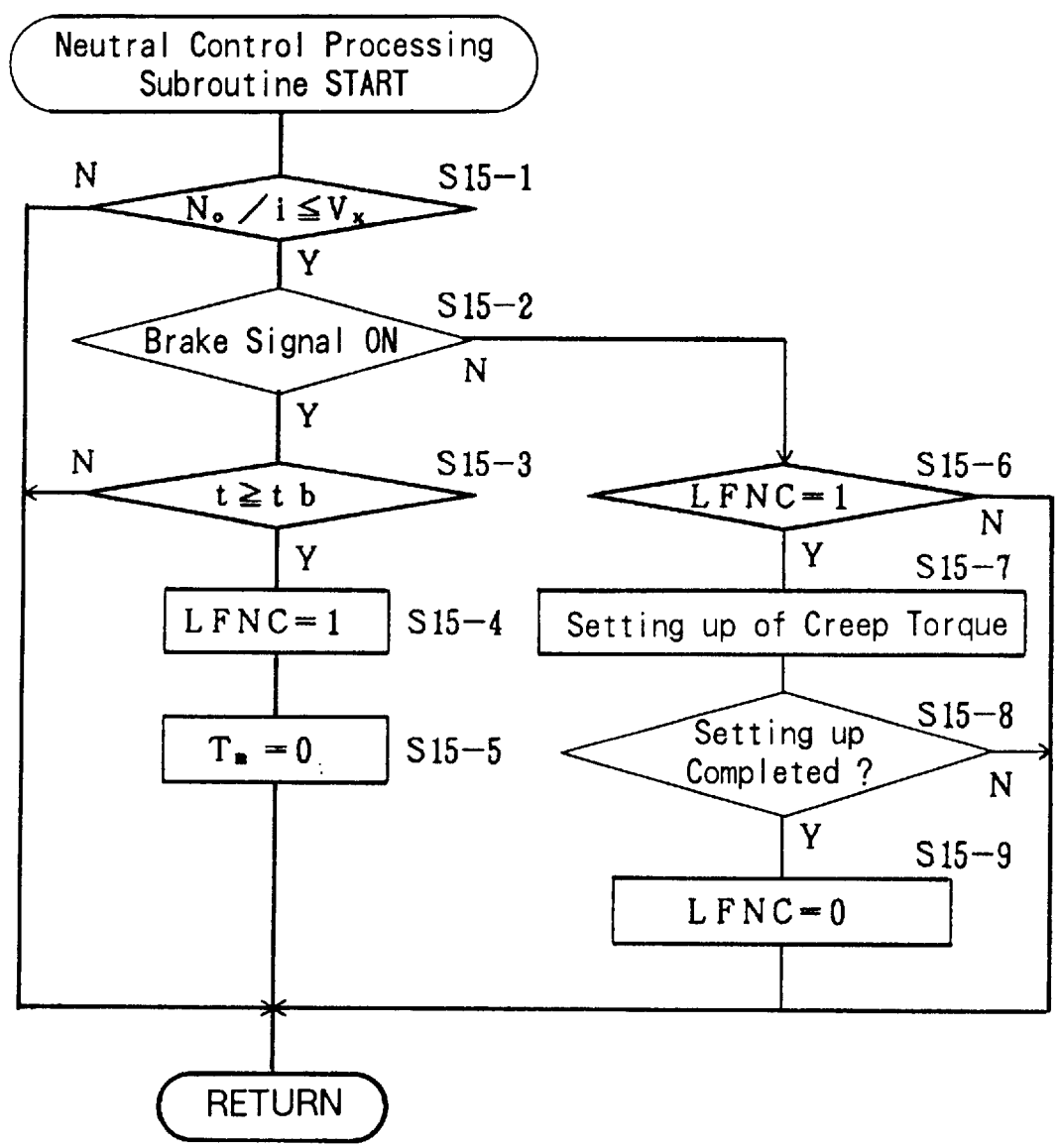
FIG. 13 is a flow chart of the neutral control subroutine of step S15 of FIG. 7.
Figure 14:
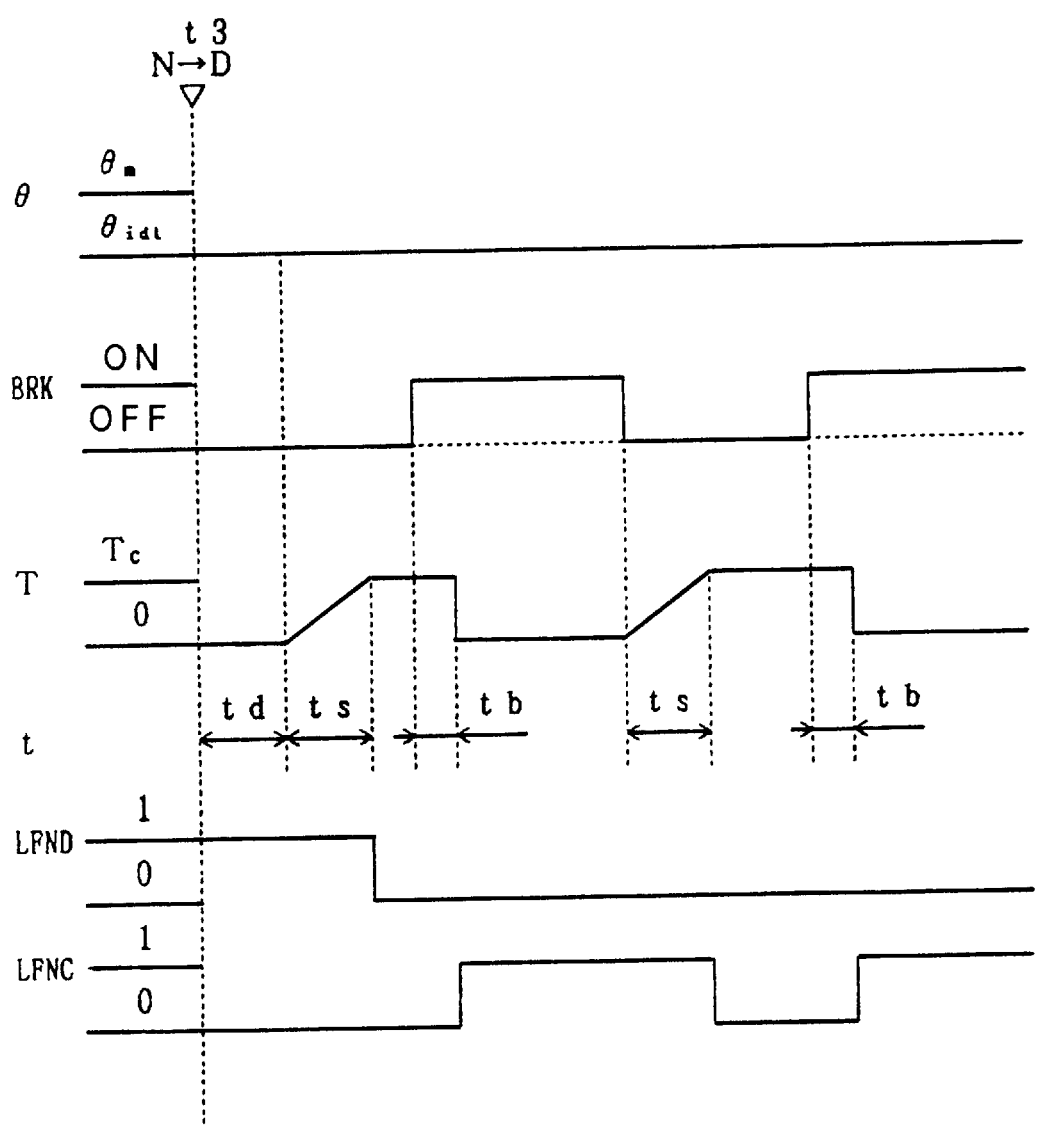
FIG. 14 is a time chart for the setting up of a creep torque in the first preferred embodiment of FIG. 1.
Figure 15:
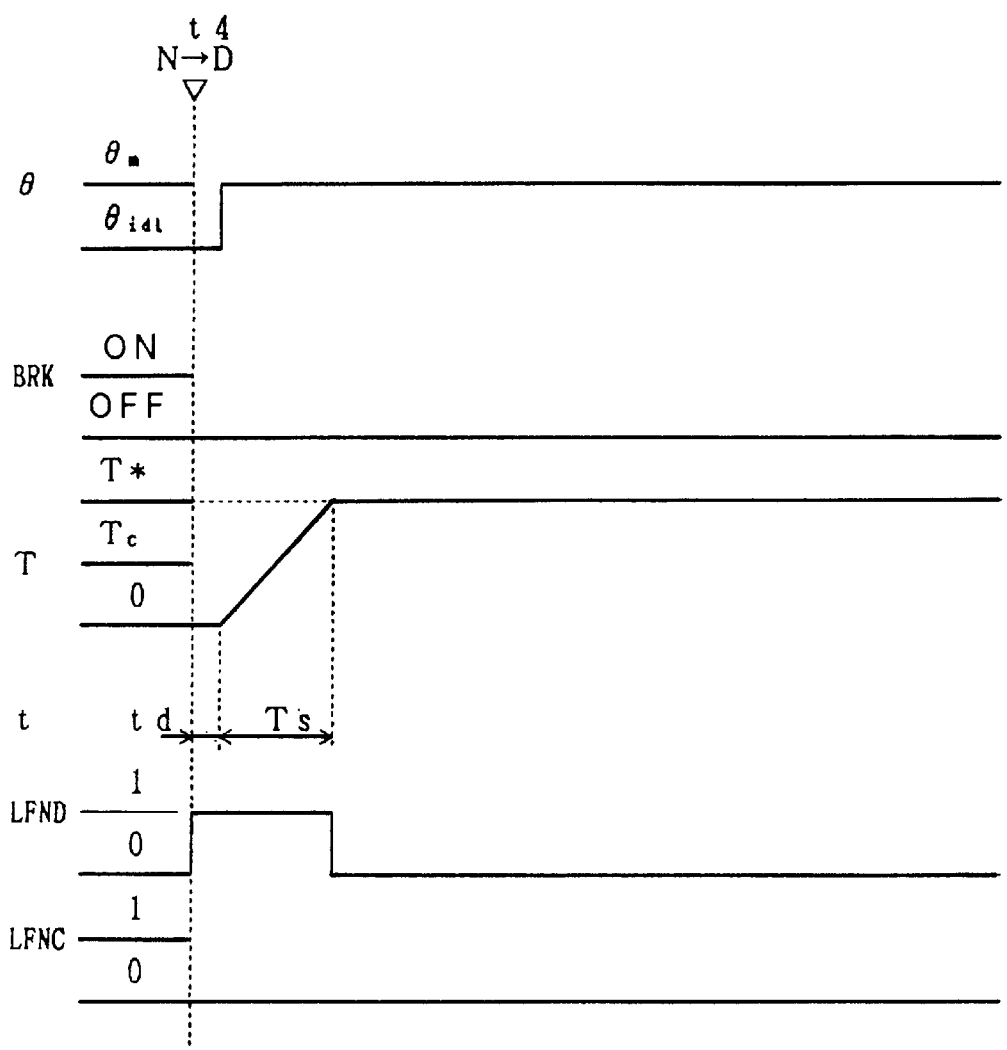
FIG. 15 is a time chart for the setting up of a rapid starting torque in the first preferred embodiment of FIG. 1.

Next, the neutral control processing subroutine will be described with reference to FIG. 13.

Step S15-1: The output speed $N_o$ is divided by the gear ratio i of the transmission 21 (FIG. 2), the vehicle speed value V is calculated, and it is determined whether or not the vehicle speed correspondent value V is less than a set value $V_x$. When there is no transmission 21 on the output side of the gearbox 16, the gear ratio i is made 1. It is also possible to use a vehicle speed correspondent value V already calculated based on a speed detected by the vehicle speed sensor 34.

When the vehicle speed correspondent value V is less than the set value $V_x$ processing proceeds to Step S15-2, and when the vehicle speed correspondent value V is greater than the set value $V_x$ processing returns.

Step S15-2: It is determined whether or not the brake pedal 42 has been depressed, i.e. that the brake signal from the brake sensor 41 is ON. When the brake signal is ON processing proceeds to Step S15-3 and when the brake signal is OFF processing proceeds to Step S15-6. In this case, the throttle opening θ is the idling throttle opening $θ_{id1}$, and when the brake signal is ON, a neutral control state is established.

Step S15-3: With the time at which the brake pedal 42 was depressed and the brake signal became ON as a starting point, timing by a timer (not shown in the drawings) for preventing busy shift is commenced and it is determined whether or not the elapsed time t is greater than a set time tb. When the elapsed time t is greater than the set time tb processing proceeds to Step S15-4 and when the elapsed time t is shorter than the set time tb processing returns.

Step S15-4: A flag LFNC indicating that neutral control processing is being executed is set to 1.

Step S15-5: While neutral control processing is being executed the braking torque $T_{m1}$ is made 0.

Step S15-6: It is determined whether or not the flag LFNC is 1. When the flag LFNC is 1 processing proceeds to Step S15-7 and when the flag LFNC is not 1 processing returns.

Step S15-7: The normal starting state creep torque Tc is set up.

Step S15-8: It is determined whether or not the transition time ts has elapsed and the setting up of the creep torque $T_c$ has been completed. When the setting up of the creep torque $T_c$ has been completed processing proceeds to Step S15-9, and when setting up of the creep torque $T_c$ has not been completed processing returns.

Step S15-9: The flag LFNC is set to 0.

Figure 17:
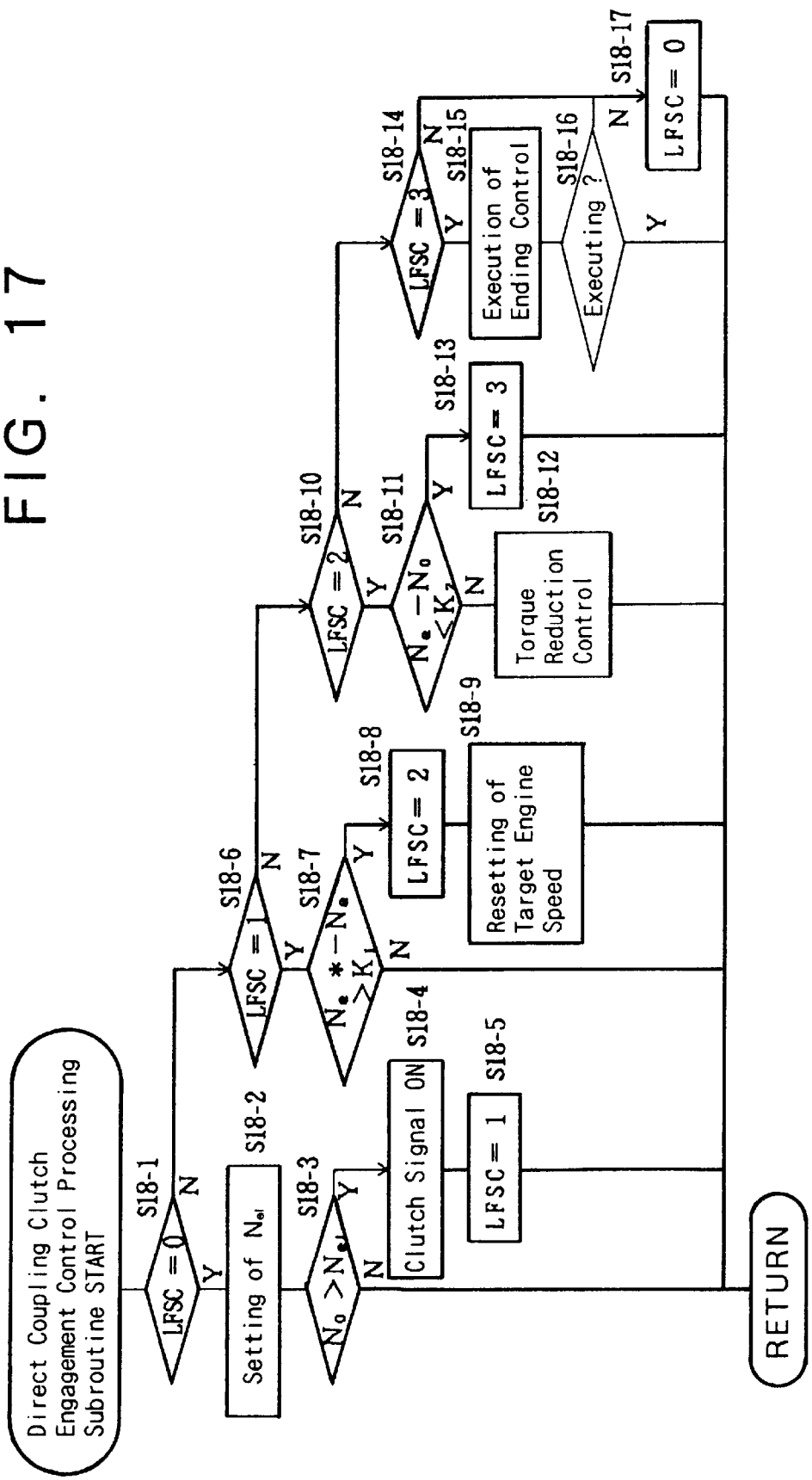
FIG. 17 is a flow chart for the direct coupling clutch engagement control processing subroutine of step S18 in FIG. 7.
Figure 18:
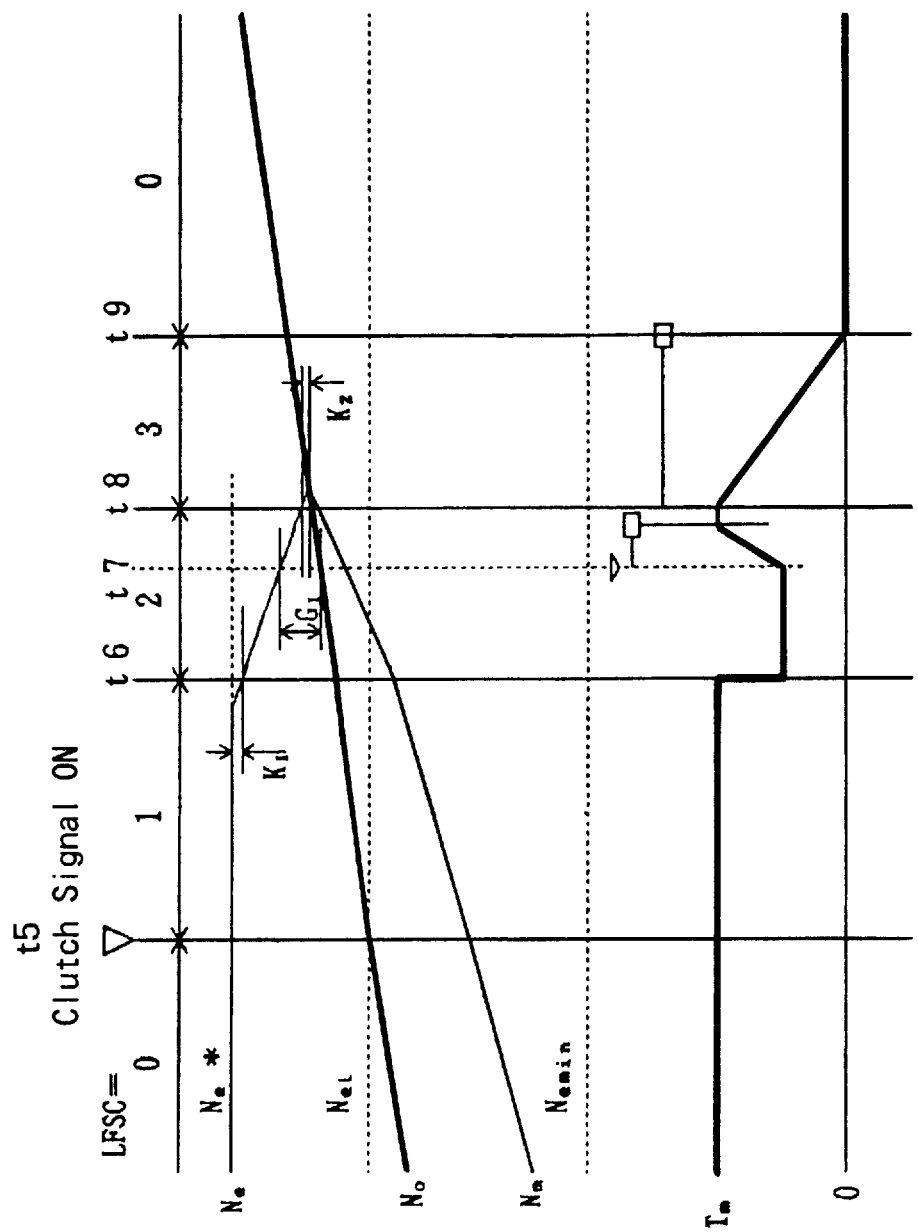
FIG. 18 is a time chart for the direct coupling clutch engagement control processing subroutine of FIG. 17.

Next, the direct coupling clutch engagement control processing subroutine which is step S18 of FIG. 7 will be described with reference to FIG. 17 wherein:

Step S18-1: It is determined whether or not the flag LFSC is 0. When the flag LFSC is 0 processing proceeds to Step S18-2, and when the flag LFSC is not 0 processing proceeds to Step S18-6.

Step S18-2: The set value for engaging $N_{e1}$ of the direct coupling clutch CL (FIG. 3) is read from the direct coupling clutch engagement and disengagement timing map of FIG. 9 and is set.

Step S18-3: The output speed $N_o$ and the set value for engaging $N_{e1}$ are compared and it is determined whether or not the output speed $N_o$ is greater than the set value for engaging $N_{e1}$. When the output speed $N_o$ is greater than the set value for engaging $N_{e1}$ processing proceeds to Step S18-4, and when the output speed $N_o$ is below the set value for engaging $N_{e1}$ processing returns.

Step S18-4: At a time t5 the clutch signal is made ON.

Step S18-5: The flag LFSC is set to 1.

Step S18-6: It is determined whether or not the flag LFSC is 1. When the flag LFSC is 1 processing proceeds to Step S18-7 and when the flag LFSC is not 1 processing proceeds to Step S18-10.

Step S18-7: It is determined whether or not the difference between the target engine speed $N_e^*$ and the engine speed $N_e$ is larger than a set value $K_1$. When the difference is larger than the set value $K_1$, processing proceeds to Step S18-8 and when the difference is smaller than the set value $K_1$ processing returns.

Step S18-8: At a time t6 the flag LFSC is set to 2.

Step S18-9: The engine speed $N_e$ is reset and feedback control is discontinued.

Step S18-10: It is determined whether or not the flag LFSC is 2. When the flag LFSC is 2 processing proceeds to Step S18-11, and when the flag LFSC is not 2 processing proceeds to Step S18-14.

Step S18-11: It is determined whether or not the difference between the engine speed $N_e$ and the output speed $N_o$ is smaller than a set value $K_2$. When the difference is smaller than the set value $K_2$ processing proceeds to Step S18-13, and when the difference is larger than the set value $K_2$ processing proceeds to Step S18-12.

Step S18-12: At the time t6 torque reduction control is commenced in correspondence with the throttle opening θ and the braking torque $T_{m1}$ is reduced by a predetermined amount. In this way, the occurrence of inertia torque accompanying the engagement of the direct coupling clutch CL is suppressed and engagement shock is reduced. When at a time t7 the difference between the engine speed $N_e$ and the output speed $N_o$ becomes smaller than a set value $G_1$, torque reduction control is ended. In this case, the braking torque $T_{m1}$ is swept up to its original value within a set time.

Step S18-13: At a time t8 the flag LFSC is set to 3.

Step S18-14: It is determined whether or not the flag LFSC is 3. When the flag LFSC is 3 processing proceeds to Step S18-15, and when the flag LFSC is not 3 processing proceeds to Step S18-17.

Step S18-15: Ending control processing is executed and the braking torque $T_{m1}$ is swept down to 0 within a set time.

Step S18-16: It is determined whether or not ending control processing is being executed. When ending control processing is being executed and the braking torque $T_{m1}$ has not become 0 processing returns, and when ending control is not being executed and the braking torque $T_{n1}$ has become 0 processing proceeds to Step S18-17.

Step S18-17: When the entire ending control process has been completed the flag LFSC is reset to 0.

Figure 19:
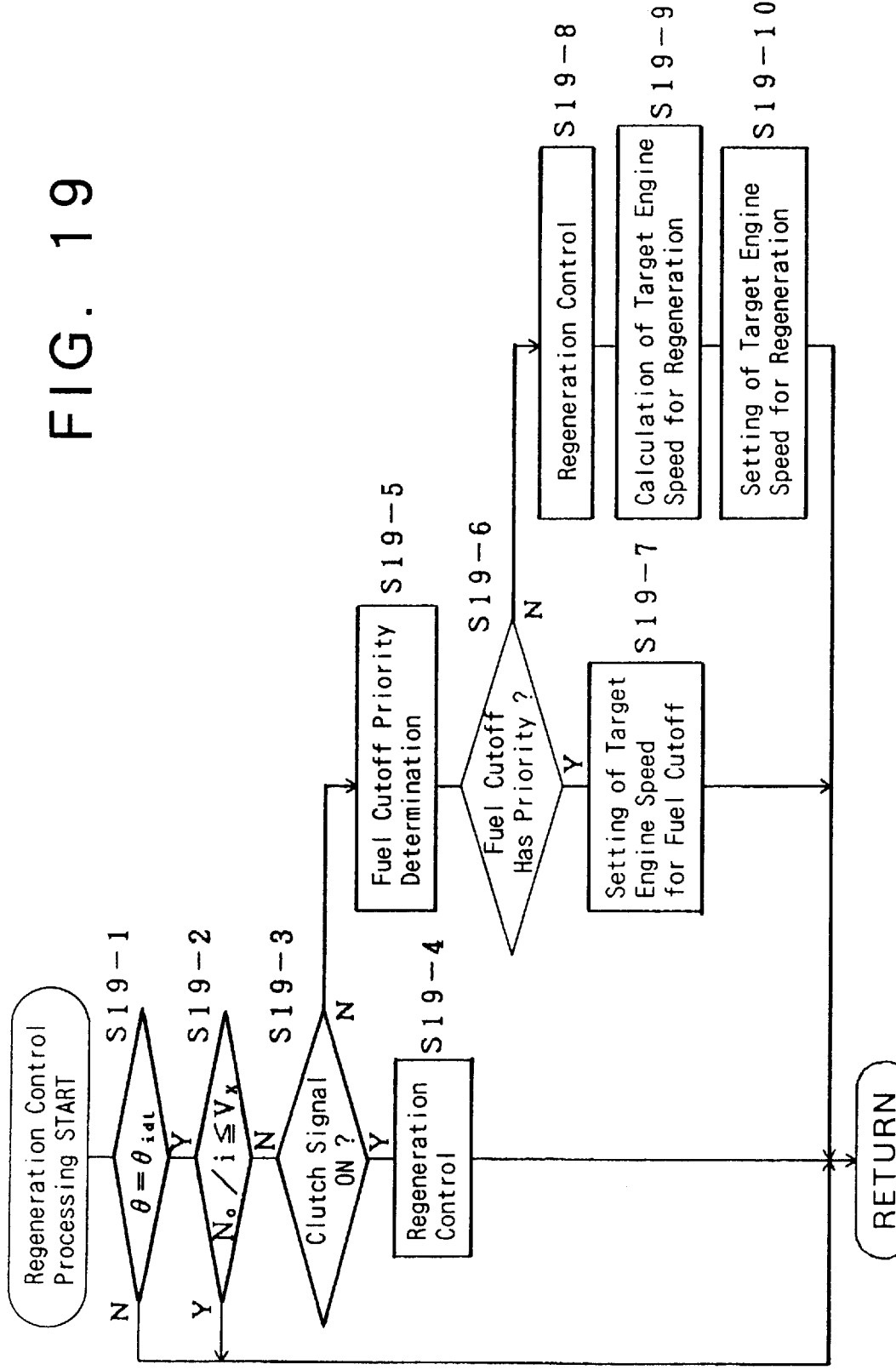
FIG. 19 is a flow chart for the regeneration control processing subroutine of step S19 in FIG. 7.

Next, the regeneration control processing subroutine of Step S19 of FIG. 7 will be described with reference to FIG. 19 wherein:

Step S19-1: It is determined whether or not the throttle opening θ has been set to the idling throttle opening $\theta_{id1}$. When it has been set to the idling throttle opening $\theta_{id1}$ processing proceeds to Step S19-2, and when it has not been set to the idling throttle opening $\theta_{id1}$ processing returns.

Step S19-2: The output speed $N_o$ is divided by the gear ratio i of the transmission 21 (FIG. 2) and the vehicle speed correspondent value V is calculated, and it is determined whether or not the vehicle speed correspondent value V is less than a set value $V_x$. When there is no transmission 21 on the output side of the gearbox 16, the gear ratio is made 1. It is also possible to use a vehicle speed correspondent value V already calculated based on a speed detected by the vehicle speed sensor 34.

When the vehicle speed correspondent value V is below the set value $V_x$ processing returns, and when the vehicle speed correspondent value V is larger than the set value $V_x$ processing proceeds to Step S19-3.

Step S19-3: Because the vehicle is known to be coasting down, it is determined whether or not the clutch signal is ON. When the clutch signal is ON processing proceeds to Step S19-4, and when it is not ON processing proceeds to Step S19-5.

Step S19-4: Regeneration control is carried out and the braking torque $T_{m1}$ is determined according to the brake braking force.

Steps S19-5, S19-6: When the vehicle is coasting down and the direct coupling clutch CL has been released, the generator/motor M1 can be independently controlled and in this state it is determined whether or not priority is to be given to fuel cutoff. In this case, whether or not priority is to be given to fuel cutoff is determined according to the battery residual charge determination of Step S7. When there is a large charge remaining, because there is no need to regenerate, fuel cutoff is given priority and processing proceeds to Step S19-7; when there is little remaining charge, because regeneration is necessary, processing proceeds to Step S19-8.

Figure 21:
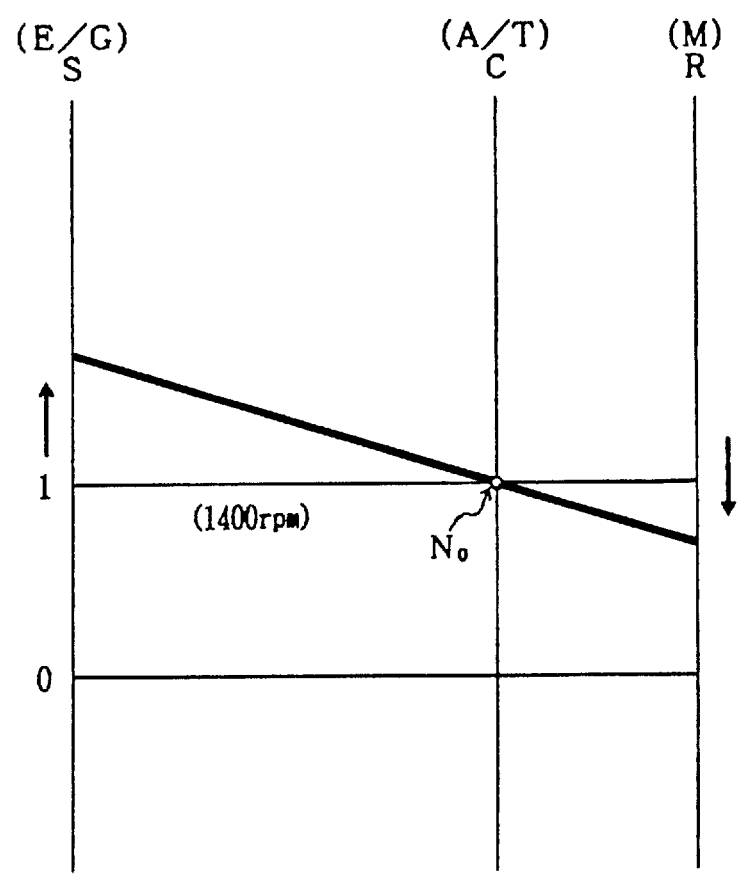
FIG. 21 is a speed line diagram for when fuel cutoff is given priority in the first preferred embodiment of the invention.

Step S19-7: A preset target engine speed $N_e^*$ (FC) for fuel cutoff is set so that the engine speed $N_e$ becomes higher than a fuel cutoff return point (1400 rpm). As shown in the speed line diagram of FIG. 21, the generator/motor speed $N_{m1}$ can be reduced and the engine speed $N_e$ increased.

Figure 22:
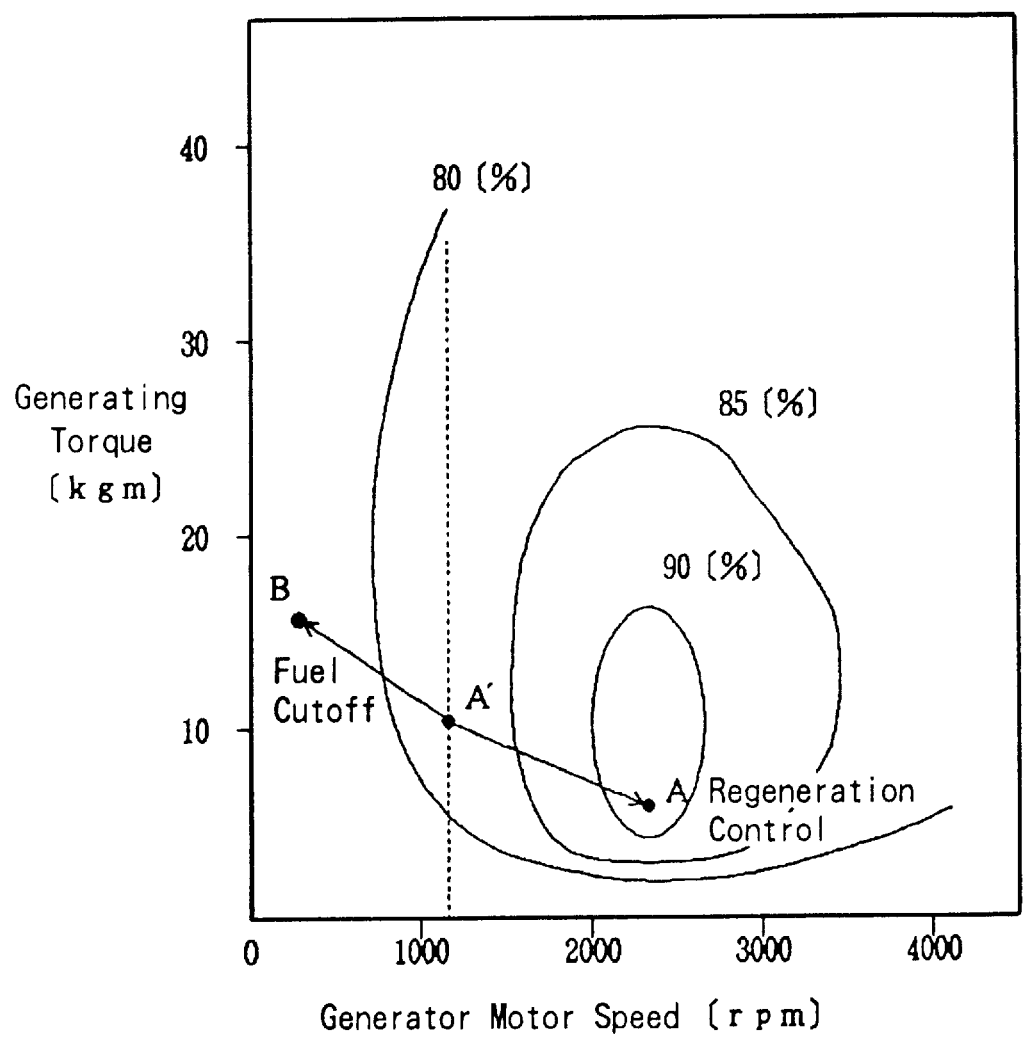
FIG. 22 is an electricity generation efficiency map for a generator/motor in the first preferred embodiment of the invention.

For example, when during coasting down the engine speed $N_e$ nears 1400 rpm (point A' in FIG. 22), the direct coupling clutch CL is released, the generator/motor speed $N_{m1}$ is reduced (point B in FIG. 22) and the engine speed $N_e$ is increased. Because the engine speed $N_e$ increases it is possible to continue the fuel cutoff and thereby reduce fuel consumption.

Step S19-8: When priority is not given to fuel cutoff and is given to regeneration control, a generation torque $T_{m1g}$ of the generator/motor M1 is determined according to the brake braking force.

Figure 20:
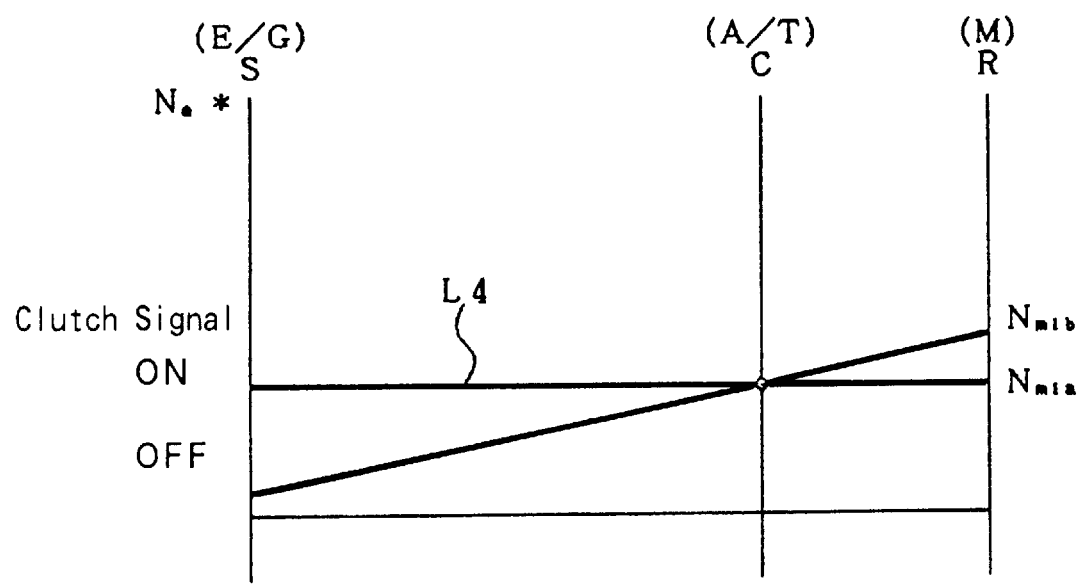
FIG. 20 is a speed line diagram for when regeneration control is given priority in the first preferred embodiment of the invention.

In FIG. 20 it is assumed that the motor generation efficiency is high when the generator/motor speed $N_{m1}$ is kept in the region of high generation efficiency, between a minimum value $N_{m1a}$ and a maximum value $N_{m1b}$. Accordingly, when the clutch signal is made ON and regeneration is being carried out with the direct coupling clutch CL engaged, as shown by the speed line L4, and the generator/motor speed $N_{m1}$ then falls to the minimum value $M_{m1a}$, the clutch signal is made OFF and the direct coupling clutch CL is released. As a result, it is possible to increase the generator/motor speed $N_{m1}$ and to keep it in the region of high generation efficiency, between the minimum value $N_{m1a}$ and the maximum value $N_{m1b}$, and the amount of electrical power regenerated is thereby increased.

Step S19-9: Based on the generation torque $T_{m1g}$, engine torque data is read out and a target engine speed $N_e^*$ (RG) for regeneration is calculated. At the point A of the generation efficiency map of FIG. 22, the generation efficiency is high.

Step S19-10: The calculated target engine speed $N_e^*$ (RG) for regeneration is set.

A second preferred embodiment of the invention will now be described with reference to FIGS. 23 and 24.

Figure 23:
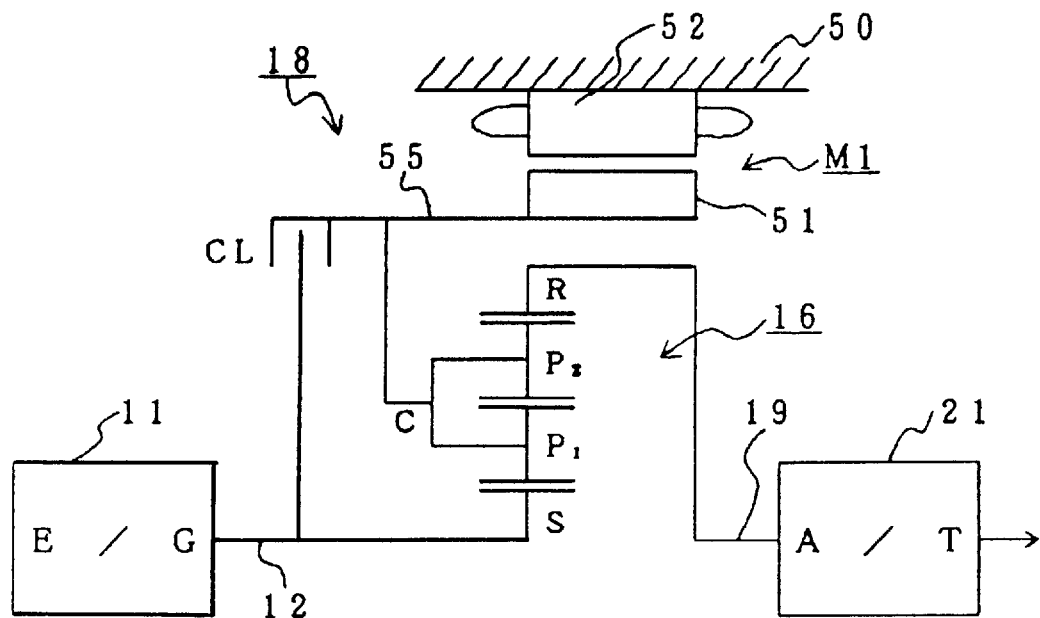
FIG. 23 is a schematic view of a drive system of a second preferred embodiment of the invention.
Figure 24:
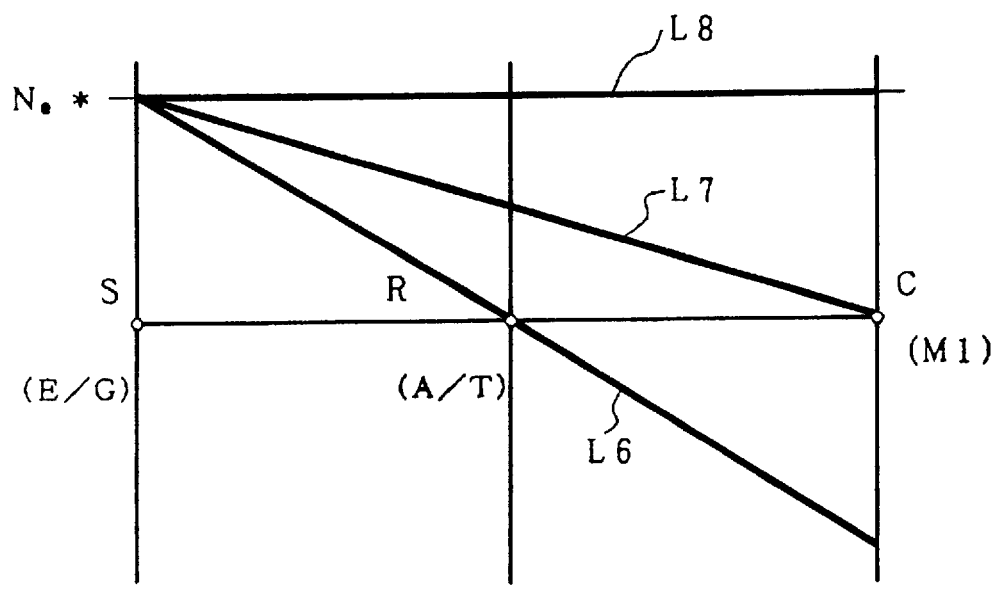
FIG. 24 is a speed line diagram for the second preferred embodiment of the invention.

In FIG. 23, 11 is an engine, 12 is an engine output shaft, M1 is a generator/motor, 16 is a gearbox, 18 is a drive mechanism, 19 is an output shaft of the drive mechanism 18, 21 is a transmission and 50 is a drive mechanism case.

The gearbox 16 comprises a double planetary gear unit, and this double planetary gear unit is made up of a sun gear S, pinions $P_1$ and $P_2$, a ring gear R and a carrier C rotatably supporting the pinions $P_1$ and $P_2$. The sun gear S is fixed to the engine output shaft 12 and the carrier C is fixed to a generator/motor rotary shaft 55. The generator/motor M1 is made up of a rotor 51 and a stator 52, the rotor 51 being fixed to the generator/motor rotary shaft 55 and the stator 52 being fixed to the drive mechanism case 50. The ring gear R is fixed to the output shaft 19.

A direct coupling clutch CL is disposed between the generator/motor rotary shaft 55 and the engine output shaft 12, and through engagement of this direct coupling clutch CL the carrier C and the sun gear S are locked together and the gearbox 16 thereby directly coupled. In this preferred embodiment the carrier C and the sun gear S are locked together, but alternatively the ring gear R and the carrier C or the ring gear R and the sun gear S may be locked. In this case, because a double planetary gear unit is used, the reduction ratio of the gearbox 16 can easily be set to a value in the vicinity of 2.

In the drive system thus constructed, when a shift lever (not shown in the drawings) is operated to select a D range to start a vehicle moving, rotation at an idling speed $N_{id1}$ (FIG. 5) is transmitted to the sun gear S but, as a result of the forward clutch being engaged, the inertia of the vehicle is transmitted to the output shaft 19 and the output speed $N_o$ is 0. As a result, the speed line becomes the line L6 in the speed line diagram of FIG. 24 and the generator/motor M1 is rotated as a load in the regenerating mode.

When the driver then depresses the accelerator pedal 28 (FIG. 2) and increases the throttle opening θ from the idling throttle opening $\theta_{id1}$ to a throttle opening $\theta_m$, a target engine speed $N_e^*$ corresponding to the throttle opening $\theta_m$ is set. When the driver depresses the accelerator pedal 28 further and increases the throttle opening θ, a target engine speed $N_e^*$ corresponding to the throttle opening $\theta_m$ is set and, in the automatic transmission control unit 36, feedback control is carried out so that a braking torque $T_{m1}$ is produced by the generator/motor M1 and the target engine speed $N_e^*$ is maintained. At this time, along with the feedback control, because a torque is transmitted to the output shaft 19, the output shaft speed $N_o$ also gradually increases. When the generator/motor speed $N_{m1}$ becomes 0, the generator/motor M1 shifts from the regenerating mode to the driving mode. At this time the speed line becomes the line L7.

Thereafter, as acceleration is continued, the generator/motor speed $N_{m1}$ continues to rise while the target engine speed $N_e^*$ is maintained unchanged. When the direct coupling clutch CL is engaged and the gearbox 16 becomes directly coupled, the rotation of the engine output shaft 12 is transmitted unchanged to the output shaft 19. As a result, the engine speed $N_e$, the output speed $N_o$ and the generator/motor speed $N_{m1}$ become equal and the speed line becomes the line L8.

A third preferred embodiment of the invention will now be described with reference to FIGS. 25 and 26.

Figure 25:
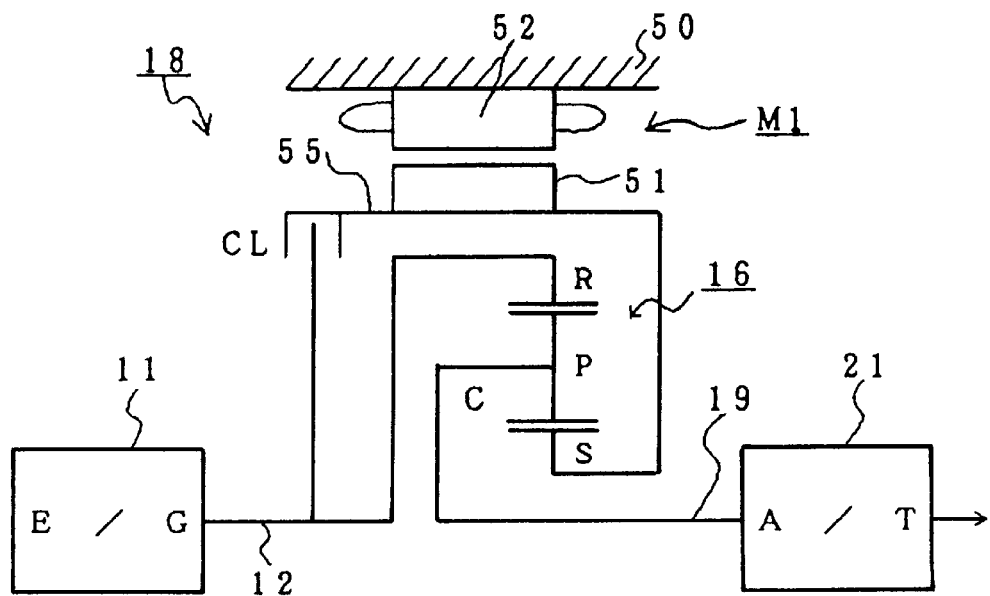
FIG. 25 is a schematic view of a drive system of a third preferred embodiment of the invention.
Figure 26:
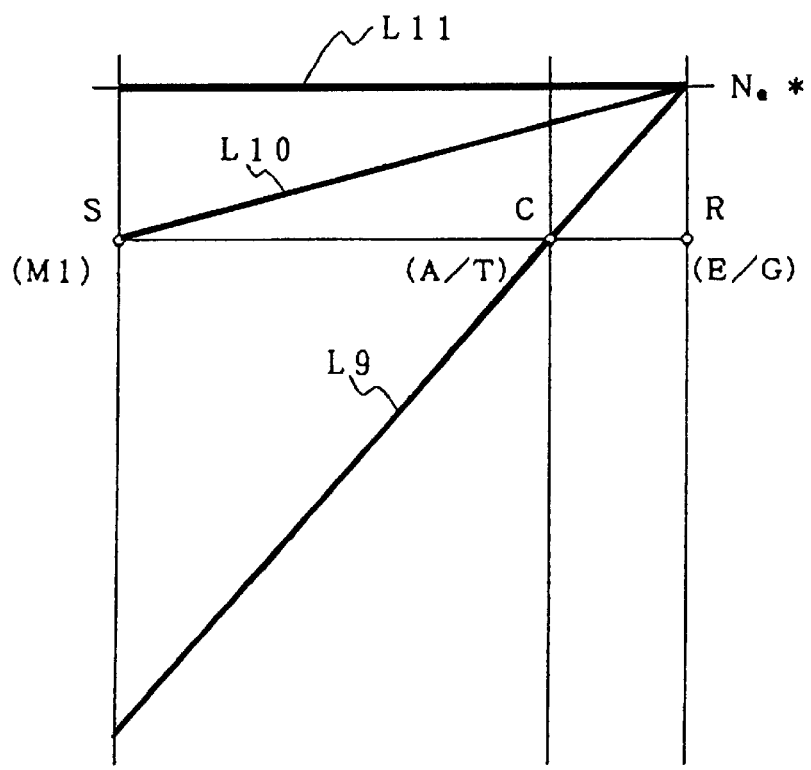
FIG. 26 is a speed line diagram for the third preferred embodiment of the invention.

In FIG. 25, 11 is an engine, 12 is an engine output shaft, M1 is a generator/motor, 16 is a gearbox, 18 is a drive mechanism, 19 is an output shaft of the drive mechanism 18, 21 is a transmission and 50 is a drive mechanism case.

The gearbox 16 comprises a planetary gear unit, and this planetary gear unit is made up of a sun gear S, a pinion P, a ring gear R and a carrier C rotatably supporting the pinion P. The sun gear S is fixed to the generator/motor rotary shaft 55, the carrier C is fixed to the output shaft 19 and the ring gear R is fixed to the engine output shaft 12. The generator/motor M1 is made up of a rotor 51 and a stator 52, the rotor 51 being fixed to the generator/motor rotary shaft 55 and the stator 52 being fixed to the drive mechanism case 50.

A direct coupling clutch CL is disposed between the generator/motor rotary shaft 55 and the engine output shaft 12, and by engagement of this direct coupling clutch CL the ring gear R and the sun gear S can be locked together and the gearbox 16 thereby directly coupled. In this preferred embodiment the ring gear R and the sun gear S are locked together but, alternatively, the ring gear R and the carrier C or the carrier C and the sun gear S may be locked together.

In the drive system thus constructed, when a shift lever (not shown in the drawings) is operated to select a D range and to start the vehicle moving, rotation at an idling speed $N_{id1}$ (FIG. 5) is transmitted to the sun gear S but, as a result of the forward clutch being engaged, the inertia of the vehicle is transmitted to the output shaft 19 and the output speed $N_o$ is 0. As a result, the speed line becomes the line L9 in the speed line diagram of FIG. 26 and the generator/motor M1 is rotated as a load in the regenerating mode.

When the driver then depresses the accelerator pedal 28 (FIG. 2) and increases the throttle opening θ from the idling throttle opening $θ_{id1}$ to a throttle opening $θ_m$, a target engine speed $N_e^*$ corresponding to the throttle opening $θ_m$ is set. When the driver depresses the accelerator pedal 28 further and increases the throttle opening θ a target engine speed $N_e^*$ corresponding to the throttle opening $θ_m$ is set and, in the automatic transmission control unit 36, feedback control is carried out so that a braking torque $T_{m1}$ generated by the generator/motor M1 is produced and the target engine speed $N_e^*$ is maintained. At this time, along with the feedback control, because a torque is transmitted to the output shaft 19, the output shaft speed $N_o$ also gradually increases. When the generator/motor speed $N_{m1}$ becomes 0, the generator/motor M1 shifts from the regenerating state to a driving state. At this time the speed line becomes the line L10.

Thereafter, as acceleration is continued, the generator/motor speed $N_{m1}$ continues to rise while the target engine speed $N_e^*$ is maintained unchanged. When the direct coupling clutch CL is engaged and the gearbox 16 becomes directly coupled, the rotation of the engine output shaft 12 is transmitted unchanged to the output shaft 19. As a result, the engine speed $N_e$, the output speed No and the generator/motor speed $N_{m1}$ become equal and the speed line becomes the line L11.

A fourth preferred embodiment of the invention will now be described with reference to FIGS. 27 and 28.

Figure 27:
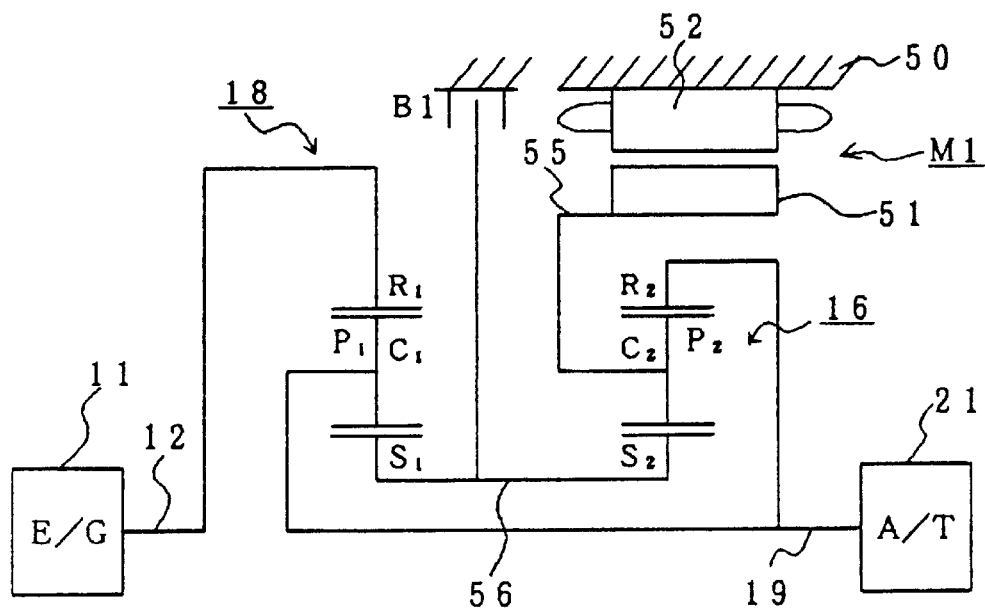
FIG. 27 is a schematic view of a drive system of a fourth preferred embodiment of the invention.
Figure 28:
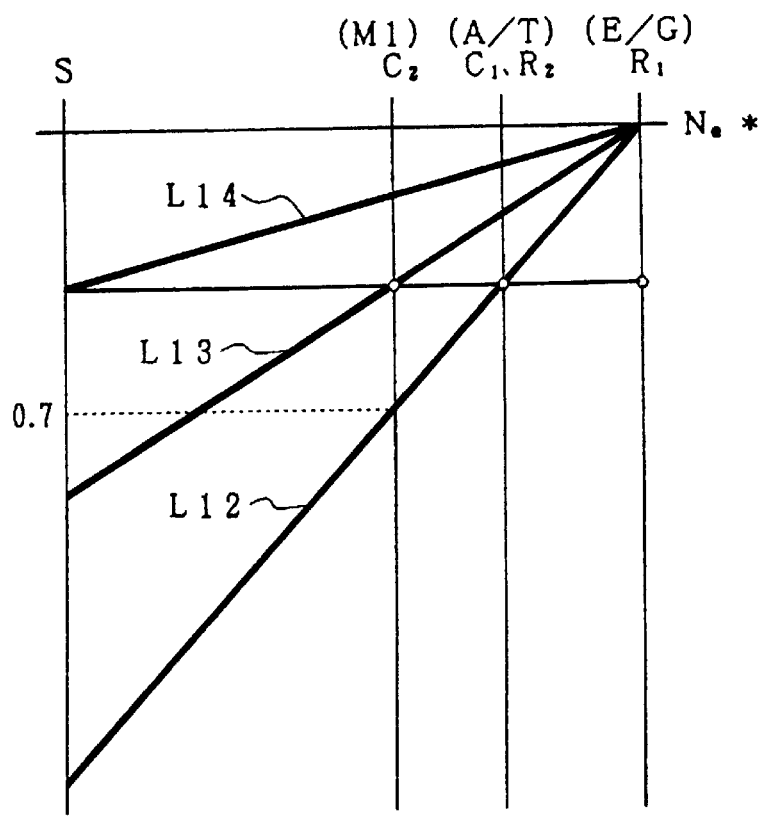
FIG. 28 is a speed line diagram for the fourth preferred embodiment of the invention.

In FIG. 27, 11 is an engine, 12 is an engine output shaft, M1 is a generator/motor, 16 is a gearbox, 18 is a drive mechanism, 19 is an output shaft of the drive mechanism 18, 21 is a transmission and 50 is a drive mechanism case.

The gearbox 16 comprises a first planetary gear unit and a second planetary gear unit. The first planetary gear unit is made up of a sun gear $S_1$, a pinion $P_3$, a ring gear $R_1$ and a carrier $C_1$ rotatably supporting the pinion $P_1$, and the second planetary gear unit is made up of a sun gear $S_2$, a pinion $P_2$, a ring gear $R_2$ and a carrier $C_2$ rotatably supporting the pinion $P_2$. The sun gear $S_1$ is fixed to a sun gear shaft 56, the carrier $C_1$ is fixed to the output shaft 19 and the ring gear $R_1$ is fixed to the engine output shaft 12. The sun gear S2 is fixed to the sun gear shaft 56, the carrier $C_2$ is fixed to the generator/motor rotary shaft 55 and the ring gear $R_2$ is fixed to the output shaft 19.

The generator/motor M1 is made up of a rotor 51 and a stator 52. The rotor 51 is fixed to the generator/motor rotary shaft 55 and the stator 52 is fixed to the drive mechanism case 50.

A brake $B_1$ is disposed between the sun gear shaft 56 and the drive mechanism case 50, and by this brake $B_1$ being engaged the sun gears $S_1$ and $S_2$ can be held stationary and the gearbox 16 thereby directly coupled with a predetermined gear ratio i. In this case, because it is possible to obtain the predetermined gear ratio i in the directly coupled state of the gearbox 16, upon starting vehicle motion from a stop it is possible to make the vehicle torque T large. Also, engagement shock when the brake $B_1$ is engaged can be suppressed.

In the drive thus constructed, when a shift lever (not shown in the drawings) is operated to select D range and start the vehicle moving, rotation at an idling speed $N_{id1}$ (FIG. 5) is transmitted to the sun gears $S_1$ and $S_2$ but, as a result of the forward clutch being engaged, the inertia of the vehicle is transmitted to the output shaft 19 and the output speed $N_o$ is 0. As a result, the speed line becomes the line L12 in the speed line diagram of FIG. 28 and the generator/motor M1 is rotated as a load in the regenerating mode.

When the driver then depresses the accelerator pedal 28 (FIG. 2) and increases the throttle opening θ from the idling throttle opening $θ_{id1}$ to a throttle opening $Θ_m$, a target engine speed $N_e^*$ corresponding to the throttle opening $θ_m$ is set. When the driver depresses the accelerator pedal 28 further and increases the throttle opening θ a target engine speed $N_e^*$ corresponding to the throttle opening $θ_m$ is set, and the automatic transmission control unit 36 executes feedback control so that a braking torque $T_{m1}$ generated by the generator/motor M1 is produced and the target engine speed $N_e^*$ is maintained. At this time, along with the feedback control, because a torque is transmitted to the output shaft 19, the output shaft speed $N_o$ also gradually increases. When the generator/motor speed $N_{m1}$ becomes 0, the generator/motor M1 shifts from the regenerating mode to the driving mode. At this time the speed line becomes the line L13.

Thereafter, as acceleration is continued, the generator/motor speed $N_{m1}$ continues to rise while the target engine speed $N_e^*$ is maintained unchanged. When the brake $B_1$ is engaged and the gearbox 16 becomes directly coupled, the rotation of the engine output shaft 12 is reduced in speed according to the gear ratio i and transmitted to the output shaft 19. As a result, the speed line becomes the line L14.

The generator/motor speed $N_{m1}$ during regeneration is 0.7 times the engine speed $N_e$.

Figure 29:
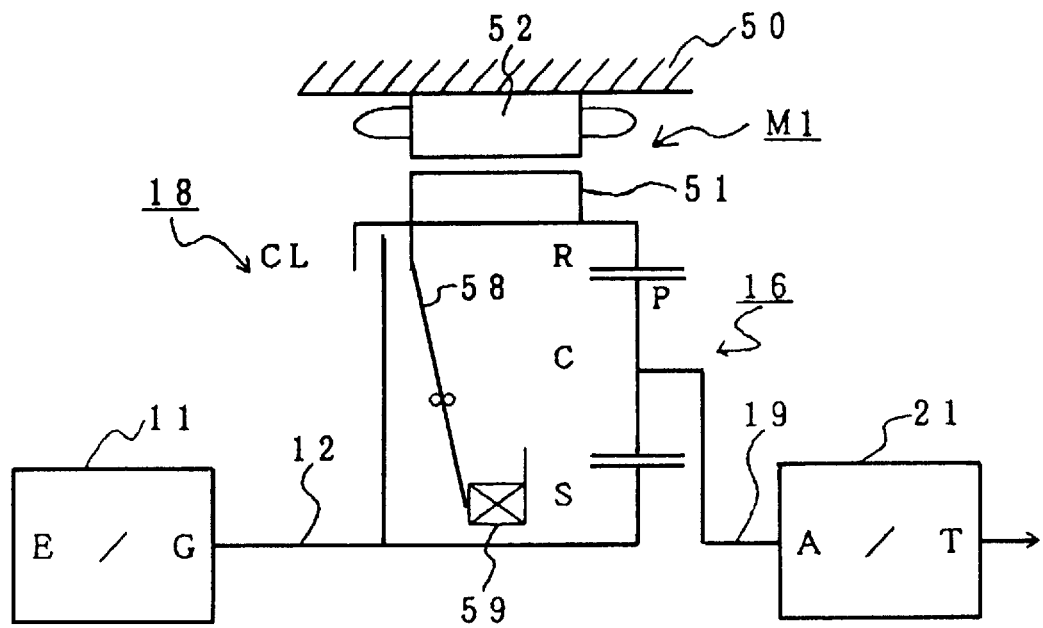
FIG. 29 is a schematic view of a drive system of a fifth preferred embodiment of the invention.
Figure 30:
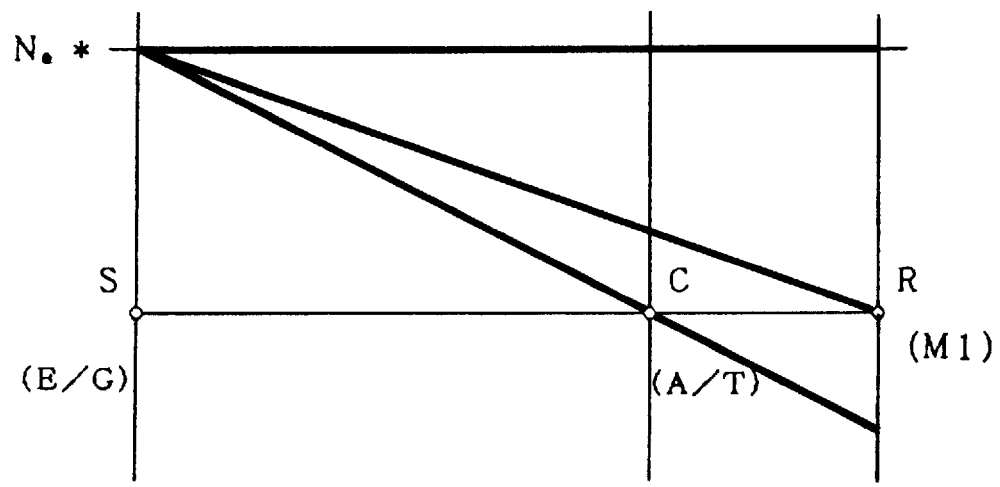
FIG. 30 is a speed line diagram for the fifth preferred embodiment of the invention.

A fifth preferred embodiment of the invention will now be described with reference to FIGS. 29 and 30.

In the figures, 11 is an engine, 12 is an engine output shaft, M1 is a generator/motor, 16 is a gearbox, 18 is a drive mechanism, 19 is an output shaft of the drive mechanism 18, 21 is a transmission and 50 is a drive mechanism case.

The gearbox 16 comprises a planetary gear unit, and this planetary gear unit is made up of a sun gear S, a pinion P, a ring gear R and a carrier C rotatably supporting the pinion P. The sun gear S is fixed to the engine output shaft 12 and the carrier C is fixed to the output shaft 19. The generator/motor M1 is made up of a rotor 51 and a stator 52. The rotor 51 is fixed to the ring gear R and the stator 52 is fixed to the drive mechanism case 50.

A direct coupling clutch CL of the normally closed type is disposed between the ring gear R and the engine output shaft 12 and, by this direct coupling clutch CL being engaged, the ring gear R and the sun gear S can be locked together and the gearbox 16 thereby directly coupled. In this preferred embodiment the ring gear R and the sun gear S are locked together but, alternatively, it may be the ring gear R and the carrier C or the carrier C and the sun gear S that are locked together.

A diaphragm spring 58 is connected to the direct coupling clutch CL, and a release bearing 59 is connected to the diaphragm spring 58. The release bearing 59 is connected to a hydraulic cylinder by way of a release fork (not shown in the drawings). The diaphragm spring 58 urges the clutch to engage and, when no hydraulic pressure is being supplied to the hydraulic cylinder, the direct coupling clutch CL is engaged.

As a result, the direct coupling clutch CL can be engaged and the generator/motor M1 and the engine 11 thereby connected even when the engine 11 is not running and hydraulic pressure is not being produced in the hydraulic circuit 23 (FIG. 2). Consequently the generator/motor M1 can also be used as a starter motor and, when the engine 11 is not running, it is possible to start the engine 11 by driving the generator/motor M1.

When the engine 11 is driven a hydraulic pressure is produced in the hydraulic circuit 23, a hydraulic pressure is supplied to the hydraulic cylinder and the direct coupling clutch CL is released. In this case, the speed line diagram of FIG. 30 is the same as the speed line diagram of FIG. 4.

Figure 31:
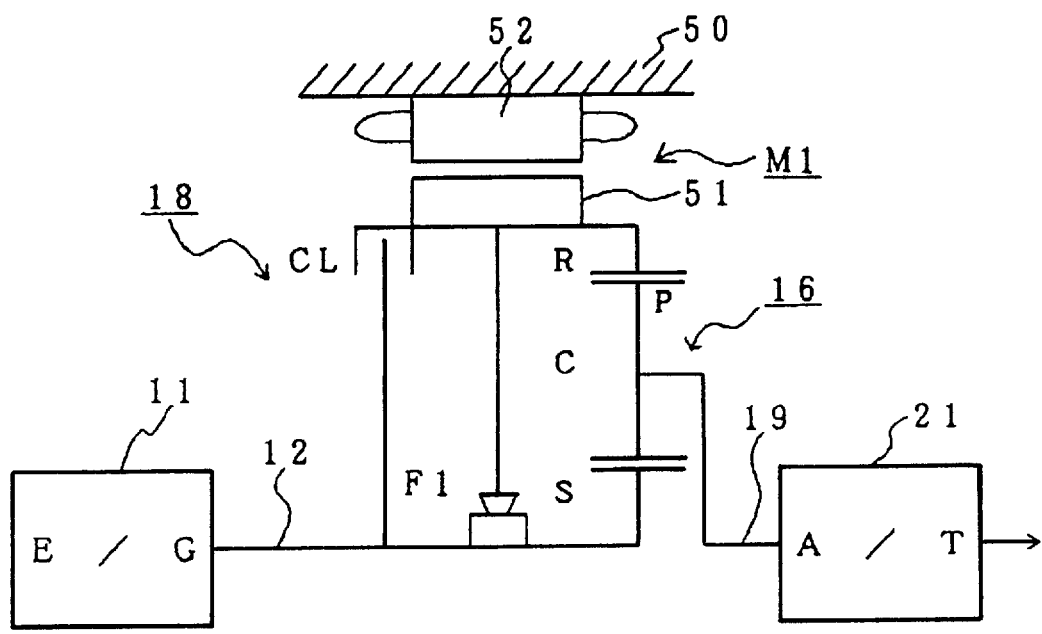
FIG. 31 is a schematic view of a drive system of a sixth preferred embodiment of the invention.

A sixth preferred embodiment of the invention will now be described with reference to FIGS. 31 and 32.

In the figures, 11 is an engine, 12 is an engine output shaft, M1 is a generator/motor, 16 is a gearbox, 18 is a drive mechanism, 19 is an output shaft of the drive mechanism 18, 21 is a transmission and 50 is a drive mechanism case.

The gearbox 16 comprises a planetary gear unit, and this planetary gear unit is made up of a sun gear S, a pinion P, a ring gear R and a carrier C rotatably supporting the pinion P. The sun gear S is fixed to the engine output shaft 12 and the carrier C is fixed to the output shaft 19. The generator/motor M1 is made up of a rotor 51 and a stator 52. The rotor 51 is fixed to the ring gear R and the stator 52 is fixed to the drive mechanism case 50.

A direct coupling clutch CL is disposed between the ring gear R and the engine output shaft 12 and, by this direct coupling clutch CL being engaged, the ring gear R and the sun gear S can be locked together and the gearbox 16 thereby directly coupled. In this preferred embodiment the ring gear R and the sun gear S are locked together but, alternatively, the ring gear R and the carrier C or the carrier C and the sun gear S may be locked together.

A one-way clutch $F_1$, locking only in the direction in which it rotates the engine 11, is disposed between the ring gear R and the sun gear S. Consequently, the generator/motor M1 can also be used as a starter motor and, when the engine 11 is not running, it is possible to start the engine 11 by driving the generator/motor M1.

Figure 4:
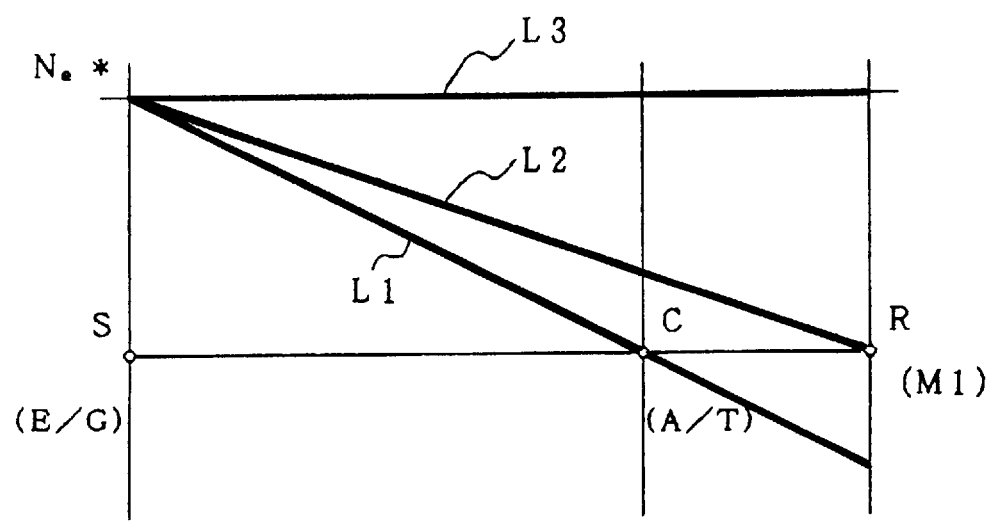
FIG. 4 is a graph or speed line diagram for the first preferred embodiment of FIG. 1.
Figure 5:
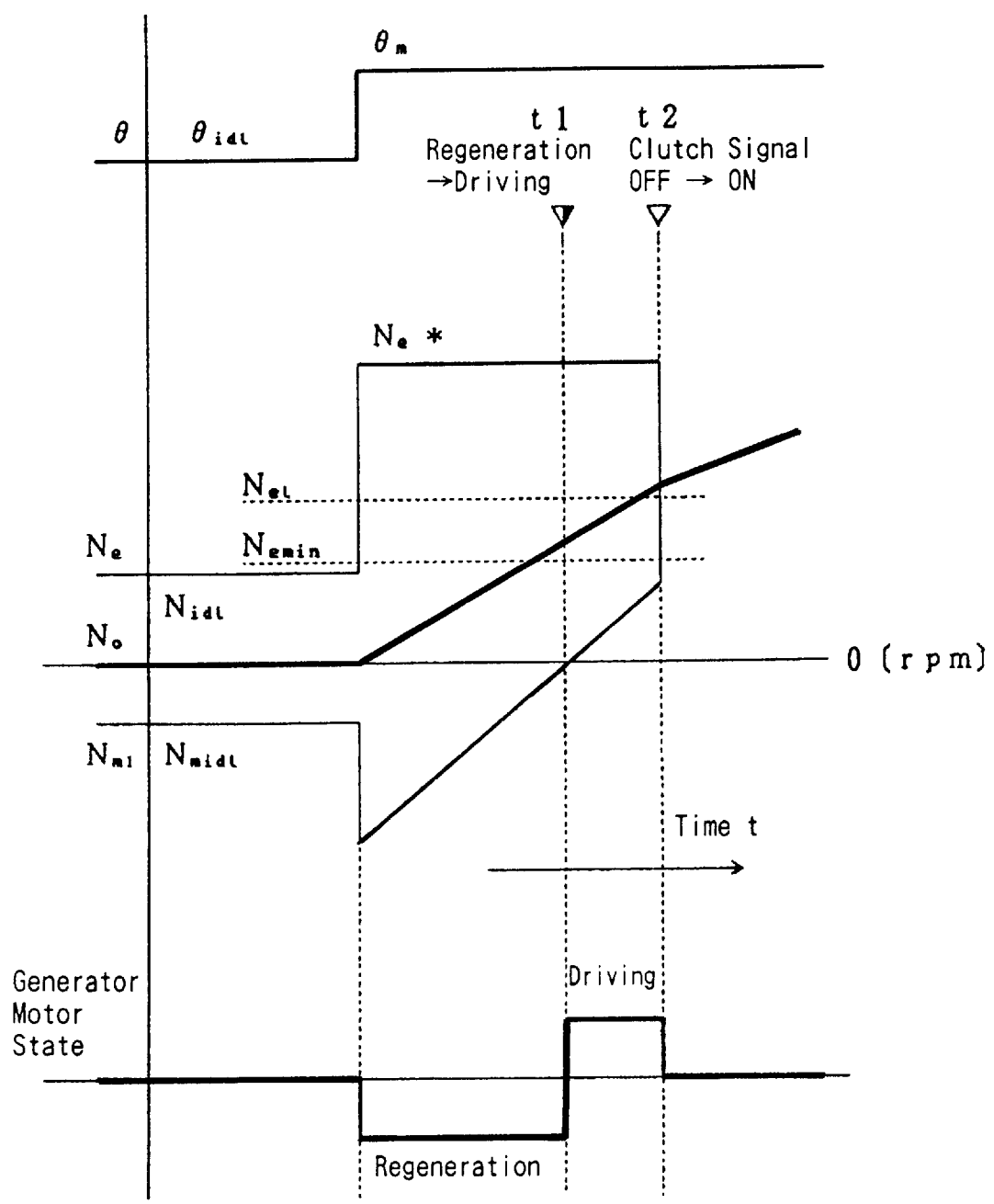
FIG. 5 is a time chart for the first preferred embodiment of FIG. 1.
Figure 32:
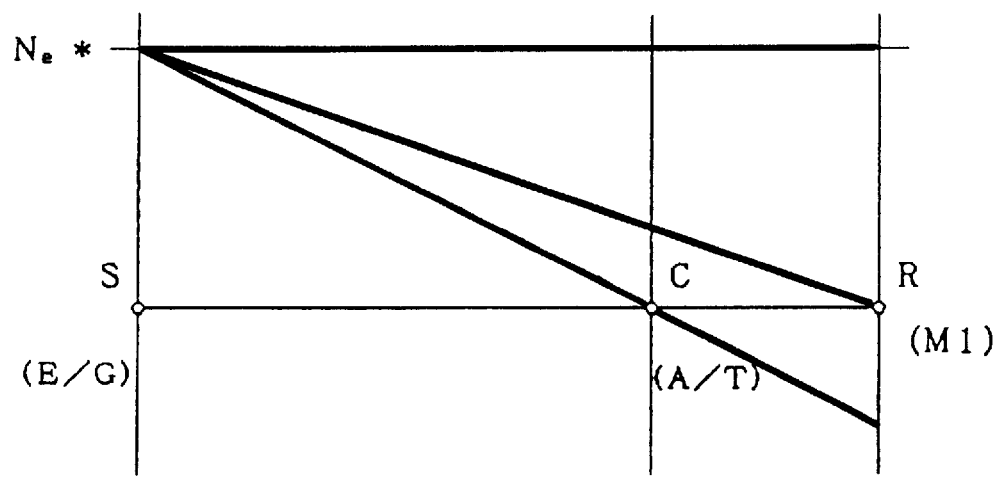
FIG. 32 is a speed line diagram for the sixth-preferred embodiment of the invention.

In this case, the speed line diagram of FIG. 32 is the same as the speed line diagram of FIG. 4. (In this preferred embodiment, the generator/motor speed $N_{m1}$ (FIG. 5) cannot be made higher than the engine speed $N_e$.)

Figure 33:
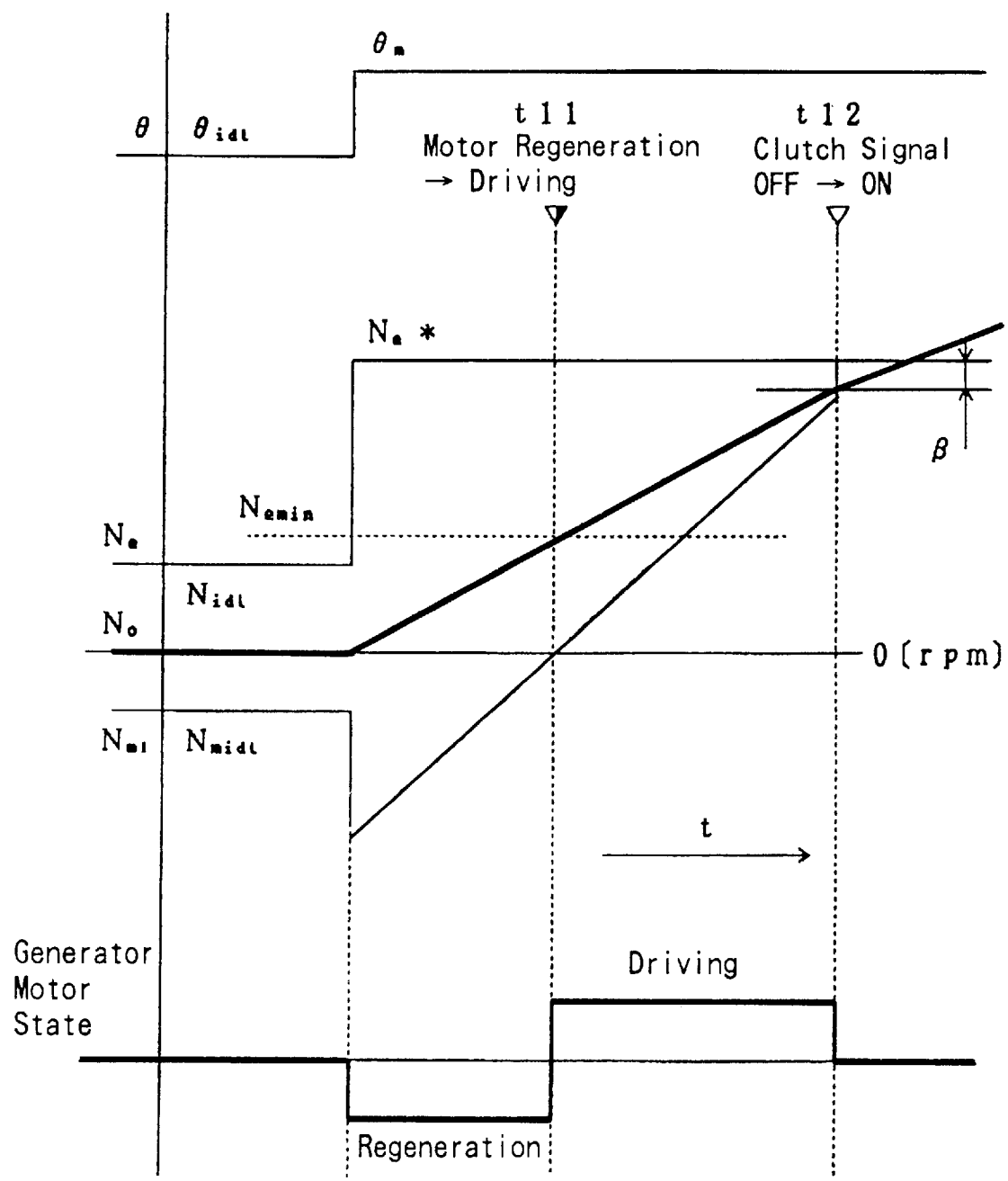
FIG. 33 is a time chart of a drive system of a seventh preferred embodiment of the invention.

A seventh preferred embodiment of the invention will now be described with reference to FIG. 33 and the drive mechanism 18 as used in this embodiment will be discussed with reference to FIG. 3.

When the vehicle is stationary, normally it is because the neutral range has been selected. The throttle opening e is set to an idling throttle opening $\theta_{id1}$ and the engine 11 (FIG. 2) is rotated at an idling speed $N_{id1}$. At this time, the rotation of the engine 11 is transmitted to the drive mechanism 18 by the engine output shaft 12 and the sun gear S is rotated at the idling speed $N_{id1}$.

When the shift lever (not shown in the drawings) is operated to select the D range and to thereby start the vehicle moving forward, a forward clutch of the transmission 21 is engaged. At this time, rotation at the idling speed $N_{id1}$ is transmitted to the sun gear S but, as a result of the forward clutch being engaged, the inertia of the vehicle is transmitted to the output shaft 19 and the output speed $N_o$ is 0. Consequently, the generator/motor M1 is rotated as a load in the regenerating mode.

When the driver then depresses the accelerator pedal 28 (FIG. 31) and increases the throttle opening θ from the idling throttle opening $\theta_{id1}$ to a throttle opening $\Theta_m$, a target engine speed $N_e^*$ corresponding to the throttle opening $\theta_m$ is set, and the automatic transmission control unit 36 executes feedback control so that a braking torque $T_{m1}$ is generated by the generator/motor M1 and the target engine speed $N_e^*$ is maintained. At this time, along with the feedback control, because a torque is transmitted to the output shaft 19, the output speed $N_o$ also gradually increases.

When at a time t11 the generator/motor speed $N_{m1}$ becomes 0, the generator/motor M1 shifts from the regenerating mode into the driving mode.

Thereafter, as acceleration is continued, the generator/motor speed $N_{m1}$ continues to rise while the target engine speed $N_e^*$ is maintained unchanged. When at a time t12 the engine speed $N_e$, immediately after engagement of the direct coupling clutch CL, is higher than the minimum speed $N_{emin}$ and the engine speed $N_e$ and the output speed $N_o$ are substantially the same, the clutch signal output from the automatic transmission control unit 36 to the solenoid of the solenoid valve SC is made ON and the direct coupling clutch CL is engaged. In this case, the engine speed $N_o$ and the output speed $N_o$ are determined to be substantially the same when the absolute value of the difference between the engine speed $N_e$ and the output speed $N_o$ becomes smaller than a preset engagement deviation constant β.

The output speed $N_o$ can be calculated using the following equation:

$$N_o = (N_e - N_{m1})/i + N_{m1} \ (N_{m1} < 0)$$

In this way, when the gearbox 16 becomes directly coupled, the rotation of the engine output shaft 12 is transmitted unchanged to the output shaft 19. As a result, the engine speed $N_e$, the output speed $N_o$ and the generator/motor speed $N_{m1}$ become equal.

In this case, because the direct coupling clutch CL can be engaged when the engine speed $N_e$ and the output speed No are substantially the same, engagement shock can be minimized.

Figure 35:
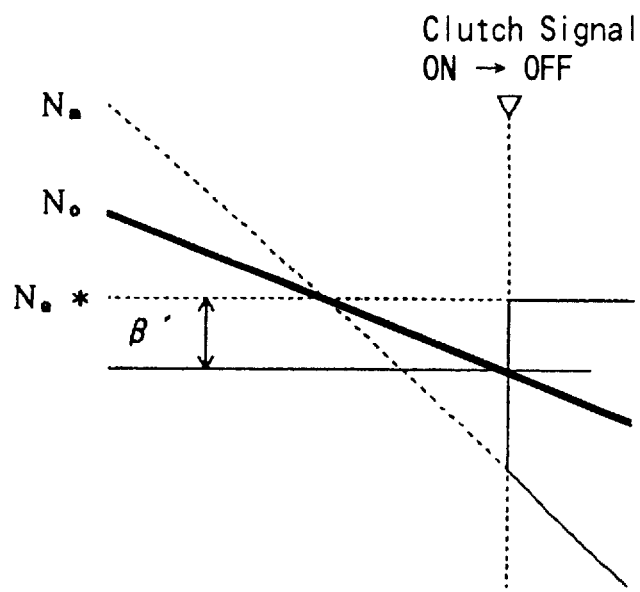
FIG. 35 is a time chart for the direct coupling clutch release control processing of FIG. 34.
Figure 36:
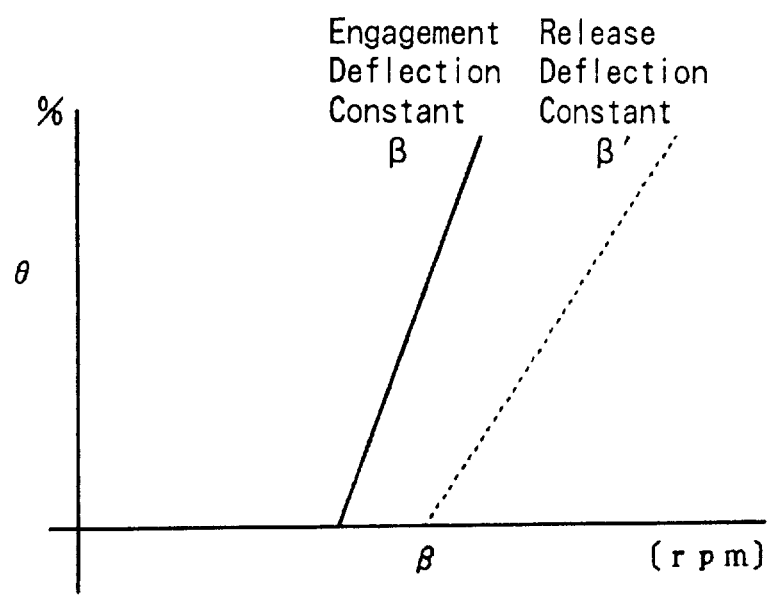
FIG. 36 is a deviation constant map for the seventh preferred embodiment of the invention.

Next, a direct coupling clutch release control processing subroutine will be described with reference to FIGS. 34, 35 and 36.

Figure 34:
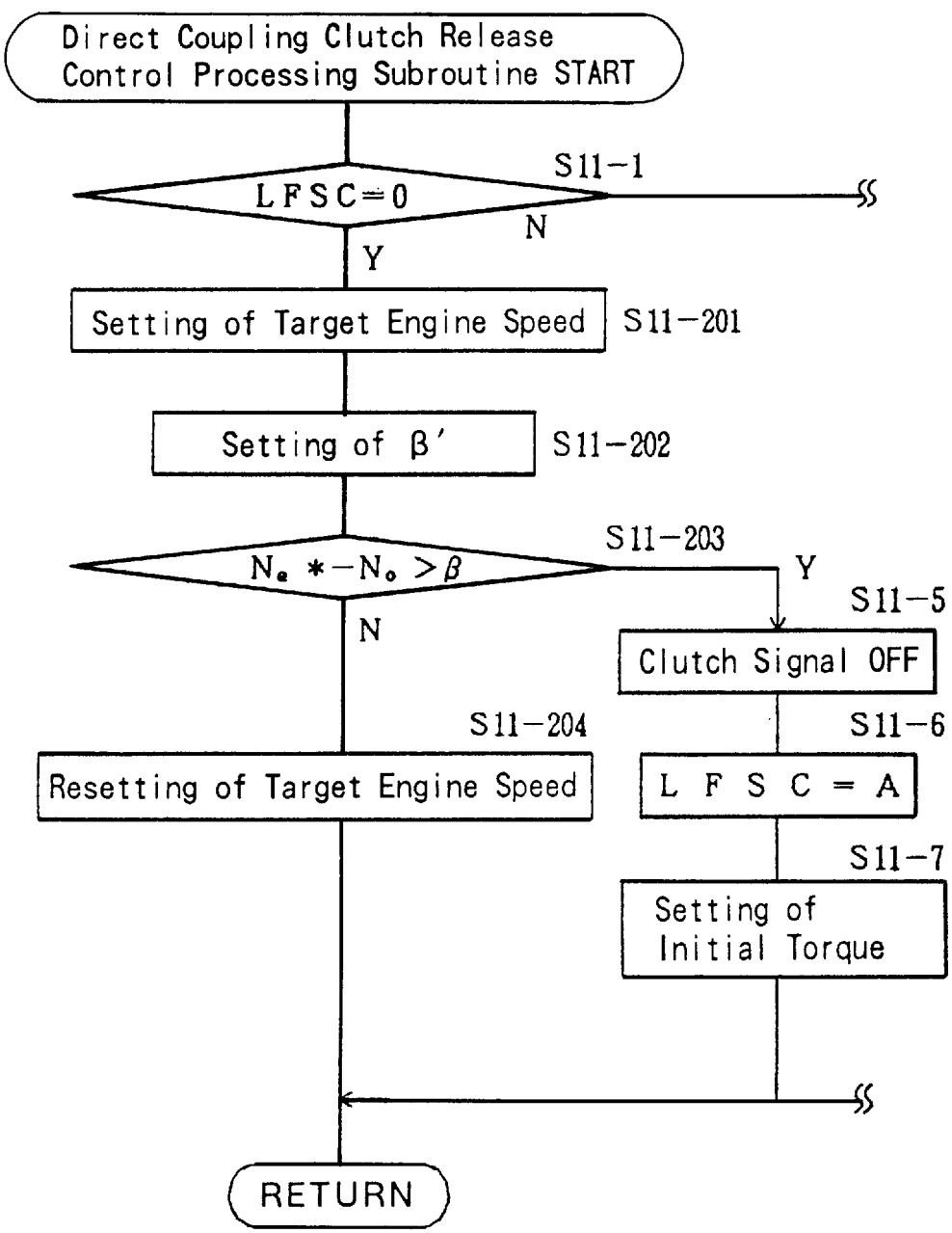
FIG. 34 is a flow chart of a direct coupling clutch release control processing subroutine for the seventh preferred embodiment of the invention.

In the subroutine illustrated in FIG. 34:

Step S11-1: It is determined whether or not a flag LFSC indicating the engaged/disengaged state of the direct coupling clutch CL (FIG. 3) is 0. When the flag LFSC is 0 processing proceeds to Step S11-201, and when the flag LFSC is not 0 processing proceeds to Step S11-8 (FIG. 10). When the direct coupling clutch CL is not in an engaging transient state the flag LFSC is 0 and when the direct coupling clutch CL is in a releasing transient state the flag LFSC is A.

Step S11-201: A target engine speed $N_e^*$ is set.

Step S11-202: A direct coupling clutch CL release deviation constant β' is read from the deviation constant map of FIG. 36 and is set. As shown in FIG. 36, when the throttle opening θ becomes large, because the engine torque is amply high, engine stalling does not occur even when the direct coupling clutch CL is engaged. Accordingly, when the throttle opening θ is large the release deviation constant β' and the engagement deviation constant β are made large. As a result, the direct coupling clutch CL can be engaged quickly and released Slowly.

Also, the release deviation constant β' and the engagement deviation constant β are made small values when the charge state of the main battery 47 monitored by the remaining charge detecting device 48 (FIG. 2) is good and are made large values when it is poor. As a result, because when the charge state of the main battery 47 is good the direct coupling clutch CL is engaged after the difference between the target engine speed $N_e^*$ and the output speed $N_o$ becomes small, the engagement shock can be minimized. When on the other hand the charge state of the main battery 47 is poor, the amount of electricity consumed by the generator/motor M1 can be minimized.

When the engine torque produced by the engine 11 is large, if the generator/motor M1 is made to follow the engine 11, not only does the generator/motor M1 have to be large but also the capacity of the main battery 47 has to be made large in correspondence with the engine torque. In that case, by making the release deviation constant β' and the engagement deviation constant β large, the generator/motor M1 can be made compact and the capacity of the main battery 47 can be made small.

Step S11-203: It is determined whether or not the difference between the target engine speed $N_e^*$ and the output speed $N_o$ is greater than the release deviation constant β'. When the difference between the target engine speed $N_e^*$ and the output speed $N_o$ is greater than the release deviation constant β' processing proceeds to Step S11-5 and, when the difference between the target engine speed $N_e^*$ and the output speed $N_o$ is less than the release deviation constant β', processing proceeds to Step S11-204.

Step S11-204: The target engine speed $N_e^*$ is reset.

Step S11-5: The clutch signal is made OFF.

Step S11-6: Because even when the clutch signal is made OFF the direct coupling clutch CL is not released immediately, the flag LFSC is made A and a releasing transient state is monitored.

Step S11-7: To make the shift of the engine speed $N_e$ to the target engine speed $N_e^*$ smooth, an initial torque $T_{mi}$ of the generator/motor M1 is set.

Figure 37:
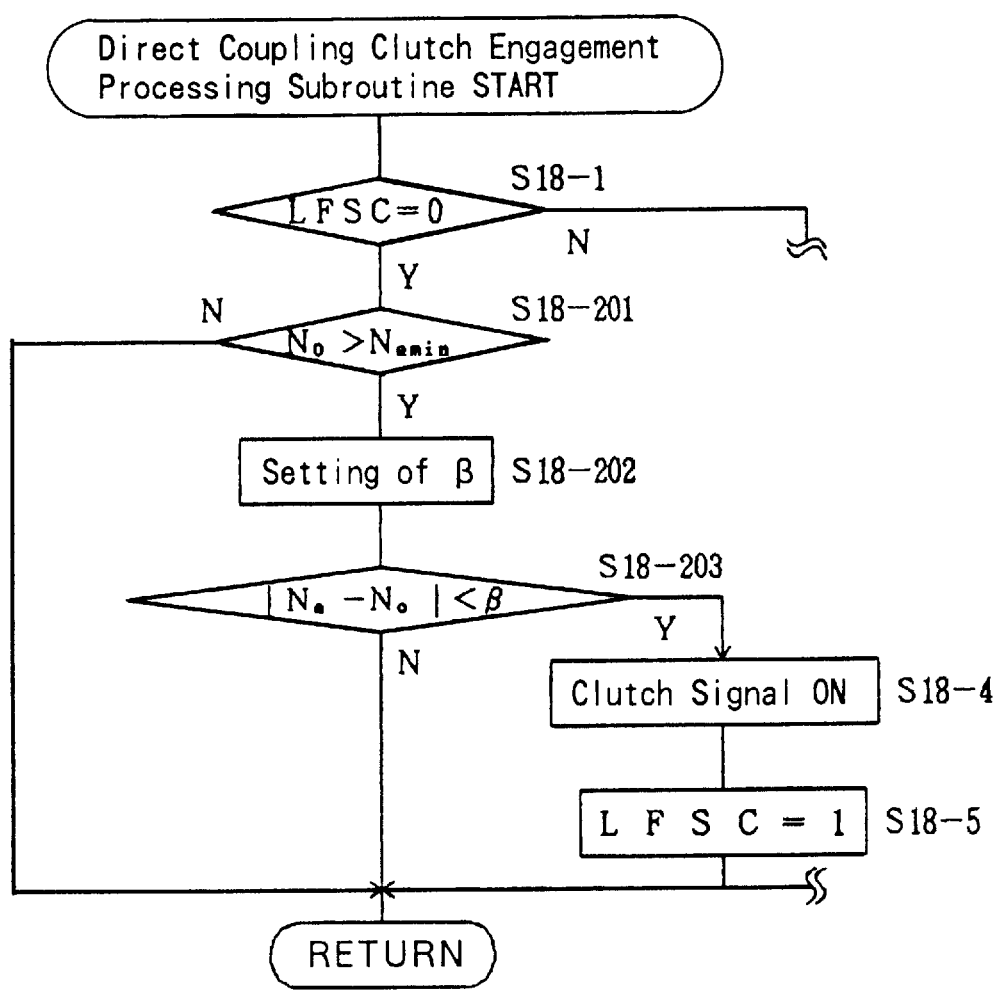
FIG. 37 is a flow chart of a direct coupling clutch engagement control processing subroutine of the seventh preferred embodiment of the invention.

Next, a direct coupling clutch engagement control processing subroutine will be described with reference to FIG. 37 in which:

Step S18-1: It is determined whether or not the flag LFSC is 0. When the flag LFSC is 0 processing proceeds to Step S18-201, and when the flag LFSC is not 0 processing proceeds to Step S18-6 (FIG. 17).

Step S18-201: It is determined whether or not the output speed $N_o$ is higher than the minimum speed $N_{emin}$. When the output speed $N_o$ is higher than the minimum speed $N_{emin}$ processing proceeds to Step S18-202 and, when the output speed $N_o$ is less than the minimum speed $N_{emin}$, processing returns.

Step S18-202: The engagement deviation constant β of the direct coupling clutch CL (FIG. 5) is read from the deviation constant map of FIG. 36 and is set.

Step S18-203: Calculating means, e.g. ECU 36, compares the absolute value of the difference between the engine speed Ne and the output speed $N_o$ with the engagement deviation constant β and determines whether or not the absolute value of the difference between the engine speed $N_e$ and the output speed $N_o$ is smaller than the engagement deviation constant β. When the absolute value of the difference between the engine speed $N_e$ and the output speed $N_o$ is smaller than the engagement deviation constant β processing proceeds to Step S18-4 and, when the absolute value of the difference between the engine speed $N_e$ and the output speed $N_o$ is above the engagement deviation constant β, processing returns. In this preferred embodiment the absolute value of the difference between the engine speed $N_e$ and the output speed $N_o$ is compared to the engagement deviation constant β but, alternatively, for example, the absolute value of the difference between the generator/motor speed $N_{m1}$ and the engine speed $N_e$ can be compared to the engagement deviation constant β. Also, a ratio can be used instead of the difference.

Step S18-4: The clutch signal is made ON.

Step S18-5: The flag LFSC is set to 1.

Figure 38:
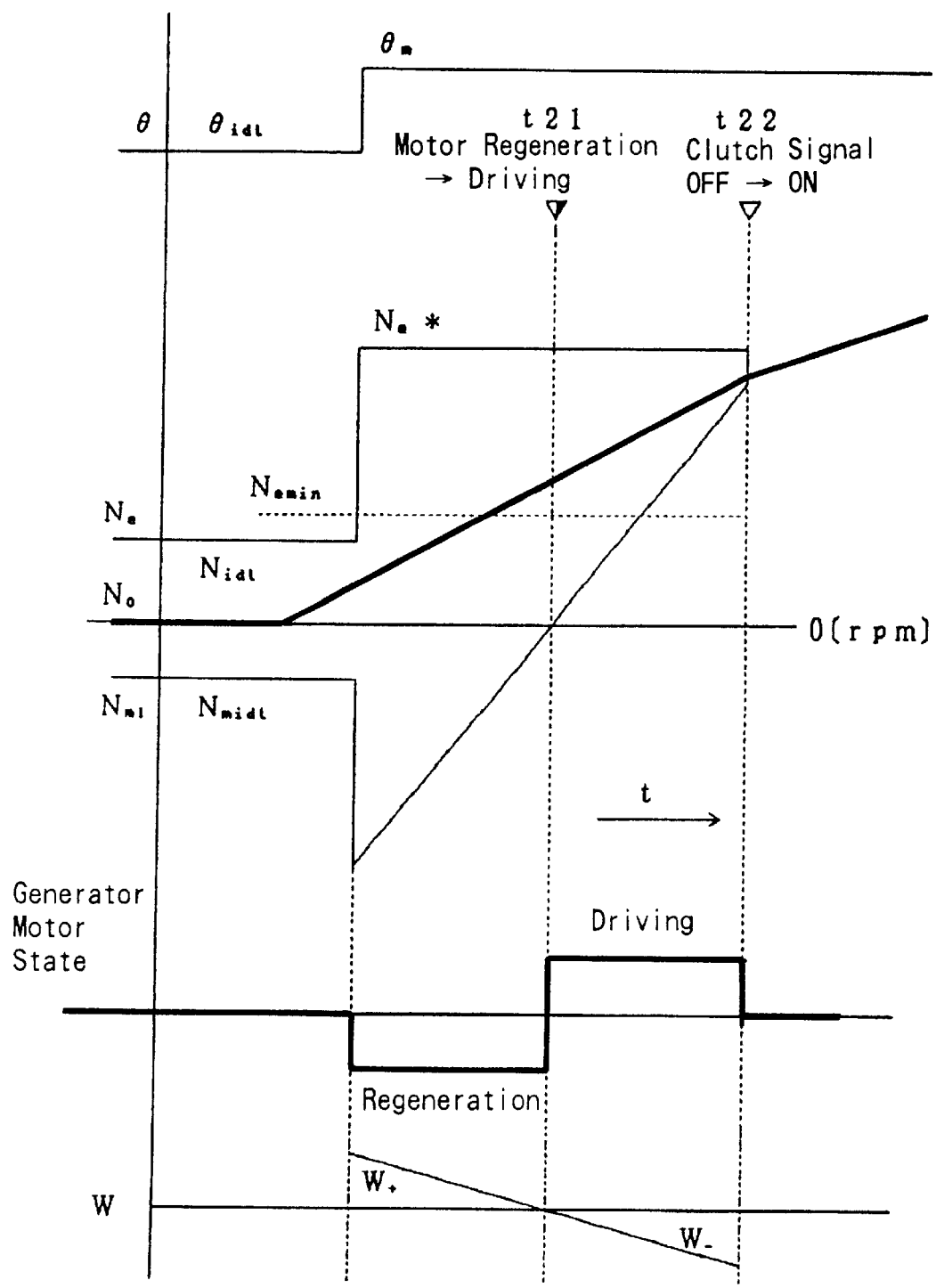
FIG. 38 is a time chart for a drive system of an eighth preferred embodiment of the invention.

An eighth preferred embodiment of the invention will now be described with reference to FIG. 38 and the drive mechanism 18 as used therein will be discussed with reference to FIG. 3.

When the vehicle is stationary, normally the neutral range is selected, the throttle opening θ is set to an idling throttle opening $θ_{id1}$ and the engine 11 (FIG. 2) is rotated at an idling speed $N_{id1}$. At this time, the rotation of the engine 11 is transmitted to the drive mechanism 18 by the engine output shaft 12 and the sun gear S is rotated at the idling speed $N_{id1}$.

When a shift lever (not shown in the drawings) is operated to select the D range and to start the vehicle moving forward, a forward clutch of the transmission 21 is engaged. At this time, rotation at the idling speed $N_{id1}$ is transmitted to the sun gear S but, as a result of the forward clutch being engaged, the inertia of the vehicle is transmitted to the output shaft 19 and the output speed $N_o$ is 0. Consequently, the generator/motor M1 is rotated as a load in the regenerating mode.

When the driver then depresses the accelerator pedal 28 and increases the throttle opening θ from the idling throttle opening $θ_{id1}$ to a throttle opening $θ_m$, a target engine speed $N_e^*$ corresponding to the throttle opening $θ_m$ is set, and the automatic transmission control unit 36 executes feedback control so that a braking torque $T_{m1}$ generated by the generator/motor M1 is produced and the target engine speed $N_e^*$ is maintained. At this time, along with the feedback control, because a torque is transmitted to the output shaft 19, the output speed $N_o$ also gradually increases.

When at a time t21 the generator/motor speed $N_{m1}$ becomes 0, the generator/motor M1 shifts from the regenerating mode to the driving mode.

Thereafter, as acceleration is continued, the generator/motor speed $N_{m1}$ continues to rise while the target engine speed $N_e^*$ is maintained unchanged. Then, when at a time t22 the engine speed $N_e$, immediately after engagement of the direct coupling clutch CL, is higher than the minimum speed $N_{emin}$ and electrical power $W_+$ obtained by regeneration and electrical power $W_-$ consumed by the generator/motor M1 become substantially equal, the clutch signal output from the automatic transmission control unit 36 to the solenoid of the solenoid valve SC is made ON and the direct coupling clutch CL is engaged.

In this way, when the gearbox 16 becomes directly coupled, the rotation of the engine output shaft 12 is transmitted unchanged to the output shaft 19. As a result, the engine speed $N_e$, the output speed $N_o$ and the generator/motor speed $N_{m1}$ become equal.

In this case, because only the power $W_+$ obtained by regeneration with the generator/motor M1 is consumed in driving the generator/motor M1, the capacity of the main battery 47 can be small.

Figure 39:
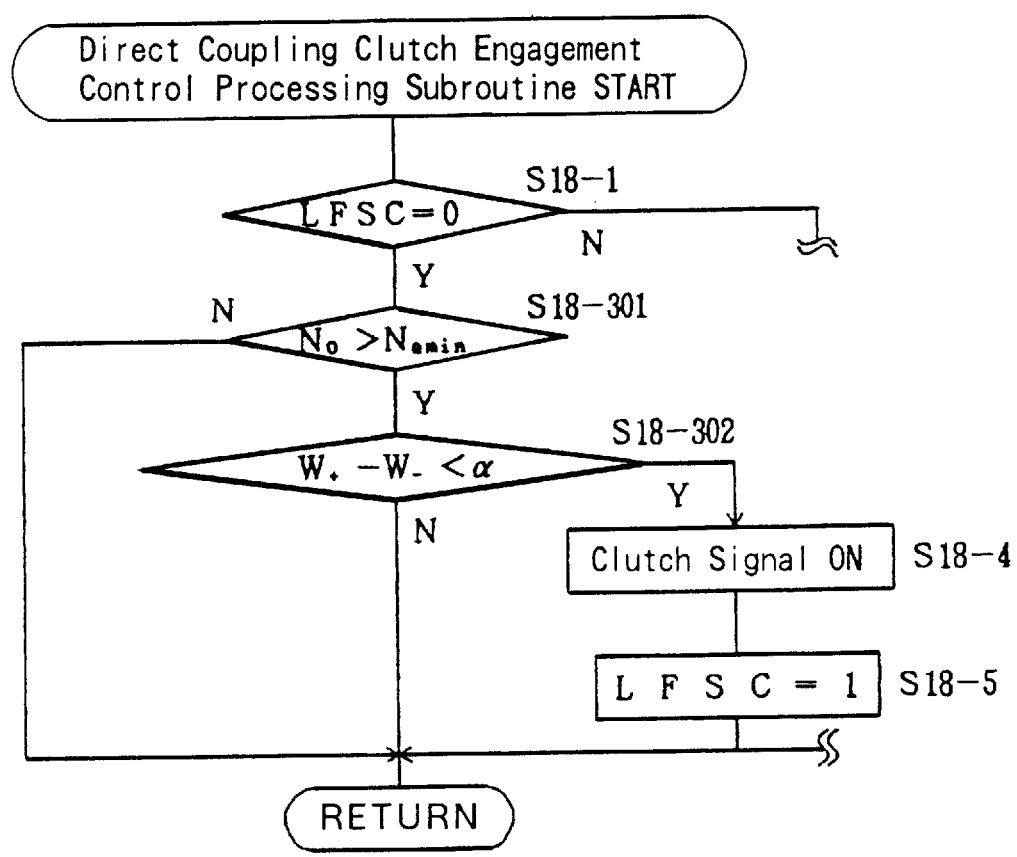
FIG. 39 is a flow chart of a direct coupling clutch engagement control processing subroutine for the eighth preferred embodiment of the invention.

Next, the direct coupling clutch engagement control processing subroutine of FIG. 39 will be described.

Step S18-1: It is determined whether or not the flag LFSC is 0. When the flag LFSC is 0 processing proceeds to Step S18-301, and when the flag LFSC is not 0 processing proceeds to Step S18-6 (FIG. 17).

Step S18-301: It is determined whether or not the output speed $N_o$ is higher than the minimum speed $N_{emin}$. When the output speed $N_o$ is higher than the minimum speed $N_{emin}$ processing proceeds to Step S18-302, and when the output speed $N_o$ is less than the minimum speed $N_{emin}$ processing returns.

Step S18-302: The difference between the power $W_+$ obtained by regeneration and the power $W_-$ consumed in driving generator/motor M1 is compared to a set value $\alpha$; when the difference is smaller than the set value $\alpha$ processing proceeds to Step S18-4, and when the difference is greater than the set value processing returns.

Step S18-4: The clutch signal is made ON.
Step S18-5: The flag LFSC is set to 1.

A ninth preferred embodiment of the invention illustrated in FIG. 40 will now be described.

Figure 40:
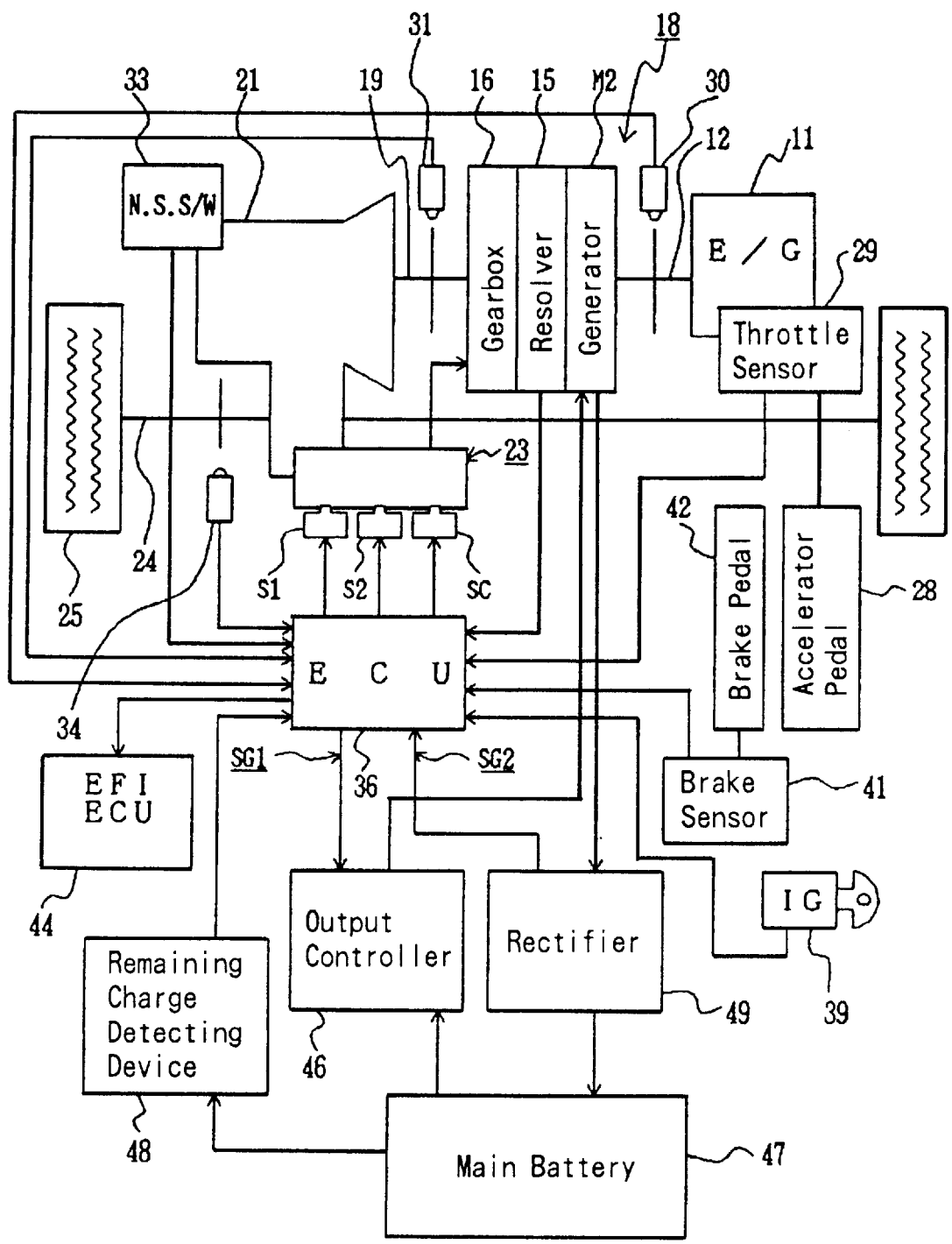
FIG. 40 is a schematic view of a drive system of a ninth preferred embodiment of the invention.

In FIG. 40, 11 is an engine (E/G), 12 is an engine output shaft by which rotation generated by the engine 11 is transmitted and M2 is a generator serving as an electric rotary device. The generator M2 generates a braking torque $T_{m2}$ and applies this braking torque $T_{m2}$ to the engine output shaft 12 as a reaction torque.

A resolver 15 detects magnetic pole positions of the generator M2. A gearbox 16 is connected to the engine output shaft 12. Drive mechanism 18 includes a resolver 15, the generator M2 and the gearbox 16. Output shaft 19 transmits rotation generated by the drive mechanism 18 to a transmission 21. In this preferred embodiment the transmission 21 is an automatic transmission (A/T), but it may alternatively be a manual transmission.

The gearbox 16 has a speed-reducing gear mechanism (not shown in the drawings), for example a planetary gear unit, and has a clutch (not shown in the drawings) which can selectively engage and disengage the elements of the planetary gear unit. This clutch is engaged and disengaged by a hydraulic servo (not shown in the drawings) of a hydraulic circuit 23. The hydraulic circuit 23 has a solenoid valve SC for selectively supplying oil to the hydraulic servo.

In this preferred embodiment, because the transmission 21 is an automatic transmission, the hydraulic circuit 23 has solenoid valves S1, S2 for selecting the gears of the transmission 21. When a gear stage is selected by the hydraulic circuit 23, rotation corresponding to that gear stage is transmitted via a drive shaft 24 to the vehicle drive wheels 25.

By depressing an accelerator pedal 28 it is possible to change the throttle opening as an engine load. The throttle opening is detected by a throttle sensor 29 linked to the accelerator pedal 28. An engine speed sensor 30 is disposed facing the engine output shaft 12 and detects the engine speed. An output speed sensor 31 is disposed facing the output shaft 19 and detects the output speed of the drive mechanism 18. A shift position switch 33 is linked to a shift lever (not shown in the drawings) and detects the range and gear stage selected by said shift lever, and a vehicle speed sensor 34 is disposed facing the drive shaft 24 and detects a vehicle speed correspondent value V.

In this preferred embodiment, the engine speed sensor 30 is disposed facing the engine output shaft 12 and detects the speed of the engine output shaft 12; however, alternatively, it is possible to use a signal from an ignition system instead of the speed of the engine output shaft 12. Also, although in this preferred embodiment the output speed sensor 31 is disposed facing the output shaft 19 and detects the speed of the output shaft 19, the speed of the input shaft of the transmission 21 can alternatively be detected, instead of the speed of the output shaft 19.

In an automatic transmission control unit 36, a starting output and a gear-change output are generated based on the throttle opening detected by the throttle sensor 29, the vehicle speed detected by the vehicle speed sensor 34 and the range and gear stage detected by the shift position switch 33. A clutch signal corresponding to the starting output is output to the solenoid of the solenoid valve SC and solenoid signals corresponding to the gear-change output are output to the solenoids of the solenoid valves S1, S2.

The hydraulic circuit 23 supplies hydraulic pressure to the hydraulic servo based on the clutch signal and the solenoid signals received by the solenoids, selects gears and directly couples the drive mechanism 18.

An ignition switch 39 produces a start signal when the driver turns the ignition key. A brake sensor 41 then detects a brake stroke or a brake fluid pressure indicating that the driver has depressed a brake pedal 42 and thereby detects the braking force called for by the driver. A fuel injection control unit 44 (EFIECU) receives a neutral signal generated by the automatic transmission control unit 36 and reduces the fuel injection quantity to the engine 11.

An output control unit 46 drives the generator M2 and thereby produces the braking torque $T_{m2}$ required to start the vehicle moving. The main battery 47 serves as an electricity storing device for supplying current for driving the generator M2 and for receiving and storing electricity obtained by regeneration. A residual charge detecting device 48 monitors the state of charge of the main battery 47 based on voltage and current integrated values or the like, and a rectifier 49 rectifies a 3-phase alternating current generated by the generator M2 to produce a direct current.

An operation signal SG1 is output from the automatic transmission control unit 36 to the output control unit 46, and this operation signal SG1 is made up of an ON/OFF signal of a switching device for controlling the current supplied to the generator M2 and a chopper duty signal and the like. An operation signal SG2 is output from the rectifier 49 to the automatic transmission control unit 36, and this operation signal SG2 is used as a current monitor signal for conducting feedback control in the automatic transmission control unit 36.

Figure 41:
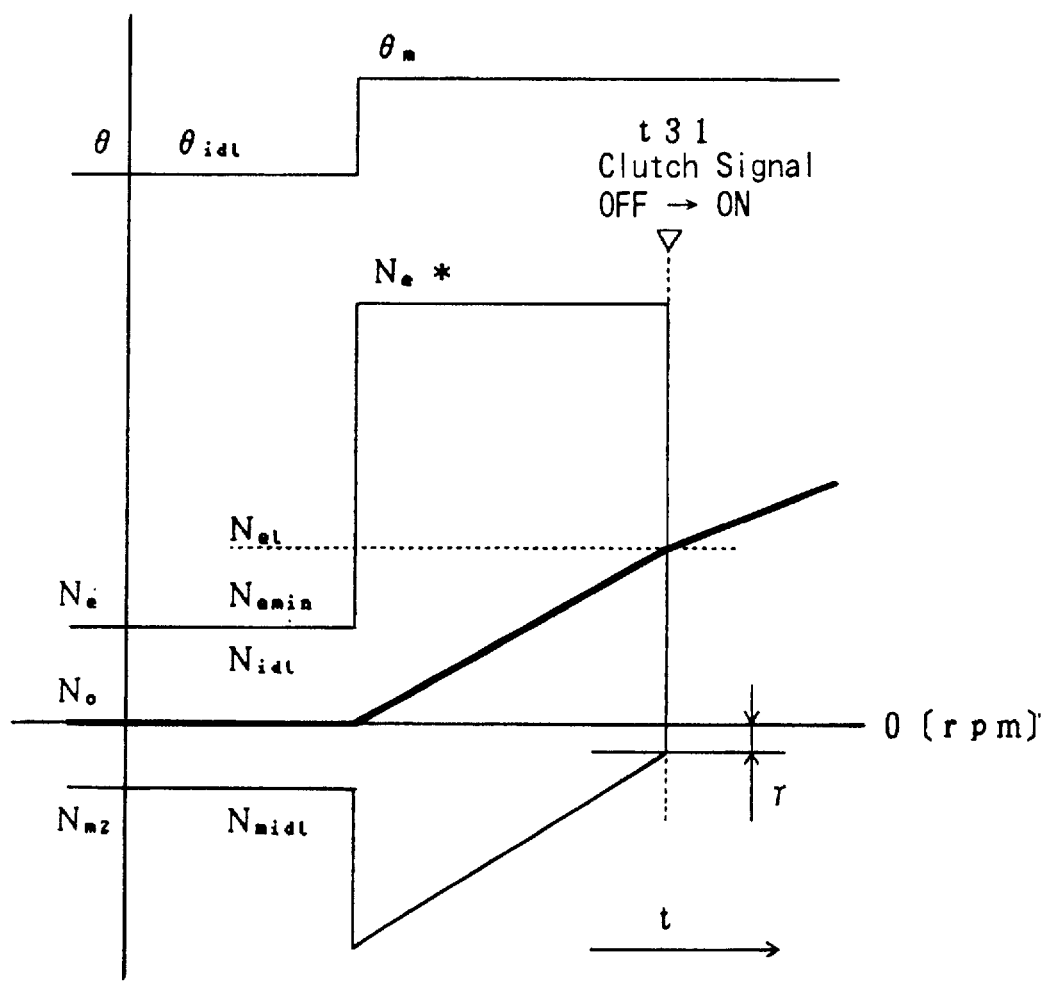
FIG. 41 is a time chart of the drive system of the ninth preferred embodiment of the invention.

The operation of the starting system thus constructed will be now described with reference to FIG. 41 and the drive mechanism 18 will be discussed with reference to FIG. 3.

When the vehicle is stationary, normally the neutral range is selected, the throttle opening θ is set to an idling throttle opening $θ_{id1}$ and the engine 11 (FIG. 2) is rotated at an idling speed $N_{id1}$. At this time, the rotation of the engine 11 is transmitted to the drive mechanism 18 by the engine output shaft 12 and the sun gear S is rotated at the idling speed $N_{id1}$.

Then, when a shift lever (not shown in the drawings) is operated to select the D range and to start the vehicle moving, a forward clutch (not shown in the drawings) of the transmission 21 is engaged.

At this time, rotation at the idling speed $N_{id1}$ is transmitted to the sun gear S but, as a result of the forward clutch being engaged, the inertia of the vehicle is transmitted to the output shaft 19 and the output speed $N_o$ is 0. Consequently, the generator M2 (FIG. 40) is rotated as a load in the regenerating mode while generating a braking torque $T_{m2}$.

When the driver then depresses the accelerator pedal 28 and increases the throttle opening θ from the idling throttle opening $θ_{id1}$ to a throttle opening $θ_m$, a target engine speed $N_e^*$ corresponding to the throttle opening $θ_m$ is set, and the automatic transmission control unit 36 executes feedback control so that a braking torque $T_{m2}$ is generated by the generator M2 and the target engine speed $N_e^*$ is maintained. At this time, along with the feedback control, because a torque is transmitted to the output shaft 19, the output speed $N_o$ also gradually increases.

When at a time t31 the generator speed $N_{m2}$ becomes substantially 0, the clutch signal output from the automatic transmission control unit 36 to the solenoid of the solenoid valve SC is made ON and the direct coupling clutch CL is engaged.

In this case, it is determined that the generator speed $N_{m2}$ has become substantially 0 when the absolute value of the generator speed $N_{m2}$ becomes smaller than λ. The generator speed $N_{m2}$ can be calculated using the following equation:

$$N_{m2}=N_e-(N_e-N_o)i/(i-1)\ (N_{m2}<0)$$

The generator speed $N_{m2}$ can also be directly detected.

In this way, when the gearbox 16 becomes directly coupled, the rotation of the engine output shaft 12 is transmitted unchanged to the output shaft 19. As a result, the engine speed $N_e$, the output speed $N_o$ and the generator speed $N_{m2}$ become equal.

Because this preferred embodiment provides only the regeneration mode (no driving mode is provided), the output control unit 46 (FIG. 40) can be simplified.

Figure 42:
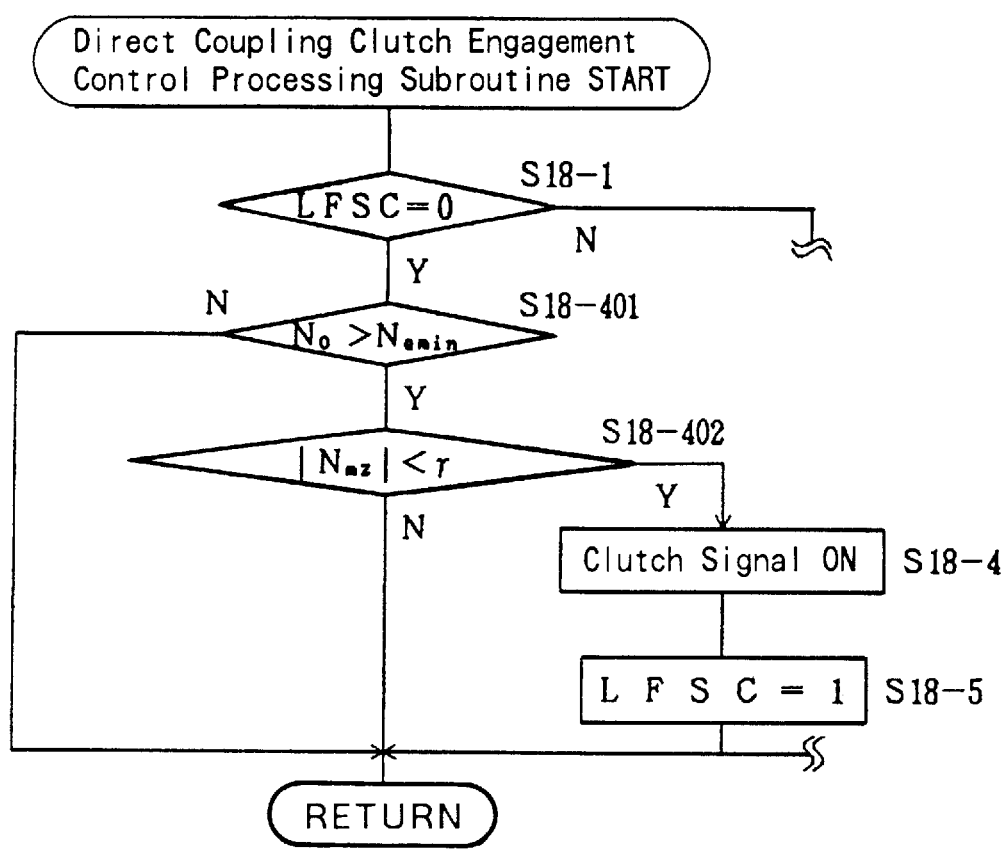
FIG. 42 is a flow chart of a direct coupling clutch engagement control processing subroutine of the ninth preferred embodiment of the invention.

Next, the direct coupling clutch engagement control processing subroutine of FIG. 42 will be described.

Step S18-1: It is determined whether or not the flag LFSC is 0. When the flag LFSC is 0 processing proceeds to Step S18-401, and when the flag LFSC is not 0 processing proceeds to Step S18-6 (FIG. 17).

Step S18-401: It is determined whether or not the output speed $N_o$ is higher than the minimum speed $N_{emin}$. When the output speed $N_o$ is higher than the minimum speed $N_{emin}$ processing proceeds to Step S18-402, and when the output speed $N_o$ is lower than minimum speed $N_{emin}$ processing returns.

Step S18-402: It is determined whether or not the absolute value of the generator speed $Nm_2$ is smaller than λ. When the absolute value of the generator speed $N_{m2}$ is smaller than λ processing proceeds to Step S18-4, and when the absolute value of the generator speed $N_{m2}$ is above λ processing returns.

Step S18-4: The clutch signal is made ON.
Step S18-5: The flag LFSC is set to 1.

Figure 43:
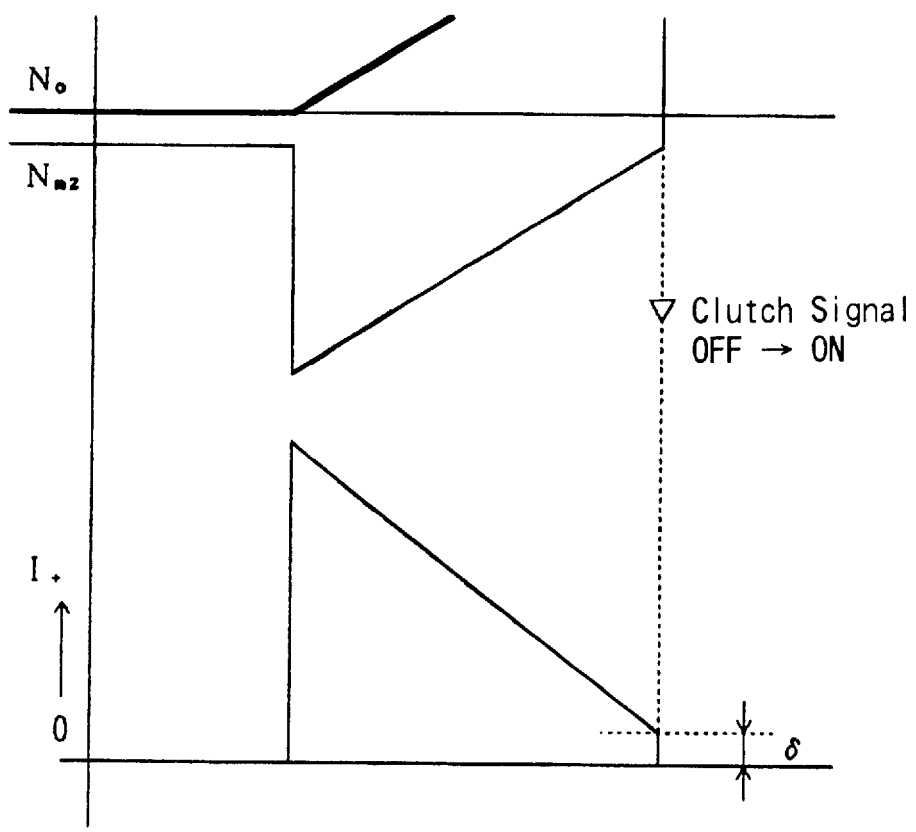
FIG. 43 is a time chart for a drive system of a tenth preferred embodiment of the invention.
Figure 44:
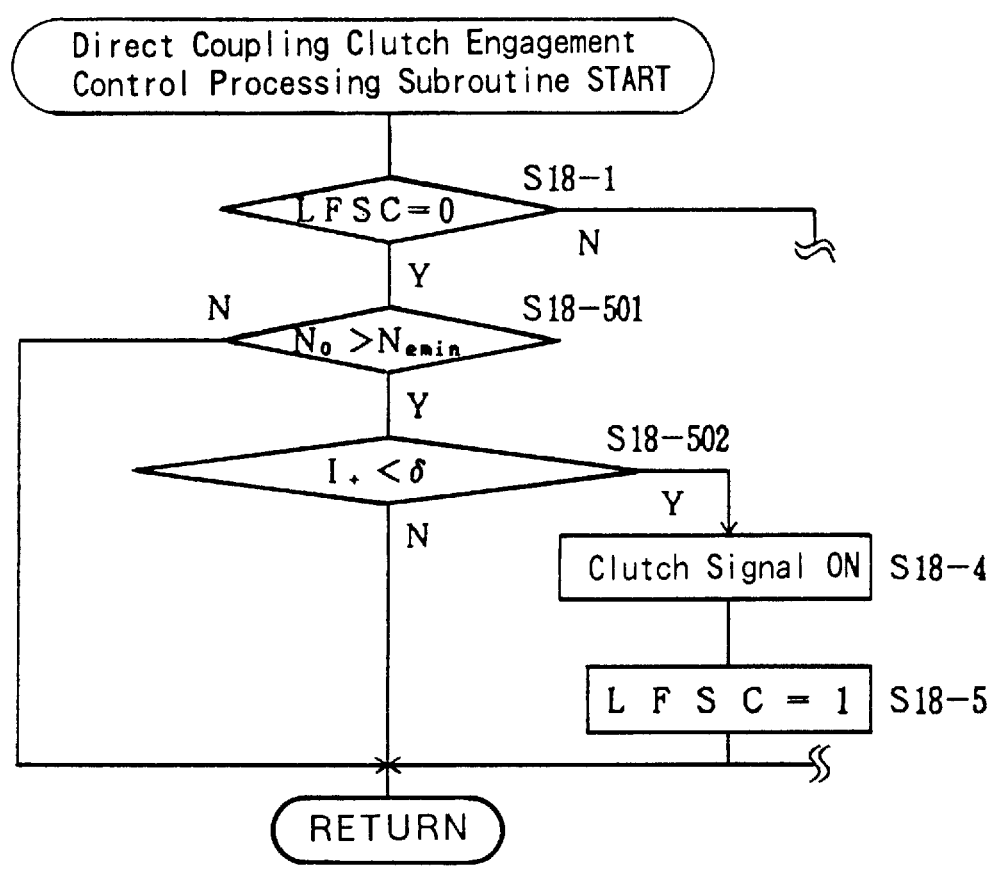
FIG. 44 is a flow chart of a direct coupling clutch engagement control processing subroutine of the tenth preferred embodiment of the invention.

The tenth preferred embodiment of the invention of FIGS. 43 and 44 will now be described.

In this case, a regeneration current $I_+$ produced while a generator M2 (FIG. 40) is being rotated as a load is monitored and the direct coupling clutch CL is engaged when the regeneration current $I_+$ has become smaller than a set value δ. When a separately excited generator, in which permanent magnets are not used, is used as the generator M2, when the throttle opening θ and the engine torque are high the set value δ is correspondingly raised.

Step S18-1: It is determined whether or not the flag LFSC is 0. When the flag LFSC is 0 processing proceeds to Step S18-501, and when the flag LFSC is not 0 processing proceeds to Step S18-6 (FIG. 17).

Step S18-501: It is determined whether or not the output speed $N_o$ is higher than the minimum speed $N_{emin}$. When the output speed $N_o$ is higher than the minimum speed $N_{emin}$ processing proceeds to Step S18-502, and when the output speed $N_o$ is less than minimum speed $N_{emin}$ processing returns.

Step S18-502: It is determined whether or not the regeneration current $I_+$ is smaller than the set value δ. When the regeneration current $I_+$ is smaller than the set value δ processing proceeds to Step S18-4, and when the regeneration current $I_+$ is above the set value δ processing returns.

Step S18-4: The clutch signal is made ON.
Step S18-5: The flag LFSC is set to 1.

Figure 45:
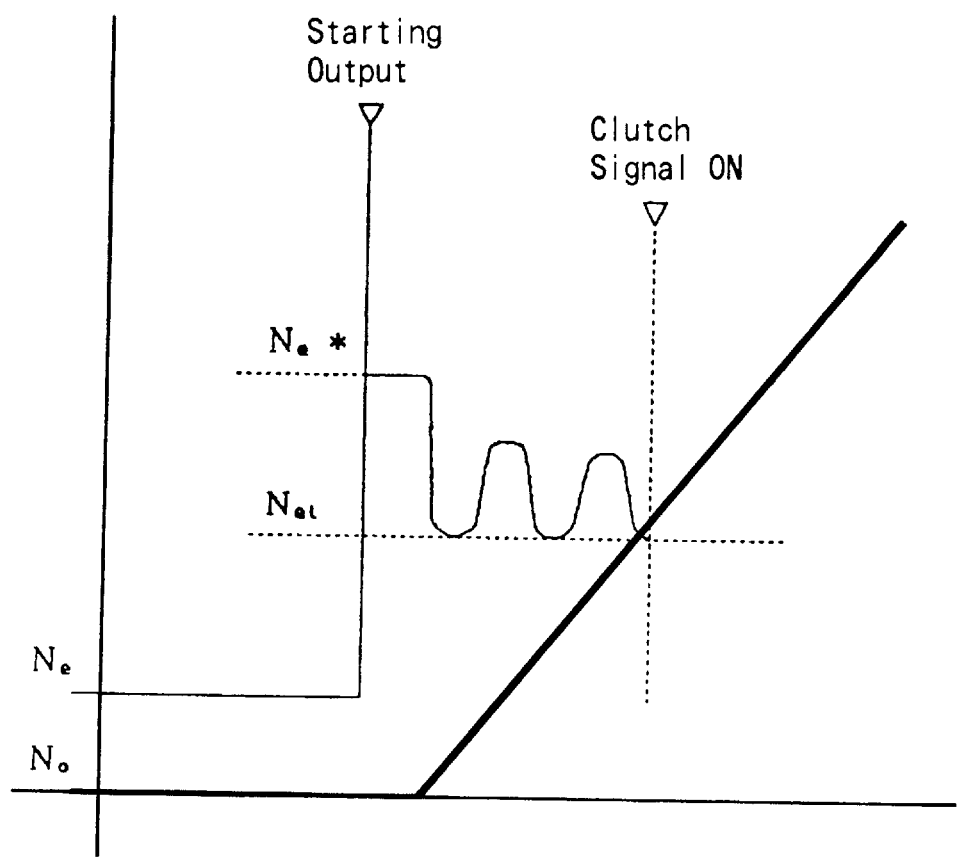
FIG. 45 is a time chart of a drive system of an eleventh preferred embodiment of the invention.

The eleventh preferred embodiment of FIG. 45 will now be described.

In this case, upon generation of a starting output, an engaging determination starting timer (not shown in the drawings) commences timing and, when a set time period has elapsed, the direct coupling clutch CL (FIG. 3) is put into a semiengaged state by slip control or duty control. As a result, the engine speed $N_e$ gradually falls from the target engine speed $N_e^*$.

Thereafter, feedback control is executed so that the engine speed $N_e$ does not become smaller than a set value for engaging $N_{e1}$ and, when the output speed $N_o$ becomes higher than the engine speed $N_e$, the direct coupling clutch CL is completely engaged.

In this way, because the direct coupling clutch CL need only become semi-engaged and only feedback control of the engine speed $N_e$ is required, the output control unit 46 can be simplified.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A drive system for engaging a drive wheel of a vehicle with an output shaft of an engine, said drive system comprising:

a gearbox having at least a first gear element connected to the output shaft of the engine, a second gear element connected to the drive wheel of the vehicle and a third gear element for receiving a braking torque to reduce speed of rotation input from the first gear element and to output the rotation at the reduced speed to the second gear element;

an engaging element for connection to any of said gear elements, said engaging element being selectively engaged to mechanically connect the output shaft of the engine to the drive wheel;

an electric rotary device connected to the third gear element;

an accumulator for supplying current for driving said electric rotary device and for receiving and storing electrical energy obtained by regeneration;

engine load detecting means for detecting engine load;

speed detecting means for detecting speed of said first gear element and at least one other of the gear elements of the gearbox; and a control unit comprising:

electric rotary device controlling means for setting a target speed for the first gear element based on the detected engine load and for bringing the speed of the first gear element to the target speed by driving the electric rotary device to generate the braking torque; and engaging and disengaging means for comparing the speed of said one other gear element, with a set value for engaging and for causing the engaging element to engage when the speed of said other gear element is above the set value for engaging.

2. A drive system according to claim 1 wherein:

the set values for engaging and disengaging are set in correspondence with the engine load and becomes higher as the engine load increases.

3. A drive system according to claim 1 further comprising:

operating means for selecting a driving state or a non-driving state for the vehicle;

vehicle speed detecting means for detecting speed of the vehicle, wherein the electric rotary device controlling means is provided with braking torque setting up means for driving the electric rotary device and setting up a braking torque when a driving state is selected by the operating means, the engine load detected by the engine load detecting means is substantially zero and the vehicle speed detected by the vehicle speed detecting means is below a set value.

4. A drive system according to claim 1 further comprising:

brake detecting means for detecting depression of a brake pedal; and vehicle speed detecting means for detecting speed of the vehicle, wherein the electric rotary device controlling means makes the braking torque generated by the electric rotary device zero when depression of the brake pedal is detected by the brake detecting means, the engine load detected by the engine load detecting means is substantially zero and the vehicle speed detected by the vehicle speed detecting means is below a set value.

5. A drive system according to claim wherein:

when the engine load detected by the engine load detecting means is substantially zero and the speed of a gear element other than the first gear element is below a set value for release, the engaging and disengaging means releases the engaging element and the electric rotary device controlling means keeps the speed of a gear element other than the first gear element in a region of high electricity generation efficiency.

6. A drive system according to claim 1 wherein:

when the engine load detected by the engine load detecting means is substantially zero and the detected speed of the one other gear element is below a set value for release, the engaging and disengaging means releases the engaging element and the electric rotary device controlling means keeps the speed of the first gear element above another set value.

7. A drive system according to claim 1 wherein the accumulator is a battery and further comprising:

a residual charge detecting device for monitoring battery charge, wherein when the engine load detected by the engine load detecting means is substantially zero, the speed of the one other gear element is below a first set value for release and the battery charge is lower than a predetermined value, the engaging and disengaging means releases the engaging element and the electric rotary device controlling means keeps the speed of the one other gear element in a region of high electricity generation efficiency, and when the engine load detected by the engine load detecting means is substantially zero, the speed of the one other gear element is below a second set value for release and the battery charge is above the predetermined value, the engaging and disengaging means releases the engaging element and the electric rotary device controlling means keeps the speed of the first gear element above another set value.

8. A drive system according to claim 1 wherein:

said electric rotary device is a generator.

9. A drive system according to claim 1 wherein:

said electric rotary device is a generator/motor.

10. A drive system according to claim 9 wherein:

when engaging of the engaging element by the engaging and disengaging means has been completed the electric rotary device controlling means reduces the braking torque generated by the generator/motor by a set rate.

11. A drive system according to claim 9 wherein:

the electric rotary device controlling means reduces the braking torque of the generator/motor beginning with the start of engagement of the engaging element by the engaging and disengaging means and ending with completion of said engagement.

12. A drive system according to claim 9 further comprising:

a one-way clutch for transmitting rotation of the generator/motor to the output shaft of the engine.

13. A drive system according to claim 9 wherein:

said engaging element is a normally closed type clutch and transmits rotation of the generator/motor to the output shaft of the engine.

14. A drive system for engaging a drive wheel of a vehicle with an output shaft of an engine, said drive system comprising:

a gearbox having at least a first gear element connected to the output shaft of the engine, a second gear element connected to the drive wheel and a third gear element for, by applying a braking torque to the third gear element, reducing the speed of rotation input from the first gear element and outputting the rotation at the reduced speed to the second gear element;

an engaging element for connection to any of said gear elements, said engaging element being selectively engaged to mechanically connect the output shaft of the engine to the drive wheel;

an electric rotary device connected to the third gear element;

an accumulator for supplying current for driving said electric rotary device and for receiving and storing electrical energy obtained by regeneration; engine load detecting means for detecting engine load;

speed detecting means for detecting speed of at least said first and second gear elements; and a control unit comprising:

electric rotary device controlling means for setting a target speed for the first gear element based on the detected engine load and for bringing the detected speed of the first gear element to the target speed by driving the electric rotary device to generate the braking torque; and engaging and disengaging means for comparing the detected speed of the first gear element with a set engaging value and with the detected speed of said second gear element, for bringing said engaging element into a partially engaged state responsive to a determination that the detected speed of said first gear element exceeds the set engaging value and for bringing said engaging element into a fully engaged state responsive to a determination that the detected speed of said second gear element exceeds the detected speed of said first gear element.

15. A drive system for engaging a drive wheel of a vehicle with an output shaft of an engine, said drive system comprising:

a gearbox having at least a first gear element connected to the output shaft of the engine, a second gear element connected to the drive wheel of the vehicle and a third gear element for receiving a braking torque to reduce speed of rotation input from the first gear element and to output the rotation at the reduced speed to the second gear element;

an engaging element for connection to any of said gear elements, said engaging element being selectively engaged to mechanically connect the output shaft of the engine to the drive wheel;

an electric rotary device connected to the third gear element;

an accumulator for supplying current for driving said electric rotary device and for receiving and storing electrical energy obtained by regeneration;

engine load detecting means for detecting engine load;

speed detecting means for detecting speed of at least one of the gear elements of the gearbox and for outputting a speed signal;

a control unit comprising:

electric rotary device controlling means for setting a target speed for the first gear element based on the detected engine load and for bringing the speed of the first gear element, as obtained from the speed signal, to the target speed by driving the electric rotary device to generate a braking torque; and engaging and disengaging means for comparing the speed of a gear element other than the first gear element, obtained from the speed signal, with set values for engaging and disengaging and for engaging and disengaging the engaging element based on the result of the comparison;

calculating means for calculating a speed difference or ratio of speeds of two gear elements detected by the speed detecting means; and wherein when the speed of a gear element other than the first gear element obtained from the speed signal is above a set value for engaging and the speed difference or speed ratio calculated by the calculating means is smaller than a preset deviation constant, the engaging and disengaging means engages the engaging element.

16. A drive system according to claim 15 wherein:

the deviation constant is set to correspond to the engine load and is increased as the engine load becomes larger.

17. A drive system according to claim 15 wherein the accumulator is a battery and further comprising:

a residual charge detecting device for monitoring battery charge, wherein the electric rotary device is a generator/motor and the preset deviation constant is set to a smaller value when the battery charge is good and to a larger value when the battery charge is low.

18. A drive system for engaging a drive wheel of a vehicle with an output shaft of an engine, said drive system comprising:

a gearbox having at least a first gear element connected to the output shaft of the engine, a second gear element connected to the drive wheel of the vehicle and a third gear element for receiving a braking torque to reduce speed of rotation input from the first gear element and to output the rotation at the reduced speed to the second gear element;

an engaging element for connection to any of said gear elements, said engaging element being selectively engaged to mechanically connect the output shaft of the engine to the drive wheel;

an electric rotary device connected to the third gear element;

an accumulator for supplying current for driving said electric rotary device and for receiving and storing electrical energy obtained by regeneration;

engine load detecting means for detecting engine load;

speed detecting means for detecting speed of at least one of the gear elements of the gearbox and for outputting a speed signal; and a control unit comprising:

electric rotary device controlling means for setting a target speed for the first gear element based on the detected engine load and for bringing the speed of the first gear element, as obtained from the speed signal, to the target speed by driving the electric rotary device to generate a braking torque;

engaging and disengaging means for comparing the speed of a gear element other than the first gear element, obtained from the speed signal, with set values for engaging and disengaging and for engaging and disengaging the engaging element based on the result of the comparison; and wherein when the speed of a gear element other than the first gear element obtained from the speed signal is above a set value for engaging and has an absolute value of substantially zero, the engaging and disengaging means engages the engaging element.

19. A drive system for engaging a drive wheel of a vehicle with an output shaft of an engine, said drive system comprising:

a gearbox having at least a first gear element connected to the output shaft of the engine, a second gear element connected to the drive wheel of the vehicle and a third gear element for receiving a braking torque to reduce speed of rotation input from the first gear element and to output the rotation at the reduced speed to the second gear element;

an engaging element for connection to any of said gear elements, said engaging element being selectively engaged to mechanically connect the output shaft of the engine to the drive wheel;

an electric rotary device connected to the third gear element;

an accumulator for supplying current for driving said electric rotary device and for receiving and storing electrical energy obtained by regeneration;

engine load detecting means for detecting engine load;

speed detecting means for detecting speed of at least one of the gear elements of the gearbox and for outputting a speed signal; and a control unit comprising:
   electric rotary device controlling means for setting a target speed for the first gear element based on the detected engine load and for bringing the speed of the first gear element, as obtained from the speed signal, to the target speed by driving the electric rotary device to generate a braking torque;
   engaging and disengaging means for comparing the speed of a gear element other than the first gear element, obtained from the speed signal, with set values for engaging and disengaging and for engaging and disengaging the engaging element based on the result of the comparison; and wherein when the speed of a gear element other than the first gear element obtained from the speed signal is above a set value for engaging and has an absolute value smaller than a set value corresponding to the engine load, the engaging and disengaging means engages the engaging element.

20. A drive system for engaging a drive wheel of a vehicle with an output shaft of an engine, said drive system comprising:

a gearbox having at least a first gear element connected to the output shaft of the engine, a second gear element connected to the drive wheel of the vehicle and a third gear element for receiving a braking torque to reduce speed of rotation input from the first gear element and to output the rotation at the reduced speed to the second gear element;

an engaging element for connection to any of said gear elements, said engaging element being selectively engaged to mechanically connect the output shaft of the engine to the drive wheel;

an electric rotary device connected to the third gear element;

an accumulator for supplying current for driving said electric rotary device and for receiving and storing electrical energy obtained by regeneration;

engine load detecting means for detecting engine load;

speed detecting means for detecting speed of at least one of the gear elements of the gearbox and for outputting a speed signal; and a control unit comprising:
   electric rotary device controlling means for setting a target speed for the first gear element based on the detected engine load and for bringing the speed of the first gear element, as obtained from the speed signal, to the target speed by driving the electric rotary device to generate a braking torque;
   engaging and disengaging means for comparing the speed of a gear element other than the first gear element, obtained from the speed signal, with set values for engaging and disengaging and for engaging and disengaging the engaging element based on the result of the comparison; and regenerated power detecting means for detecting power regenerated by the electric rotary device, wherein when the speed of a gear element other than the first gear element obtained from the speed signal is above a set value for engaging and the regenerated power detected by the regenerated power detecting means is smaller than a set value, the engaging and disengaging means engages the engaging element.

21. A drive system for engaging a drive wheel of a vehicle with an output shaft of an engine, said drive system comprising:

a gearbox having at least a first gear element connected to the output shaft of the engine, a second gear element connected to the drive wheel of the vehicle and a third gear element for receiving a braking torque to reduce speed of rotation input from the first gear element and to output the rotation at the reduced speed to the second gear element;

an engaging element for connection to any of said gear elements, said engaging element being selectively engaged to mechanically connect the output shaft of the engine to the drive wheel;

a generator/motor connected to the third gear element;

an accumulator for supplying current for driving said electric rotary device and for receiving and storing electrical energy obtained by regeneration;

engine load detecting means for detecting engine load;

speed detecting means for detecting speed of at least one of the gear elements of the gearbox and for outputting a speed signal; and a control unit comprising:
   generator/motor controlling means for setting a target speed for the first gear element based on the detected engine load and for bringing the speed of the first gear element, as obtained from the speed signal, to the target speed by driving the generator/motor to generate a braking torque;
   engaging and disengaging means for comparing the speed of a gear element other than the first gear element, obtained from the speed signal, with set values for engaging and disengaging and for engaging and disengaging the engaging element based on the result of the comparison; and wherein, when the difference between power regenerated by the generator/motor and power consumed in driving the generator/motor is smaller than a set value and the speed of a gear element other than the first gear element obtained from the speed signal is larger than a set value for engaging, the engaging and disengaging means engages the engaging element.

* * * * *

UNITED STATES PATENT AND TRADEMARK OFFICE
CERTIFICATE OF CORRECTION

PATENT NO. : 5,771,478
DATED : June 23, 1998
INVENTOR(S) : TSUKAMOTO et al

It is certified that error appears in the above-identified patent and that said Letters Patent is hereby corrected as shown below:

Col. 11, line 15, "6" should read --$\theta$--.
Col. 13, line 22, "$\theta$hd id1." should read --$\theta$ id1--; and
        line 55, "$N_{el}$." should read --$N_{el}'$--.
Col. 14, line 19, "No" should read --$N_o$--.
Col. 17, line 8, "$T_{n1}$" should read --$T_{m1}$--.
Col. 18, line 9, "$M_{mla}$" should read --$N_{mla}$--.
Col. 20, line 3, "No" should read --$N_o$--;
        line 14, "$P_3$" should read --$P_1$--; and
        line 50, "e" should read --$\theta$--.
Col. 22, line 19, "e" should read --$\theta$--; and
        line 36, "e" should read --$\theta$--.
Col. 23, line 5, "No" should read --$N_o$--.
Col. 28, line 2, "$Nm_2$" should read --$N_{m2}$--.

UNITED STATES PATENT AND TRADEMARK OFFICE
CERTIFICATE OF CORRECTION

PATENT NO. : 5,771,478
DATED : June 23, 1998
INVENTOR(S) : TSUKAMOTO et al.

It is certified that error appears in the above-identified patent and that said Letters Patent is hereby corrected as shown below:

Col. 29, line 63, after "claim" insert --1--.

Signed and Sealed this

Twenty-third Day of February, 1999

Attest:

Attesting Officer

Q. TODD DICKINSON

Acting Commissioner of Patents and Trademarks